(12) United States Patent
Tanimoto et al.

(10) Patent No.: US 10,949,527 B2
(45) Date of Patent: Mar. 16, 2021

(54) SEMICONDUCTOR DEVICE, AUTHENTICATION SYSTEM, AND AUTHENTICATION METHOD

(71) Applicant: RENESAS ELECTRONICS CORPORATION, Tokyo (JP)

(72) Inventors: Tadaaki Tanimoto, Tokyo (JP); Daisuke Moriyama, Tokyo (JP); Yoshitaka Taki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 288 days.

(21) Appl. No.: 16/137,346

(22) Filed: Sep. 20, 2018

(65) Prior Publication Data
US 2019/0156018 A1    May 23, 2019

(30) Foreign Application Priority Data

Nov. 21, 2017    (JP) .............................. JP2017-223607

(51) Int. Cl.
*G06F 21/79*    (2013.01)
*G06F 21/44*    (2013.01)
(Continued)

(52) U.S. Cl.
CPC ........ *G06F 21/445* (2013.01); *G06F 12/1441* (2013.01); *G06F 21/72* (2013.01); *G06F 21/78* (2013.01); *G06F 21/79* (2013.01); *H04L 9/3234* (2013.01); *H04L 9/3247* (2013.01); *H04L 2209/34* (2013.01)

(58) Field of Classification Search
CPC .... G06F 21/445; G06F 21/79; G06F 12/1441; G06F 21/72; G06F 21/78; G06F 11/1048; G06F 21/34; G06F 21/71; H04L 2209/34; H04L 9/3234; H04L 9/3247
See application file for complete search history.

(56) References Cited

U.S. PATENT DOCUMENTS

| | | |
|---|---|---|
| 8,627,086 B2 | 1/2014 | Gehrmann et al. |
| 2012/0304281 A1* | 11/2012 | Kang ................... G06F 21/44 726/16 |

(Continued)

FOREIGN PATENT DOCUMENTS

| | | |
|---|---|---|
| JP | 2002-077135 A | 3/2002 |
| JP | 4856080 B2 | 1/2012 |
| JP | 2016-134914 A | 7/2016 |

OTHER PUBLICATIONS

Extended European Search Report issued in corresponding European Patent Application No. 18206955.9-1218, dated Mar. 22, 2019.

*Primary Examiner* — Olugbenga O Idowu
(74) *Attorney, Agent, or Firm* — McDermott Will & Emery LLP

(57) ABSTRACT

Provided is a semiconductor device which can perform secure data transmission/reception considering functional safety. The semiconductor device includes a hardware security module circuit which performs an authentication process and an error detection circuit used to perform an error detection process at least on first data which is processed in the hardware security module circuit. A memory area associated with the error detection circuit is configured to be accessible only by the hardware security module circuit when the error detection process is performed at least on the first data.

10 Claims, 32 Drawing Sheets

(51) Int. Cl.
H04L 9/32 (2006.01)
G06F 12/14 (2006.01)
G06F 21/72 (2013.01)
G06F 21/78 (2013.01)

(56) References Cited

U.S. PATENT DOCUMENTS

| | | |
|---|---|---|
| 2014/0373042 A1* | 12/2014 | Le Pelerin ......... H04N 21/4353 |
| | | 725/31 |
| 2015/0294123 A1 | 10/2015 | Oxford |
| 2016/0012653 A1 | 1/2016 | Soroko |
| 2016/0259584 A1* | 9/2016 | Schlottmann ......... G06F 21/572 |
| 2017/0012774 A1* | 1/2017 | Antoni ................... H04W 4/40 |
| 2017/0147812 A1 | 5/2017 | Ujiie et al. |

* cited by examiner

FIG. 6

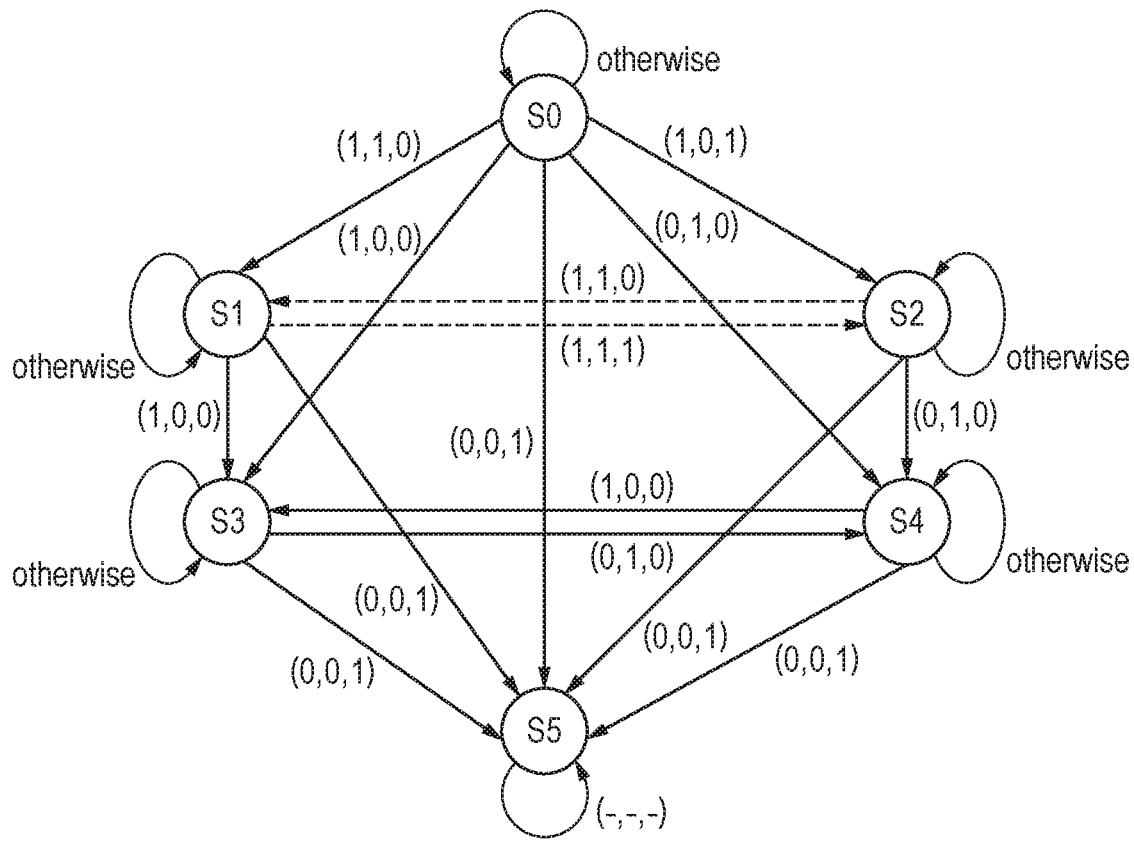

IN STATES S0 TO S6, "1" IN (R, W, E) REPRESENTS A DATA READABLE, WRITABLE, OR EXECUTABLE STATE, WHILE "0" IN (R, W, E) REPRESENTS A DATA UNREADABLE, UNWRITABLE, OR INEXECUTABLE STATE

S0:(1,1,1) // DATA IS READABLE, WRITABLE, AND EXECUTABLE -- Initial State
  S1:(1,1,0) // Readable & Writable
  S2:(1,0,1) // Readable & Executable
  S3:(1,0,0) // Readable
  S7:(0,1,1) // Writable & Executable ← LEADING TO VULNERABILITY
  S4:(0,1,0) // Writable
  S5:(0,0,1) // Executable
  S6:(0,0,0) // DATA IS UNREADABLE, UNWRITABLE, AND INEXECUTABLE
  WHERE S6 AND S7 ARE ASSUMED TO BE UNREACHABLE STATES

SEMICONDUCTOR DEVICE, AUTHENTICATION SYSTEM, AND AUTHENTICATION METHOD

CROSS-REFERENCE TO RELATED APPLICATIONS

The disclosure of Japanese Patent Application No. 2017-223607 filed on Nov. 21, 2017 including the specification, drawings and abstract is incorporated herein by reference in its entirety.

BACKGROUND

The present invention relates to a semiconductor device, an authentication system, and an authentication method, and more particularly to, e.g., a semiconductor device having a hardware security module circuit, an authentication system, and an authentication method.

A secure data loading method for use in the case of data transmission/reception between devices has been proposed. For example, Patent Document 1 discloses a data structure in which a digital signature using public/private keys and a MAC (Message Authentication Code) value are added to data and a method which performs, when loading data, an authentication process or a data falsification check using the data structure. Patent Document 2 discloses a technique which allows updating of sensing rules for sensing an unauthorized frame in an in-vehicle network.

On the other hand, an encryption/decryption method using an error-correcting code technique has been proposed. Patent Document 3 discloses an encryption/decryption method using an error-correcting code technique. In Patent Document 3, an error correction coding process is performed on a plaintext and, in the resulting error-correction-coded data, a correctable random bit error is caused. Then, the error-correction-coded data with the random bit error is encrypted to produce a ciphertext. Conversely, the ciphertext is decrypted and then subjected to error correction coding to provide a plaintext.

RELATED ART DOCUMENTS

Patent Documents

[Patent Document 1] Japanese Patent No. 4856080
[Patent Document 2] Japanese Unexamined Patent Application Publication No. 2016-134914
[Patent Document 3] Japanese Unexamined Patent Application Publication No. 2002-77135

SUMMARY

In each of the techniques according to Patent Documents 1 and 2 mentioned above, no consideration is given to functional safety measures such as the checking of a data error in communication or a data error resulting from a hardware fault or an error-correcting code. In addition, in the technique according to Patent Document 3 mentioned above, the error-correcting code has been introduced to provide a cryptanalytic approach, not to take functional safety measures. Accordingly, there is a risk that the techniques according to Patent Documents 1, 2, and 3 mentioned above cannot allow secure data transmission/reception considering functional safety to be performed.

Other problems and novel features of the present invention will become apparent from a statement in the present specification and the accompanying drawings.

A semiconductor device according to an embodiment includes a hardware security module circuit which performs an authentication process and an error detection circuit used to perform an error detection process on at least first data which is processed in the hardware security module circuit. A memory area associated with the error detection circuit is configured to be accessible only by the hardware security module circuit when the error detection process is performed at least on the first data.

Note that a method or system as a substitute representation of the device according to the above embodiment, a program for causing a computer to execute a process performed by the device or a portion of the device, an imaging device including the device, or the like is also an effective implementation of the present invention.

The above embodiment allows secure data transmission/reception considering functional safety to be performed.

BRIEF DESCRIPTION OF THE DRAWINGS

FIG. 6 is a state transition diagram implemented by the attribute control state machine shown in FIG. 5;

Figure 18:
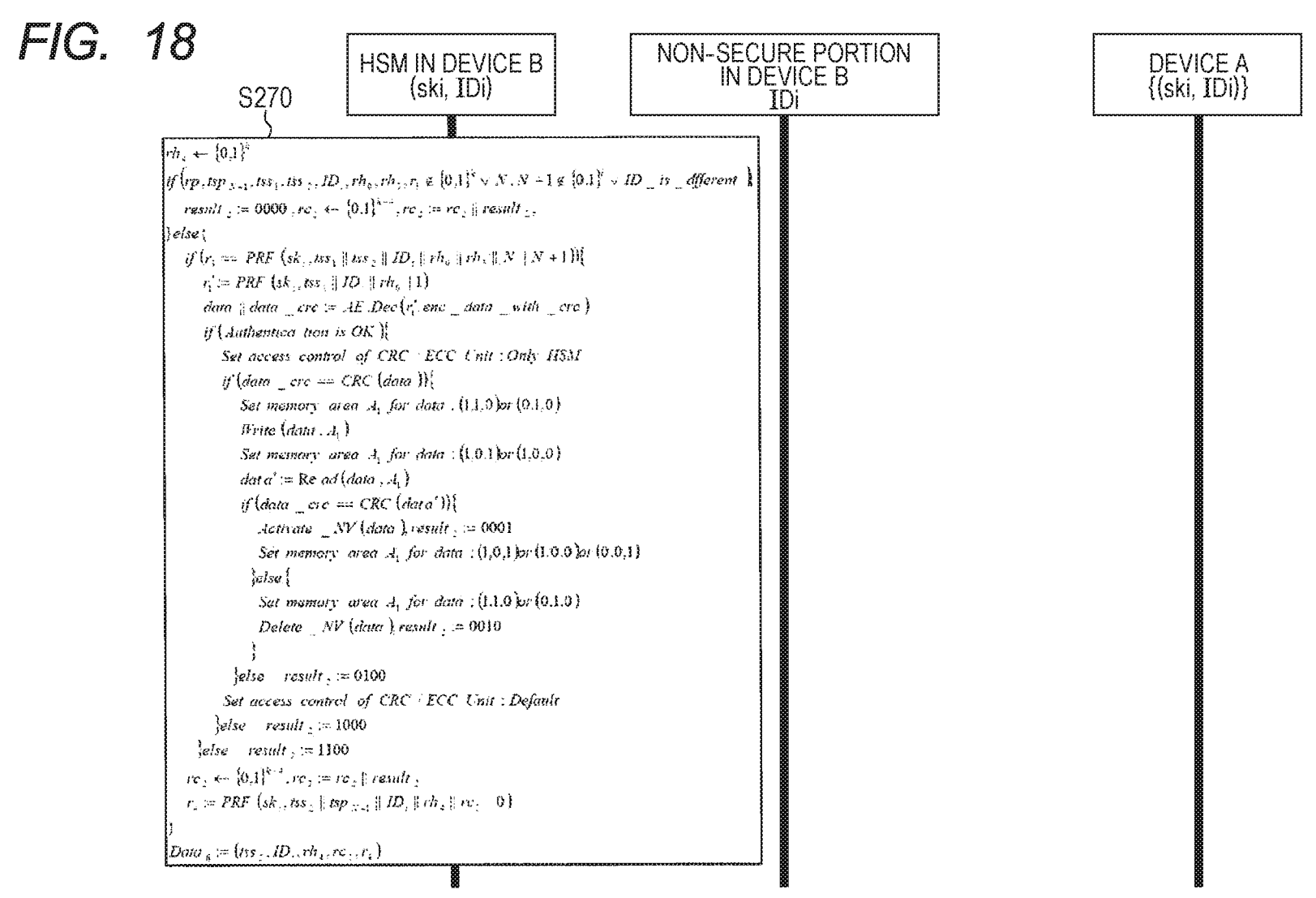

FIG. 18 is a sequence diagram showing the data transmission/reception sequence executed in the authentication system according to the modification of the first embodiment;

Figure 33:
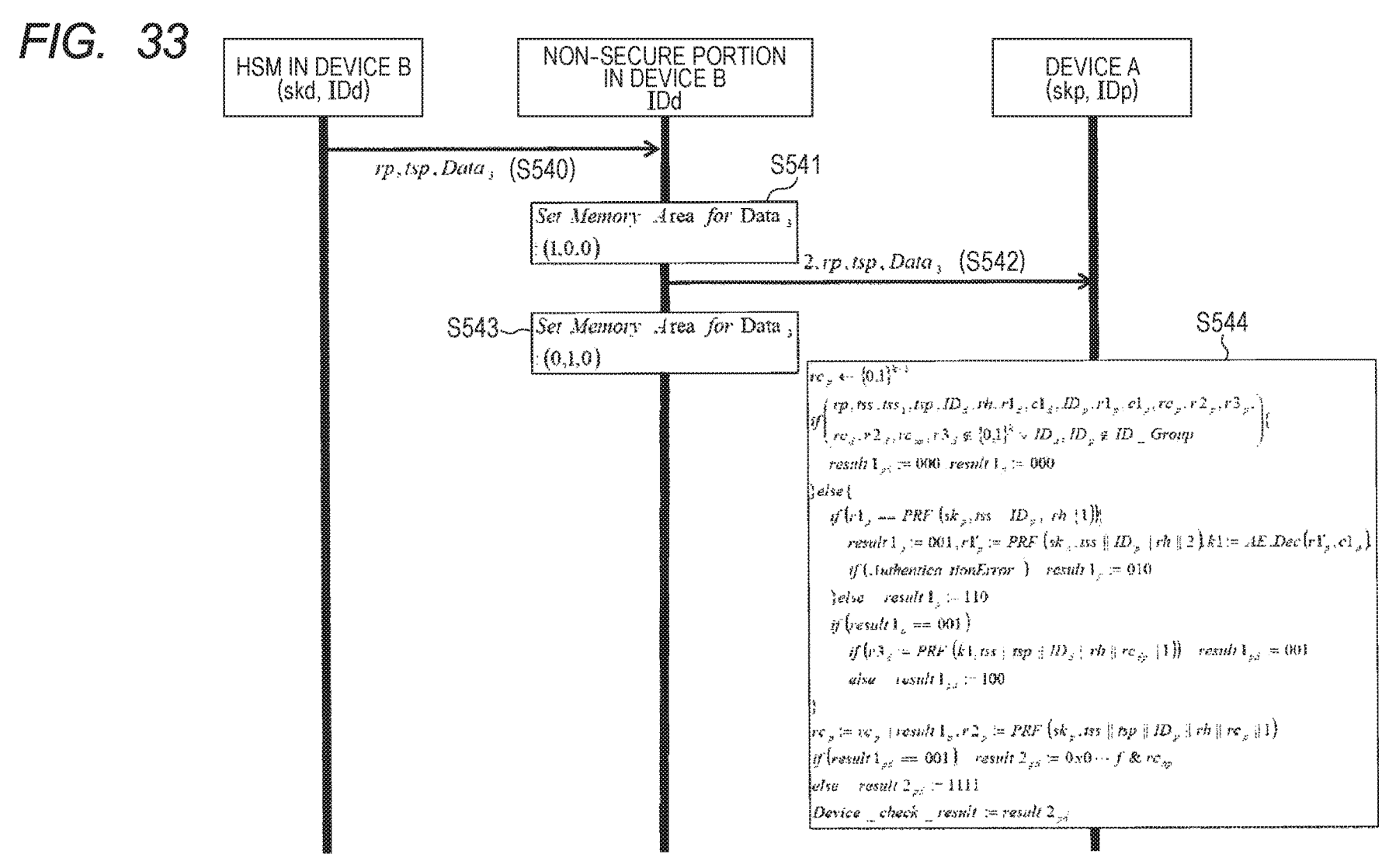

FIG. 33 is a sequence diagram showing the data transmission/reception sequence executed in the authentication system according to the third embodiment.

DETAILED DESCRIPTION

Figure 1:
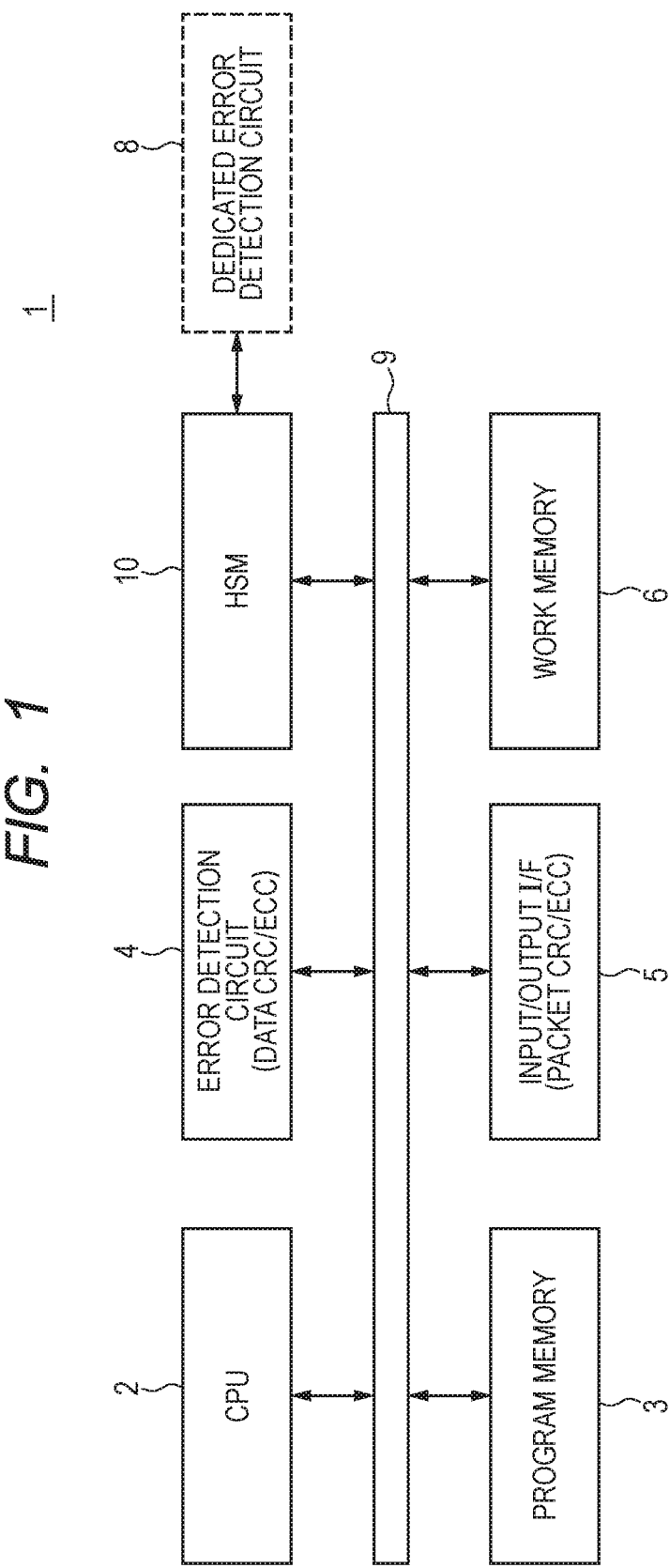
FIG. 1 is a view showing a hardware configuration of a semiconductor device according to a first embodiment.

Referring to the drawings, the following will describe the embodiments of the present invention. For improved clarity of the description, the following description and drawings are omitted and simplified as appropriate. Note that, in the individual drawings, like parts are denoted by like reference numerals, and a repeated description is omitted as necessary.

In each of the following embodiments, if necessary for the sake of convenience, the embodiment will be described by being divided into a plurality of sections or embodiments. However, they are by no means irrelevant to each other unless particularly explicitly described otherwise, and one of the sections or embodiments is a modification, an application example, a detailed description, a supplementary description, and so forth of part or the whole of the others. Also, in the following embodiments, when the number and the like (including the number, numerical value, amount, range, and the like) of elements are referred to, they are not limited to specific numbers unless particularly explicitly described otherwise or unless they are obviously limited to the specific numbers in principle. The number and the like of the elements may be not less than or not more than the specific numbers.

Also in the following embodiments, the components thereof (including also operations, steps, and the like) are not necessarily indispensable unless particularly explicitly described otherwise or unless the components are considered to be obviously indispensable in principle. Likewise, if the shapes, positional relationships, and the like of the components and the like are referred to in the following embodiments, the shapes, positional relationships, and the like are assumed to include those substantially proximate or similar thereto and the like unless particularly explicitly described otherwise or unless it can be considered that they obviously do not in principle. The same shall apply in regard to the foregoing number and the like (including the number, numerical value, amount, range, and the like).

Also, various elements shown in the drawings as functional blocks that perform various processes can be configured using a CPU (Central Processing Unit), a memory, or other circuit as hardware, while such elements can be implemented by a program loaded in a memory or the like. Therefore, it is to be understood by those skilled in the art that the functional blocks can variously be implemented by hardware only, by software only, or by a combination of hardware and software, and is not limited to any of hardware, software, and a combination thereof.

The program mentioned above can be stored using various types of non-transitory computer readable media and supplied to a computer. The non-transitory computer readable media include various types of tangible storage media. Examples of the non-transitory computer readable media include a magnetic recording medium (e.g., flexible disk, magnetic tape, or hard disk drive), a photomagnetic recording medium (e.g., photomagnetic disk), a CD-ROM (Read Only Memory), a CD-R, a CD-R/W, and a semiconductor memory (e.g., mask ROM, PROM (Programmable ROM), EPROM (Erasable PROM), flash ROM, or RAM (Random Access Memory)). The program may also be supplied to the computer using various types of transitory computer readable media. Examples of the transitory computer readable media include an electrical signal, an optical signal, and an electromagnetic wave. The transitory computer readable media can supply the program to the computer via a wired communication path such as an electric wire or an optical fiber or a wireless communication path.

Outline of Embodiments

Prior to the description of the embodiments of the present invention, a description will be given of the outline of the embodiments.

To meet functional safety requirements, it is important to protect transmitted/received data. In short, it is desired to protect transmitted/received data from being destroyed due to an error. Consequently, it is necessary for a data transmitter to appropriately add a CRC (Cyclic Redundancy Check) or an ECC (Error-Correction Code) (add error detection data) to data and for a data receiver to appropriately check the CRC or the ECC.

In the embodiments described below, by hiding the CRC or ECC process performed by the data receiver from components other than a HSM (Hardware Security Module), it is possible to implement a data transmission/reception sequence for which not only falsification resistance, but also confidentiality can be ensured. Also, in the embodiments of the present invention, a CRC or ECC processing mechanism dedicated to the HSM is provided as software or hardware. Note that, when such a processing mechanism dedicated to a HSM is not provided, a data transmission/reception sequence meeting functional safety requirements and having falsification resistance can be configured, but confidentiality may not be able to be achieved. To prevent this, the embodiments of the present invention disclose a configuration including a CRC or ECC processing mechanism dedicated to a HSM as software or hardware and a data transmission/reception sequence meeting functional safety requirements using the configuration and having falsification resistance and confidentiality.

It is assumed herein that target data to be transmitted/received includes a program. The data transmission/reception sequence shown below includes secure data and program storage meeting functional safety requirements. The data transmission/reception sequence particularly includes data storage to a memory area for program protection where the program is executable, but the data is unreadable.

In the embodiments of the present invention, in data storage, even when a specification of (R, W, E) attributes (access attributes) at a storage location is such that data is unwritable or unreadable, secure data writing meeting functional safety requirements can be performed. The following is what R, W, and E used herein represent:

R specifies whether or not data is readable. When R is "1", data is readable while, when R is "0", data is unreadable.

W specifies whether or not data is writable. When W is "1", data is writable while, when W is "0", data is unwritable.

E specifies whether or not data is executable. When E is "1", data is executable while, when E is "0", data is inexecutable.

In short, the access attributes show whether or the data stored in the memory area is readable, whether or not data is writable to the memory area, and whether or not the data (program) stored in the memory area is executable.

The (R, W, E) attributes may be specified using an attribute setting/changing means in software provided by, e.g., UNIXS (registered trademark), Linux (registered trademark), or the like or an (R, W, E) attribute control mechanism in the embodiments of the present invention described below. Particularly when the (R, W, E) attributes can be set/changed using software, it is desirable to use an (R, W, E) attribute changing mechanism involving appropriate encryption authentication such as challenge-response authentication.

The embodiments of the present invention include a statement based on the use of an access control mechanism. The access control mechanism may be implemented by, e.g., a mandatory access control mechanism provided by SELinux. Alternatively, the access control mechanism may also be implemented using a method based on the setting of a lock bit for each of memory areas such as provided by ATMega128. Still alternatively, the access control mechanism may also be implemented using the (R, W, E) attribute control mechanism disclosed in the embodiments of the present invention and an existing access control mechanism in combination. Particularly when access control can be set/changed using software, it is desirable to use the access control mechanism involving appropriate encryption authentication such as challenge-response authentication.

Also, in the embodiments of the present invention, the (R, W, E) attributes and the access control may be set using a CPU or a control state machine embedded in the HSM or using a CPU placed in a non-secure portion outside the HSM. In either case, for software which executes the settings, it is assumedly recognized that the software has not been falsified using secure boot or the like prior to the execution. In the case of execution in the HSM, it is assumed that the CPU or control state machine embedded in the HSM executes the settings.

First Embodiment

FIG. 1 is a view showing a hardware configuration of a semiconductor device 1 according to the first embodiment. The semiconductor device 1 is, e.g., an MCU (Micro Control Unit as a microcontroller) mounted in a vehicle or the like. The semiconductor device 1 includes a CPU 2, a program memory 3, an error detection circuit 4, an input/output interface 5 (input/output I/F), a work memory 6, and a hardware security module circuit 10 (HSM). The CPU 2, the program memory 3, the error detection circuit 4, the input/output interface 5, the work memory 6, and the hardware security module circuit 10 are coupled to each other via a bus 9. Note that the components of the semiconductor device 1 (especially the memory area) other than the hardware security module circuit 10 may also be referred to as a non-secure portion.

The CPU 2 performs an arithmetic process and a process of executing a program. The program memory 3 stores a program executed by the CPU 2. The work memory 6 is used when a process such as the execution of the program is performed. The input/output interface 5 performs a process for receiving an input or producing an output from or to the outside. Note that the input/output interface 5 is equipped with a function for processing CRC/ECC defined by a protocol for a packet.

The error detection circuit 4 performs an error detection process (CRC/ECC processing) on the data processed in the semiconductor device 1. Specifically, the error detection circuit 4 performs the generation of CRC/ECC and the addition thereof (generation and addition of error detection data) to communication data in the internal bus 9 of the semiconductor device 1 as well as the processing (checking) of the CRC/ECC. The error detection circuit 4 also performs the generation of CRC/ECC and the addition thereof to data transmitted/received to and from the input/output interface 5 as well as the processing (checking) of the CRC/ECC.

The semiconductor device 1 may also have a dedicated error detection circuit 8 which is dedicated to the hardware security module circuit 10. The dedicated error detection circuit 8 is coupled only to the hardware security module circuit 10. Consequently, only the hardware security module circuit 10 is allowed to access the dedicated error detection circuit 8. In other words, the dedicated error detection circuit 8 is a hardware circuit which is dedicated to the hardware security module circuit 10. The dedicated error detection circuit 8 has substantially the same function as that of the error detection circuit 4.

Accordingly, the dedicated error detection circuit 8 performs an error detection process on data (first data) processed by the hardware security module circuit 10. Specifically, the dedicated error detection circuit 8 is used for the CRC/ECC processing (error detection process) executed in a security-related process performed in the hardware security module circuit 10. A memory area associated with the dedicated error detection circuit 8 is configured to be accessible only by the hardware security module circuit 10 when the CRC/ECC processing is executed by the hardware security module circuit 10.

When the dedicated error detection circuit 8 is not disposed, the error detection circuit 4 may be used for the CRC/ECC processing (error detection process) executed in the security-related process performed in the hardware security module circuit 10. In other words, the error detection circuit 4 according to the first embodiment performs an error detection process at least on the data (first data) processed by the hardware security module circuit 10. In this case, the CPU 2 is configured so as to be inhibited from accessing data associated with the error detection circuit 4 under appropriate access control when the CRC/ECC processing is executed by the hardware security module circuit 10. It is desirable that the access control is set by the hardware security module circuit 10 in a transmission/reception sequence described later.

Figure 2:
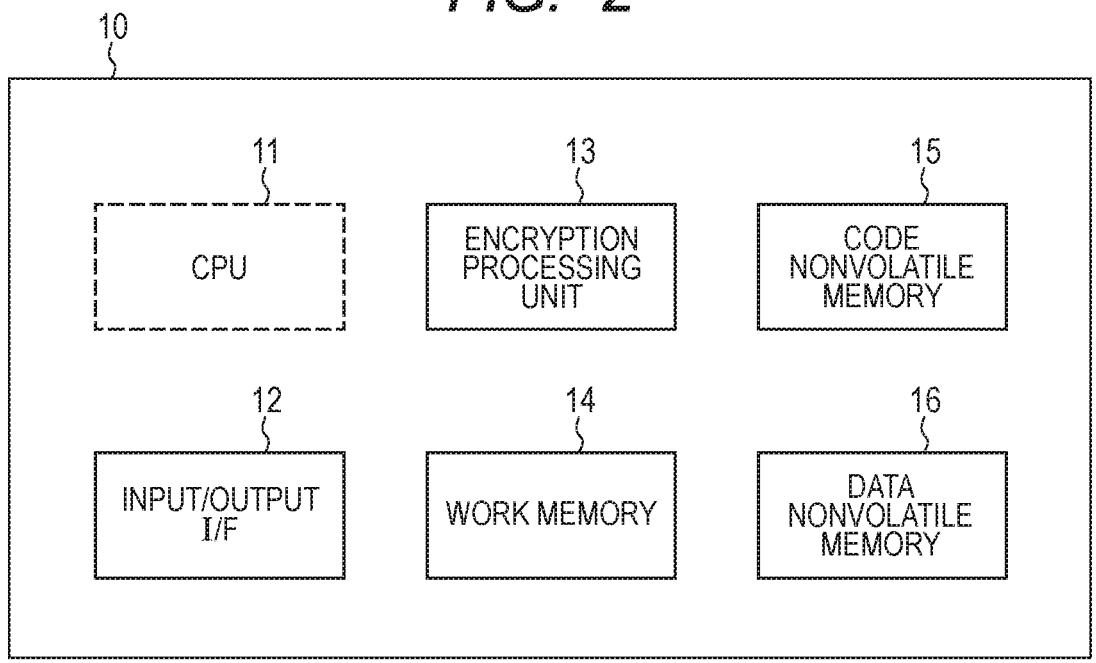
FIG. 2 is a view showing a hardware configuration of a hardware security module circuit according to the first embodiment.

FIG. 2 is a view showing a hardware configuration of the hardware security module circuit 10 according to the first embodiment. The hardware security module circuit 10 includes a CPU 11, an input/output interface 12 (input/output I/F), an encryption processing unit 13, a work memory 14, a code nonvolatile memory 15, and a data nonvolatile memory 16.

The CPU 11 performs an arithmetic process. Specifically, the CPU 11 performs a process (such as access control) executed in the data transmission/reception sequence described later. Note that the hardware security module circuit 10 need not necessarily have the CPU 11. In this case, the hardware security module circuit 10 may also have any control state machine.

The input/output interface 12 performs a process for receiving an input or producing an output from or to the outside. The encryption processing unit 13 performs an encryption process such as encryption, decryption, or an authentication process. The encryption processing unit 13 may also perform a process for performing signature verification. The work memory 14 is used when a process is executed in the hardware security module circuit 10. The code nonvolatile memory 15 stores a code executed in the hardware security module circuit 10. The data nonvolatile memory 16 stores data used for the process performed in the hardware security module circuit 10.

Note that each of the code nonvolatile memory 15 and the data nonvolatile memory 16 may also be configured such that a local region thereof is accessible from the outside of the hardware security module circuit 10 without requiring any authentication. In short, each of the code nonvolatile memory 15 and the data nonvolatile memory 16 may also have a local region which is not protected (which is not secure). In other words, each of the code nonvolatile memory 15 and the data nonvolatile memory 16 may also have a local region which is disposed as a security region under the control of the hardware security module circuit 10.

A description will be given herein of the outline of operations according to the first embodiment.

When the semiconductor device 1 has the dedicated error detection circuit 8, the dedicated error detection circuit 8 performs an ECC/CRC checking process using the ECC/CRC value added to the data decrypted in the hardware security module circuit 10. The dedicated error detection circuit 8 also generates (issues) an ECC/CRC value to target data to be encrypted in the hardware security module circuit 10 and adds the generated ECC/CRC value to the target data to be encrypted to effect encryption.

On the other hand, when the semiconductor device 1 does not have the dedicated error detection circuit 8, the error detection circuit 4 coupled to the bus 9 performs the same process as that performed by the dedicated error detection circuit 8 described above. The ECC/CRC checking targeted at the decrypted data in the hardware security module circuit 10 can be carried out by controlling the error detection circuit 4 such that the error detection circuit 4 is accessible only by the hardware security module circuit 10. Likewise, the encryption process can be carried out by controlling the error detection circuit 4 such that the error detection circuit 4 is accessible only by the hardware security module circuit 10. Note that the details of the access control will be described later.

To meet functional safety requirements, it is important to protect transmitted/received data. Accordingly, it is necessary for a data transmitter to appropriately add a CRC or an ECC to data and for a data receiver to appropriately check the CRC or ECC. At this time, the error detection circuit which performs such a process is inhibited from being accessed by a component other than the hardware security module circuit 10 so that security (confidentiality) is improved. This allows the semiconductor device 1 according to the present first embodiment to perform secure data transmission/reception considering functional safety.

In the semiconductor device 1 including the dedicated error detection circuit 8, the hardware configuration is expanded to allow the process described above to be implemented. Accordingly, when the CRC/ECC is added or the CRC/ECC checking (error detection process) is performed, an access to the dedicated error detection circuit 8 by a component other than the hardware security module circuit 10 is inhibited. This allows the semiconductor device 1 according to the present first embodiment to perform secure data transmission/reception considering functional safety. Since the dedicated error detection circuit 8 is provided, it is unnecessary to perform such access control as will be described later. As a result, the content of the process is simpler than when the access control is performed.

When the semiconductor device 1 does not include the dedicated error detection circuit 8, i.e., when the hardware configuration is not expanded, the error detection circuit 4 can be accessed only by the hardware security module circuit 10 under appropriate access control. Consequently, when the CRC/ECC is added or the CRC/ECC checking (error detection process) is performed, an access to the error detection circuit 4 by a component other than the hardware security module circuit 10 is inhibited. This allows the semiconductor device 1 according to the present first embodiment to perform secure data transmission/reception considering functional safety. Since the access control is performed, it is unnecessary to provide the dedicated error detection circuit 8.

As a result, the hardware configuration of the semiconductor device 1 is simpler than when the dedicated error detection circuit 8 is provided. In short, it is possible to inhibit the degradation of security and also meet functional safety requirements, while still using a configuration in which the error detection circuit 4 can also perform processes associated with a component other than hardware security module circuit 10.

(Access Control)

Next, a description will be given of the access control.

Figure 3:
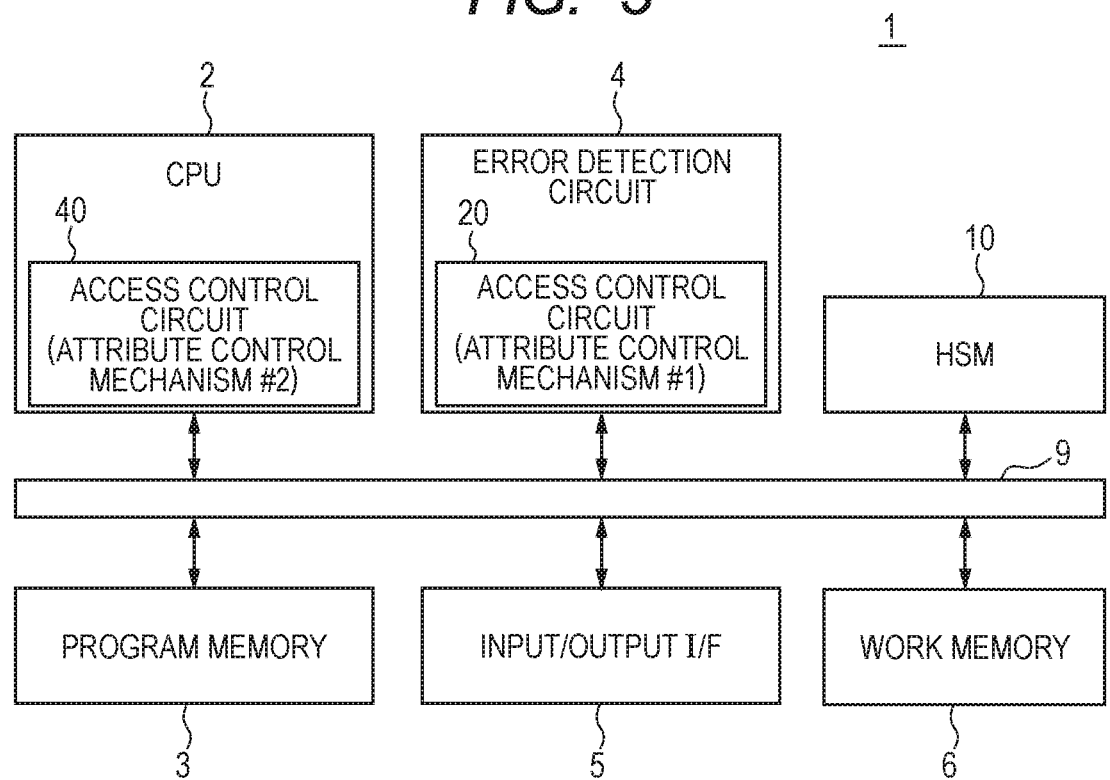
FIG. 3 is a view showing the semiconductor device having an access control circuit according to the first embodiment.
Figure 4:
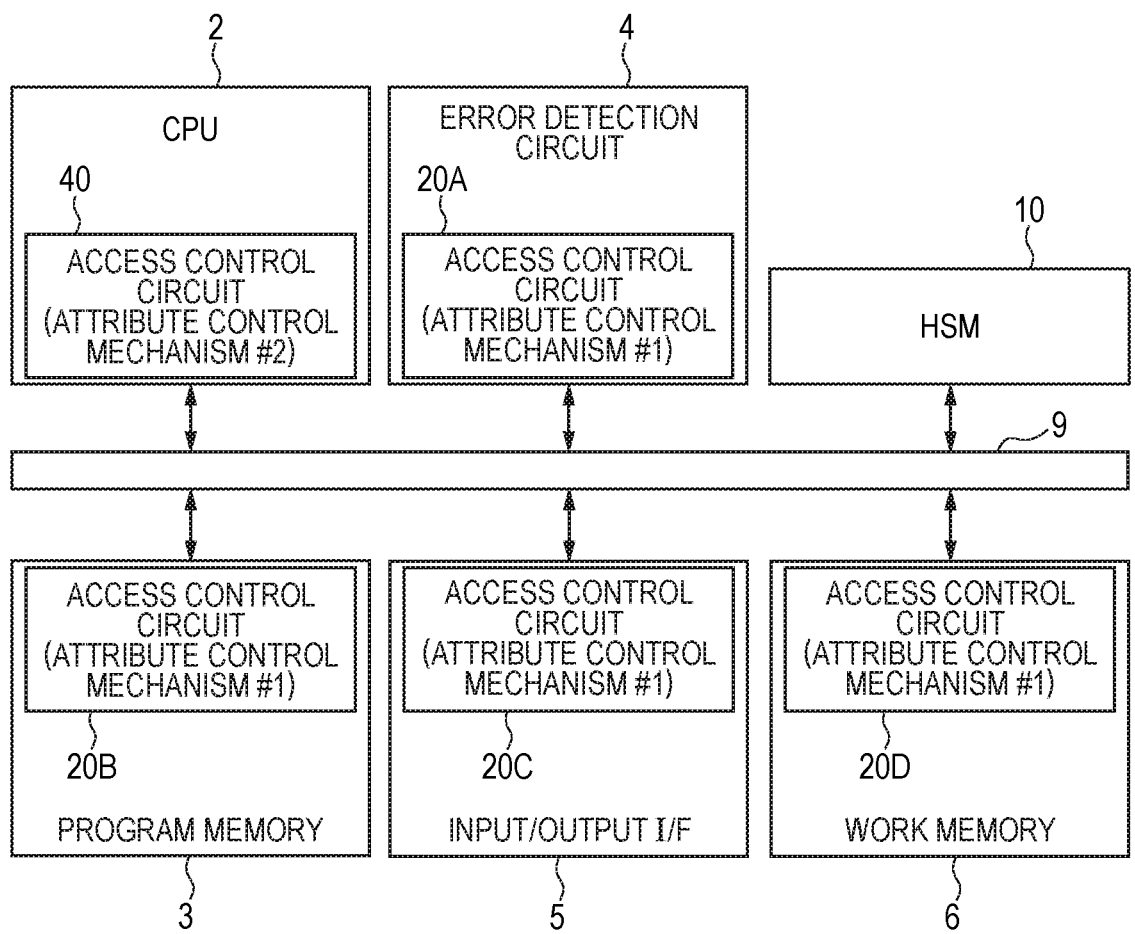
FIG. 4 is a view showing the semiconductor device having the access control circuit according to the first embodiment.

FIGS. 3 and 4 are views each showing the semiconductor device 1 having the access control circuit according to the first embodiment. An access control circuit 20 is provided for each of the components which need protection. An access control circuit 40 is provided in the CPU 2 (bus master). The semiconductor device 1 shown in FIG. 3 is configured such that the access control circuit 20 is provided only for the error detection circuit 4. In other words, in the example shown in FIG. 3, only the error detection circuit 4 is a target of the access control (mandatory access control).

On the other hand, the semiconductor device 1 shown in FIG. 4 is configured such that the access control circuits 20 (access control circuits 20A to 20D) are provided not only for the error detection circuit 4, but also for the plurality of components. In other words, in the example shown in FIG. 4, the plurality of components including the error detection circuit 4 are targets of the access control (mandatory access control). Note that, in FIG. 4, the access control circuits 20 are provided individually for all the components, but the access control circuit 20 need not be provided for a component which does not need protection. In the example shown in FIG. 4, the access control circuit 40 may also be configured in accordance with the number of the access control circuits 20 that are placed. When there are a plurality of the CPUs 2 (bus masters), the access control circuits 40 may also be provided individually for the CPUs 2 (bus masters) on a one-to-one basis.

Figure 5:
FIG. 5 is a view showing an attribute control state machine provided in the access control circuit shown in each of FIGS. 3 and 4.

FIG. 5 is a view showing an attribute control state machine 22 provided in each of the access control circuits 20 shown in FIGS. 3 and 4. The attribute control state machine 22 shown in FIG. 5 is an example of the (R, W, E) attribute control mechanism described above. The attribute control state machine 22 is intended to set the (R, W, E) values to a register. On receiving a 3-bit input signal (R_in,W_in, E_in) from the CPU 2 or the like, the attribute control state machine 22 causes a state transition and outputs a 3-bit signal (R_out,W_out, E_out) representing a post-transition state. Note that the value of the signal (R_in, W_in, E_in) can be updated by setting the register from the CPU 2 or the like.

The attribute control state machine 22 has a state holding register as a hardware control mechanism which stores an updated state in a nonvolatile memory every time a state transition occurs. When a power shutdown, reset, or the like occurs, the values of the state holding registers are initialized to (0,0,0). On the other hand, upon power activation, the state holding register senses a generated activation signal, reads the values stored in the nonvolatile memory, and sets the read values therein. Note that, for the purpose of protecting a nonvolatile memory area from which the stored state is to be read from an access, this mechanism and the nonvolatile memory area may also be accessible only by the hardware security module circuit 10.

FIG. 6 is a state transition diagram implemented by the attribute control state machine 22 shown in FIG. 5. The following is the respective states (R, W, E) in states S0 to S07. Note that "1" in (R, W, E) represents a data readable, writable, or executable state, while "0" in (R, W, E) represents a data unreadable, unwritable, or inexecutable state.

S0: (1,1,1): Data is readable, writable, and executable
S1: (1,1,0): Data is readable and writable
S2: (1, 0, 1): Data is readable and executable
S3: (1, 0, 0): Data is readable
S4: (0, 1, 0): Data is writable
S5: (0, 0, 1): Data is executable
S6: (0, 0, 0): Data is unreadable, unwritable, and inexecutable
S7: (0, 1, 1): Data is writable and executable The state S0 is an initial state. In the state S7, when an attacker or the like writes a program and executes the program, the system may be significantly affected thereby. Accordingly, there is no transition to the state S7. There is also no transition to the state S6. Note that, in the state S5, it is possible to read (fetch) the program (instruction) only to execute the program (instruction).

As shown in FIG. 6, a transition can be made from S0 to each of S0, S1, S2, S3, S4, and S5, from S1 to each of S1, S2, S3, and S5, from S2 to each of S1, S2, S4, and S5, from S3 to each of S3, S4, and S5, and from S4 to each of S3, S4, and S5. However, from S5, a transition can be made only to S5. In short, only changes to stricter (R, W, E) attributes (i.e., with fewer possible operations) are permitted except for a transition permitted between S1 and S2 and a transition permitted between S3 and S4. Note that, in FIG. 6, a transition is assumedly permitted between S1 and S2, but the transition between S1 and S2 need not necessarily be permitted.

Thus, in the attribute control state machine 22 according to the present first embodiment, once a transition is made to stricter (R, W, E) attributes as a result of state resetting after a power shutdown or reset, a transition can be made only to attributes stricter than the current attributes. In other words, in the attribute control state machine 22 according to the present first embodiment, a transition can be made from a first state to a second state in which possible operations are fewer than in the first state, resulting in a robust hardware mechanism. In addition, by placing the same number of the access control circuits 20 each having the attribute control state machine 22 as that of the memory areas, it is possible to control the (R, W, E) attributes of each of the memory areas which need protection. For example, by controlling a nonvolatile memory area where critical software, such as Bootloader, is placed to cause successive transitions from the state where the software is written (S1 or S4) to the state where the writing of the software is recognized by reading the software (S1 or S3) and to the state where only the execution of the software is permitted (S5) using the access control circuit 20 according to the present first embodiment, it is possible to inhibit plagiarism of the software and an attack using the software.

Figure 7:
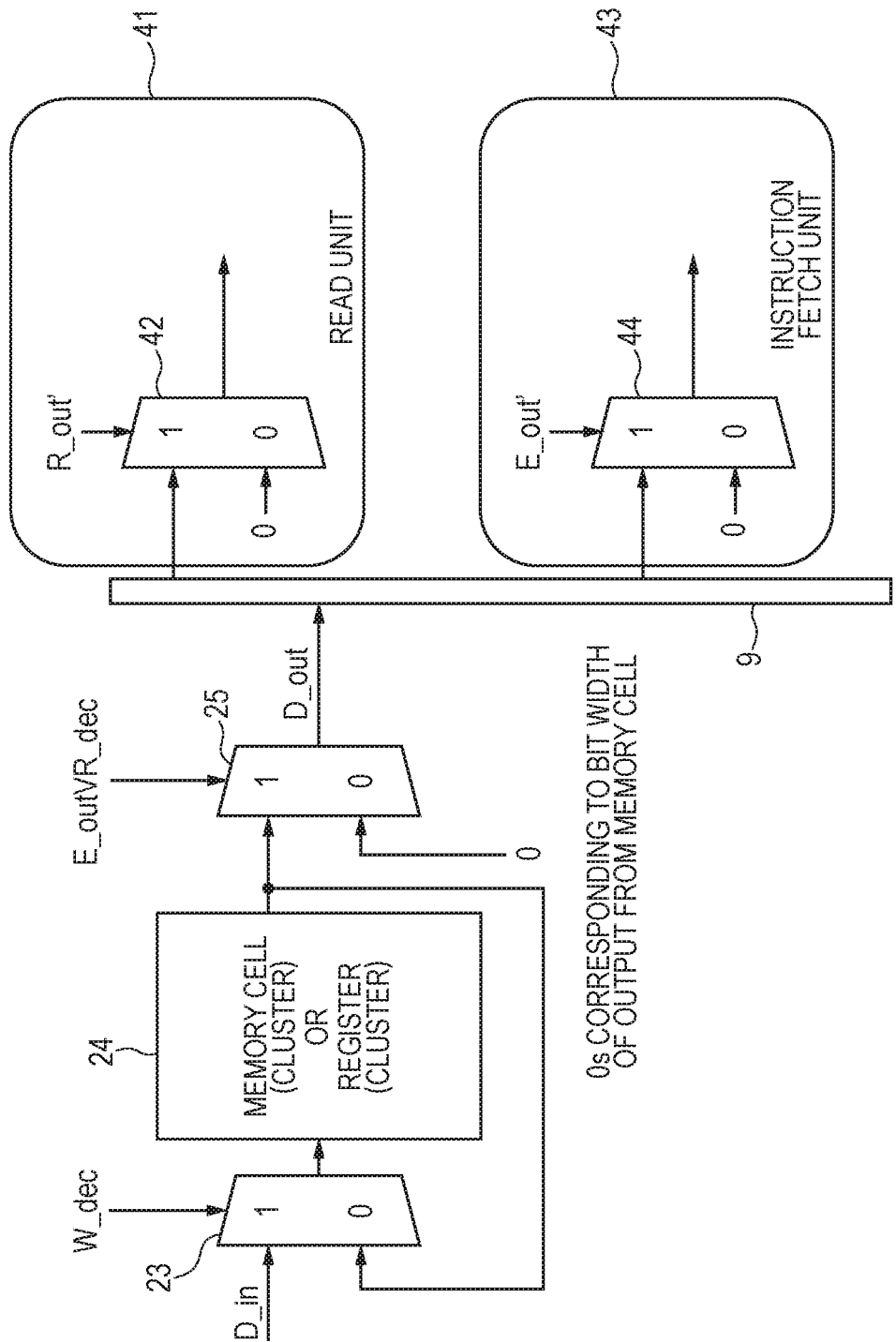
FIG. 7 shows an example of a coupling configuration between an (R, W, E) attribute control mechanism and a memory space.

FIG. 7 shows an example of a coupling configuration between the (R, W, E) attribute control mechanism and a memory space. The coupling configuration shown in FIG. 7 is configured using signals shown below in addition to the signals used in the attribute control state machine 22 shown in FIG. 5.

D_in is an input data signal to a memory (target memory area to be protected). D_out is an output data signal from the memory. Dec_Addr[i] is an address decode signal generated in the memory. When Dec_Addr[i] is "1", the address decode signal shows that the input address indicates the corresponding memory element [i]. When Dec_Addr[i] is "0", the address decode signal shows that the input address does not indicate the corresponding memory element [i].

Also, R_dec:=Dec_Addr[i]∧R_out is satisfied. Also, W_dec:=De_Addr[i]∧W_out is satisfied. Also, R_out' is a signal which is R_out associated with the one of a plurality of the target memory areas that is identified by the upper bit sequence of an address or the like and which is "1" when the (R,W, E) attributes are not specified for the memory area. Also, E_out' is a signal which is E_out associated with the one of the plurality of target memory areas that is identified by the upper bit sequence of the address or the like and which is "1" when the (R, W, E) attributes are not specified for the memory area.

Due to the configuration shown in FIG. 7, only when W_out is "1", a selector 23 writes data into the target memory area specified by the address in a memory cell/register 24. In addition, only when at least one of R_out and E_out is "1", a selector 25 reads data from the memory cell/register 24.

The read data is transferred to, e.g., the CPU 2 or the like via the bus 9. At this time, a data read unit 41 provided in the CPU 2 can read data using a selector 42 only when R_out is "1" (or when the (R, W, E) attributes are not specified for the memory area). Also, an instruction fetch unit 43 can fetch an instruction using a selector 44 only when E_out is "1" (or when the (R, W, E) attributes are not specified for the memory area). At this time, the CPU 2 can execute the read data as an instruction. When a bus master such as DMAC (Direct Memory Access Controller) is used also, the same data read control is performed herein.

By thus combining the configurations shown in FIGS. 6 and 7, only execution in accordance with the (R, W, E) attributes is allowed. Specifically, by combining the configurations shown in FIGS. 6 and 7, it is possible to control the (R, W, E) attributes of each of the memory areas which need protection and allow only hardware or software having an appropriate access authority to perform read, execute, and write operations to the memory area which needs protection. As described above, once a stricter access limit is set, the set access limit cannot be returned to a less strict access limit by using an input signal to the (R, W, E) attribute control or changing the settings of an input register. This access limit may be maintained even when a power shutdown or reset is performed. Even if an OS (Operating System) is cracked, privileges are illegally elevated, and malicious software is executed, the malicious software can make only an access compliant with the access control over a target area to be protected which is determined by the (R, W, E) attribute control. As a result, memory protection under appropriate access control becomes possible. Accordingly, by applying the configuration shown in FIGS. 6 and 7 to FIG. 3, an access to the error detection circuit 4 can be implemented only by the hardware security module circuit 10, which will be described below.

Figure 8:
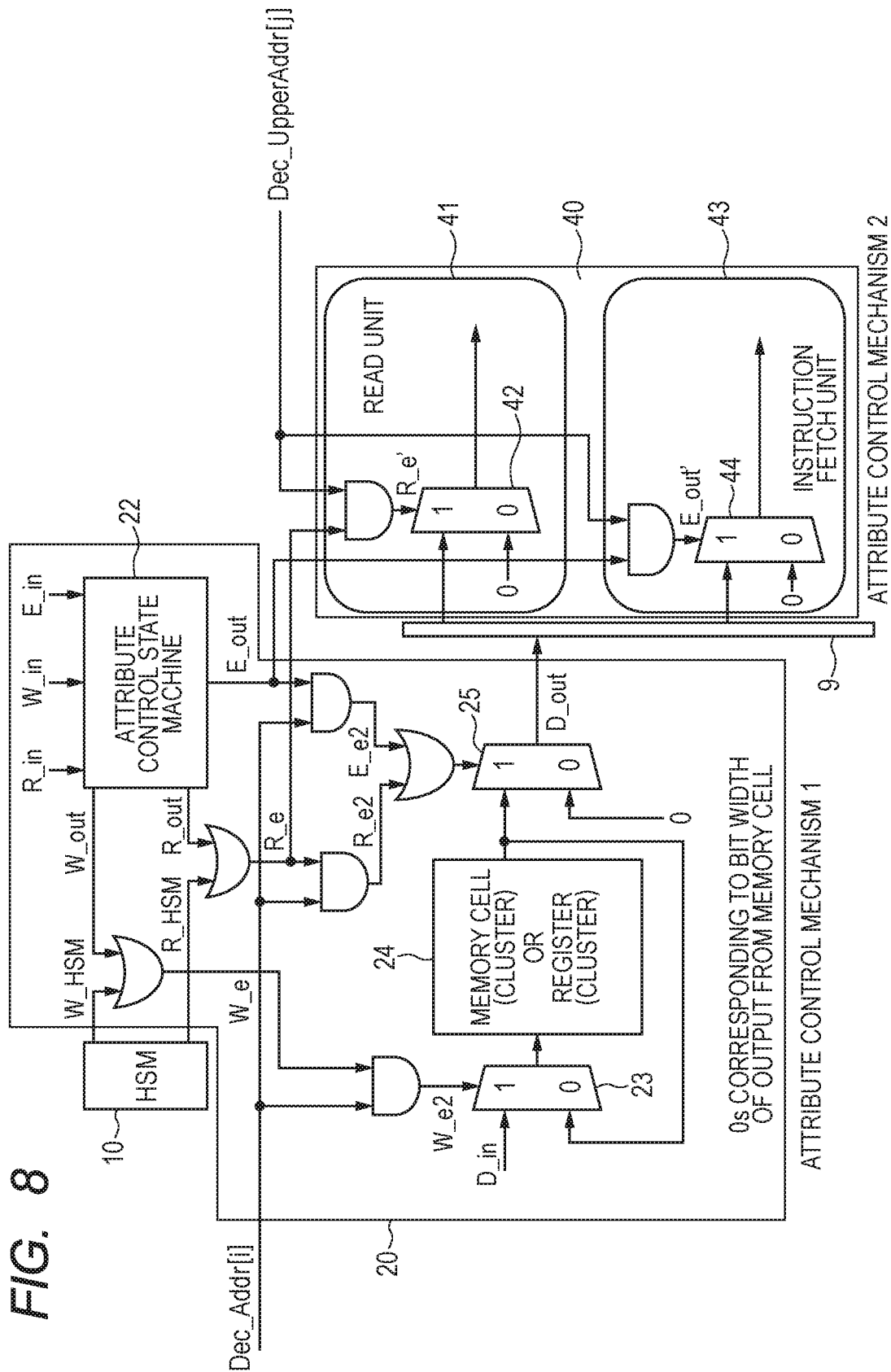
FIG. 8 is a view showing a coupling configuration among the hardware security module circuit, the access control circuit provided in an error detection circuit, and the access control circuit provided in a CPU according to the first embodiment.

FIG. 8 is a view showing a coupling configuration among the hardware security module circuit 10, the access control circuit 20 provided in the error detection circuit 4, and the access control circuit 40 provided in the CPU 2 according to the first embodiment. The coupling configuration shown in FIG. 8 is configured using the following signals in addition to the signals used in the attribute control state machine 22 shown in FIG. 5.

D_in is an input data signal to a memory, which is input to the selector 23. D_out is an output data signal from the memory, which is output from the selector 25. R_HSM is a mandatory Read signal issued (generated) in the hardware security module circuit 10. When R_HSM is "1", R_HSM indicates that data is readable while, when R_HSM is "0", R_HSM indicates that data is unreadable. W_HSM is a mandatory Write signal issued (generated) in the hardware security module circuit 10. When W_HSM is "1", W_HSM indicates that data is writable while, when W_HSM is "0", W_HSM indicates that data is unwritable.

Also, R_e=R_out∧R_HSM is satisfied and, when R_e is "1", R_e indicates that data is readable while, when R_e is "0", R_e indicates that data is unreadable. W_e=W_out∧W_HSM is satisfied and, when W_e is "1", W_e indicates that data is writable while, when W_e is "0", W_e indicates that data is unwritable. Dec_Addr[i] is an address decode signal generated in the memory. When Dec_Addr[i] is "1", Dec_Addr[i] indicates that an input address indicates the corresponding memory element [i] while, when Dec_Addr[i] is "0", Dec_Addr[i] indicates that the input address does not indicate the corresponding memory element [i].

In addition, R_e2:=Dec_Addr[i]∧R_e is satisfied. Also, W_e2:=Dec_Addr[i]∧W_e is satisfied. Also, E_e2: = Dec_Addr[i]∧E_out is satisfied. Dec_UppweAddr[j] is an address decode signal for identifying the corresponding area by the upper bit sequence of the address or the like since there may be a plurality of the target memory areas. Also, R_e':=Dec_UpperAddr[j]∧R_e is satisfied. R_e' is a signal which is R_e associated with the one of the plurality of target memory areas that is identified by the upper bit sequence of the address or the like and which is "1" when the (R, W, E) attributes are not specified for the memory area. Also, E_out':=Dec_UpperAddr[j]∧E_out is satisfied. E_out' is a signal which is E_out associated with the one of the plurality of target memory areas that is identified by the upper bit sequence of the address or the like and which is "1" when the (R, W, E) attributes are not specified for the memory area. In the configuration illustrated in FIG. 8, only when at least one of W_out and W_HSM is "1", the selector 23 writes data into the target memory area specified by the address in the memory cell/register 24. Specifically, even when the value specified for R_out in the (R, W, E) attributes is "0", the hardware security module circuit 10 can forcibly bring the memory area into a data writable state. Only when at least any of R_out, E_out, and R_HSM is "1", the selector 25 reads data from the memory cell/register 24. Specifically, even when each of the values specified for R_out and E_out in the (R, W, E) attributes is "0", the hardware security module circuit 10 can forcibly bring the memory area into a data readable state.

The read data is transferred to, e.g., the CPU 2 or the like via the bus 9. At this time, the data read unit 41 of the access control circuit 40 provided in the CPU 2 can read data using the selector 42 only when at least one of R_out and R_HSM is "1" (or when the (R, W, E) attributes are not specified for the memory area). In other words, even when the value specified for R_out is "0" in the (R, W, E) attributes, the hardware security module circuit 10 can forcibly bring the CPU 2 into the data readable state. On the other hand, the instruction fetch unit 43 of the access control circuit 40 allows the selector 44 to fetch an instruction when E_out is "1" (or when the (R, W, E) attributes are not specified for the area). In short, the CPU 2 can execute the read data as an instruction.

By thus combining the configurations shown in FIGS. 6 and 8, not only the effect achieved by the configuration shown in FIG. 7 is obtained, but also the signals R_HSM and W_HSM generated in the hardware security module circuit 10 allow data to be read from the target memory area and written thereto irrespective of the (R, W, E) attributes. Specifically, the configuration shown in FIG. 8 allows read, execute, and write operations to be performed to the memory area only by the hardware security module circuit 10 in disregard of access control over the target area to be protected which is determined under the (R, W, E) attribute control. This allows data or program writing to a data unwritable region or the like to be executed. When only execution of a program is allowed in order to ensure the confidentiality of the program, the program cannot be updated. However, the configuration shown in FIG. 8 allows the program to be updated only by the hardware security module circuit 10. It is desirable herein that such data writing by the hardware security module circuit 10 to the target memory area to be protected disregarding the access control is performed only in the data transmission/reception sequence described later. By applying the configurations shown in FIGS. 6 and 8 to FIG. 3, only the hardware security module circuit 10 is allowed to access the error detection circuit 4.

Figure 9:
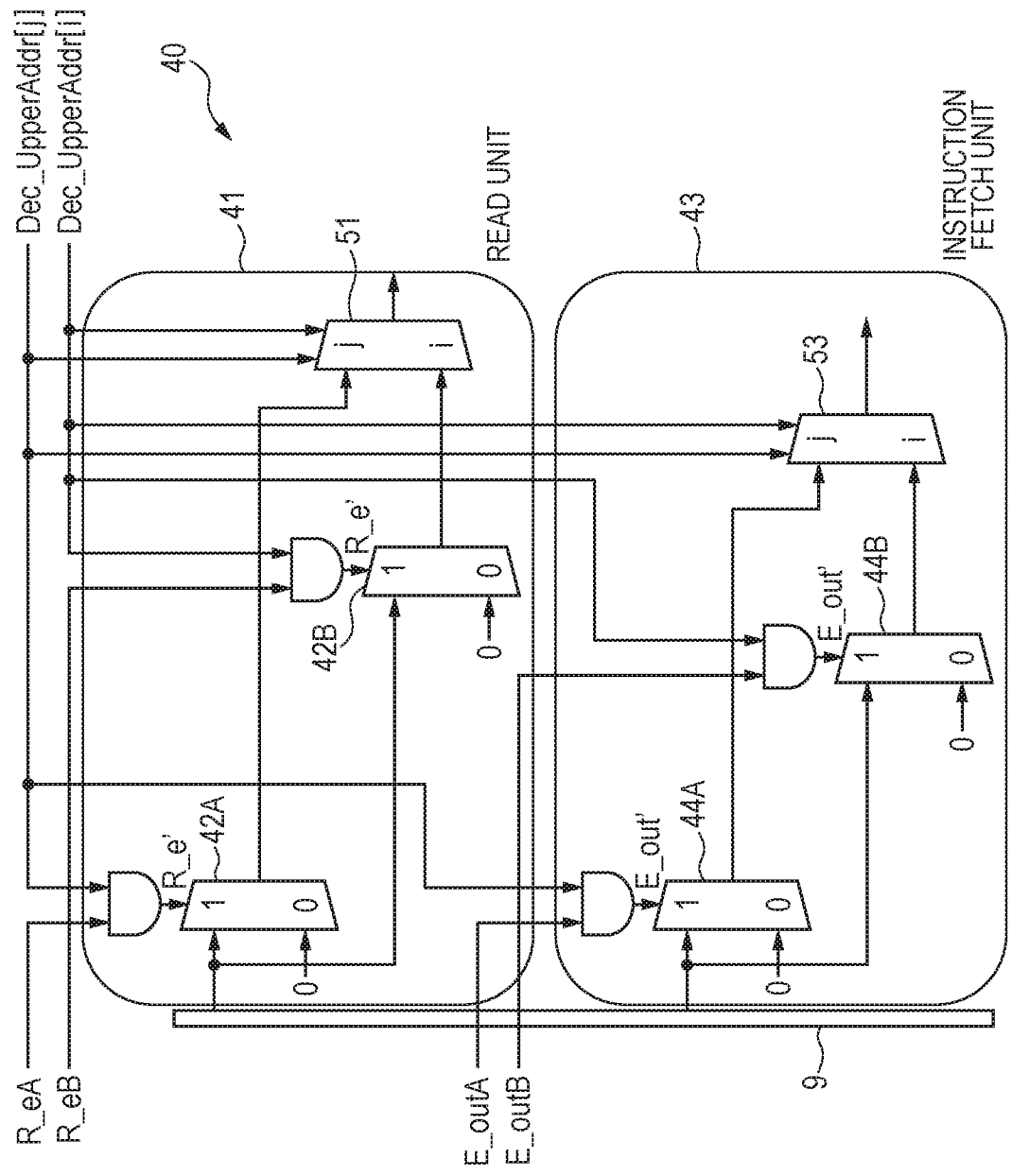
FIG. 9 is a view showing a configuration of a data read unit and an instruction fetch unit when the access control circuit is provided in each of the plurality of components shown in FIG. 4.

FIG. 9 is a view showing a configuration of the data read unit 41 and the instruction fetch unit 43 when the access control circuit 20 is provided in each of the plurality of components shown in FIG. 4. FIG. 9 shows the configuration in which, from two access control circuits 20A and 20B ((R, W, E) attribute control mechanism #1), R_eA and E_outA and R_eB and E_outB are respectively received. Dec_UpperAddr[j] is an address decode signal for identifying an area associated with the access control circuit 20A, while Dec_UpperAddr[i] is an address decode signal for identifying an area associated with the access control circuit 20B.

As shown in FIG. 9, the data read unit 41 has selectors 42A and 42B for each pair of the access control circuits 20A and 20B. The selector 42A reads data only when at least one of R_out and R_HSM is "1" (R_eA=1) in the access control circuit 20A. On the other hand, the selector 42B reads data only when at least one of R_out and R_HSM is "1" (R_eB=1) in the access control circuit 20B. A selector 51 outputs the data read from the selector 42A or the sector 42B in accordance with the address decode signal (Dec_UpperAddr[j] or Dec_UpperAddr[i]). The instruction fetch unit 43 has selectors 44A and 44B for each pair of the access control circuit 20A and 20B. The selector 44A fetches an instruction only when E_outA is "1" in the access control circuit 20A. On the other hand, the selector 44B fetches an instruction only when E_outB is "1" in the access control circuit 20B. A selector 53 outputs the data read from the selector 44A or the sector 44B in accordance with the address decode signal (Dec_UpperAddr[j] or Dec_UpperAddr[i]).

Note that FIG. 9 shows an example of a configuration in which, from the two access control circuits 20A and 20B ((R, W, E) attribute control mechanism #1), R_eA and E_outA and R_eB and E_outB are respectively received, but the number of the access control circuits 20 is arbitrary. Expansion to the N (N is an integer satisfying N>2) access control circuits 20 can be achieved by adding an upper address decode result signal, adding units (selectors 42 and 44) which control data reading from the bus 9, and replacing the final-stage selectors 51 and 53 with a selector which outputs a signal in accordance with the N address decode results.

(Data Transmission/Reception Sequence)

Next, a description will be given of the data transmission/reception sequence performed by the semiconductor device 1 according to the first embodiment. The data transmission/reception sequence described below is an operation in accordance with a data transmission/reception protocol considering functional safety and having falsification resistance and confidentiality, where the "considering functional safety" mentioned herein indicates taking measures against a data error in a communication path and a data error due to a hardware fault.

Figure 10:
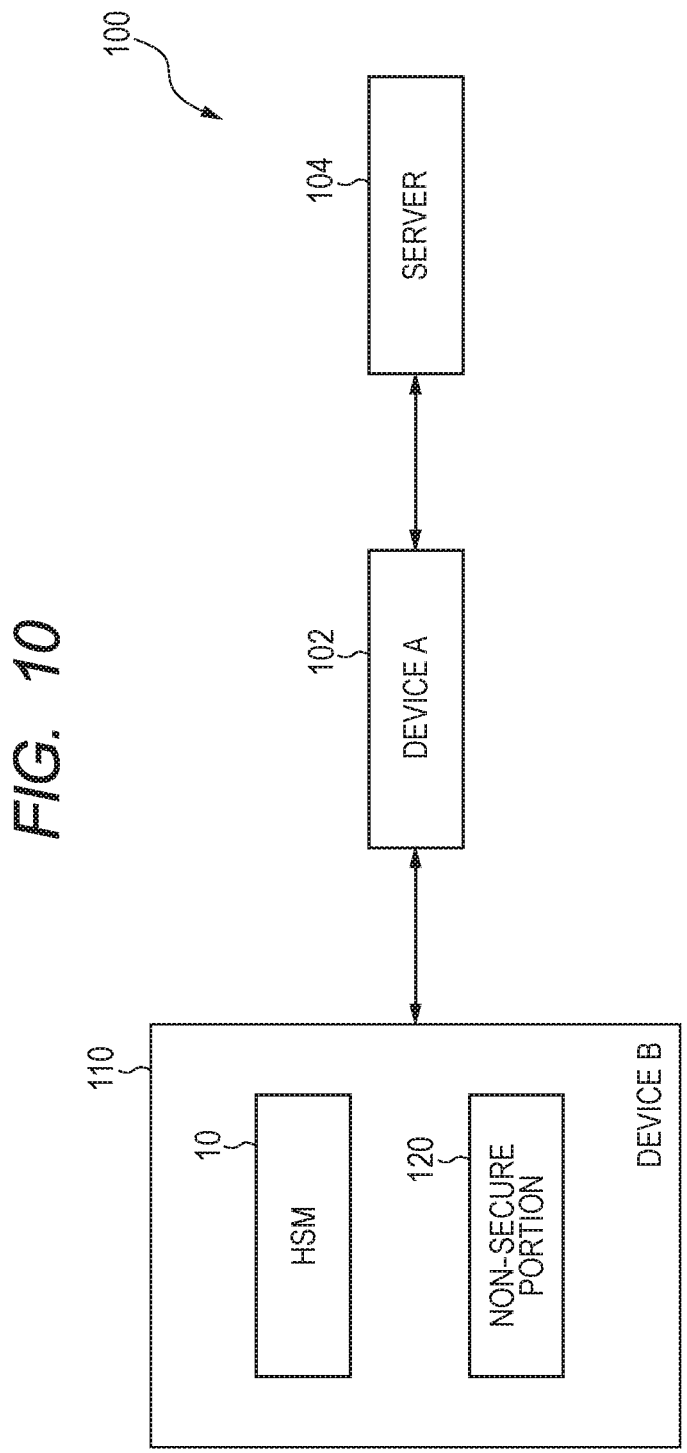
FIG. 10 is a view showing an authentication system in which a data transmission/reception sequence according to the first embodiment is performed.

FIG. 10 is a view showing an authentication system 100 in which the data transmission/reception sequence according to the first embodiment is performed. The authentication system 100 is, e.g., an in-vehicle network system applied to a vehicle such as an automobile. The authentication system 100 has a server 104, a device A102 (first device), and a device B110 (second device).

The device A102 and the device B110 are provided in the vehicle. The server 104 is provided outside the vehicle. The device A102 is, e.g., a gateway (central gateway) which receives a signal from the outside of the vehicle (such as the server 104). The device B110 is, e.g., an MCU which controls the individual components (such as a brake, a motor, an engine, and a steering) of the vehicle. The device A102 is coupled communicatively to the server 104 via a wireless system or the like. The device A102 and the device B110 are communicatively coupled to each other either wiredly or wirelessly. The device B110 corresponds to the semiconductor device 1 according to the first embodiment. In short, the device A102 is the device outside the semiconductor device 1. The device B110 includes the hardware security module circuit 10 and a non-secure portion 120 (such as the CPU 2, the program memory 3, the error detection circuit 4, the input/output interface 5, and the work memory 6) other than the hardware security module circuit 10. Note that the device A102 may also include the same components as those of the device B110.

Figure 11:
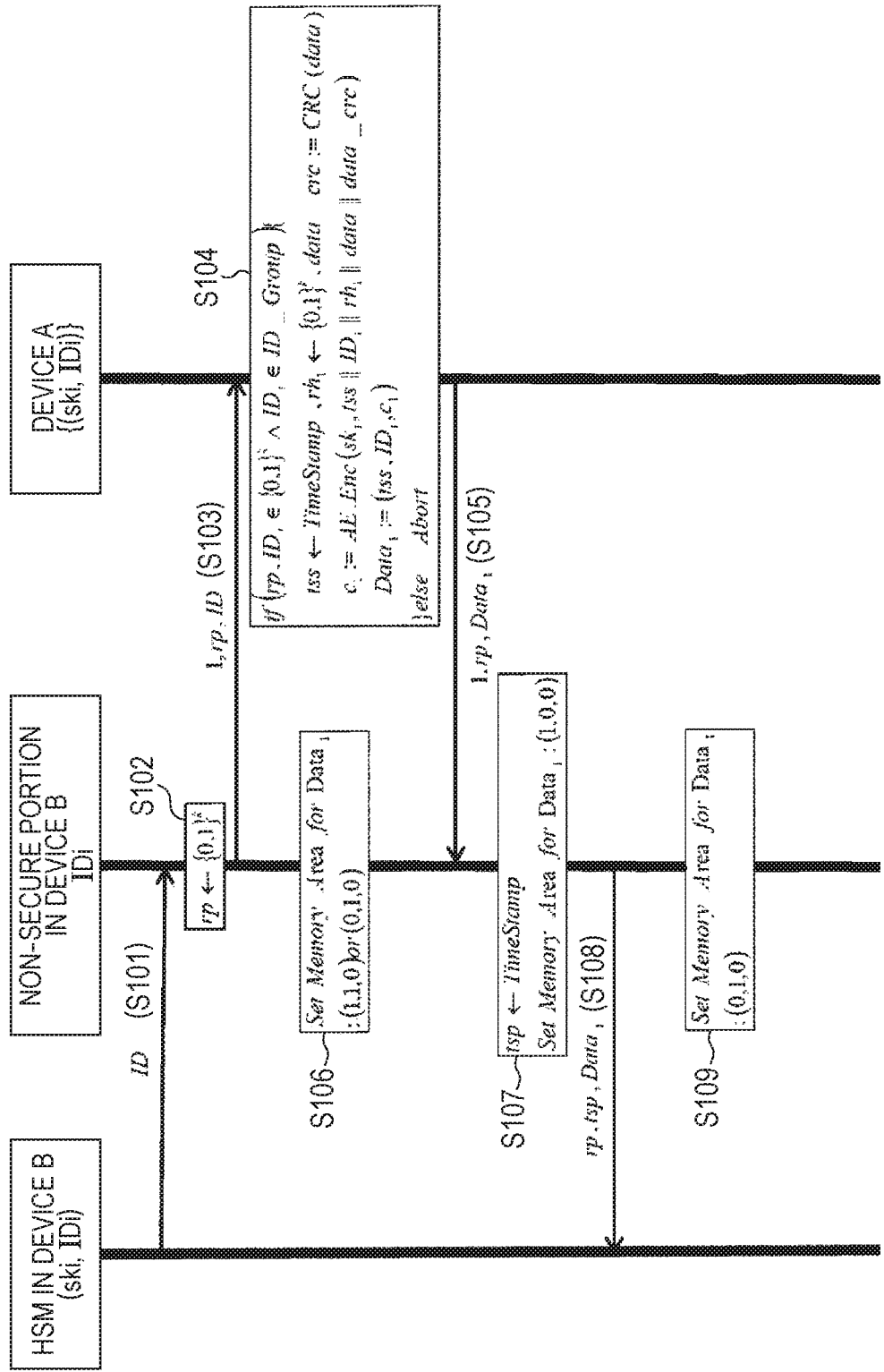
FIG. 11 is a sequence diagram showing the data transmission/reception sequence according to the first embodiment.
Figure 12:
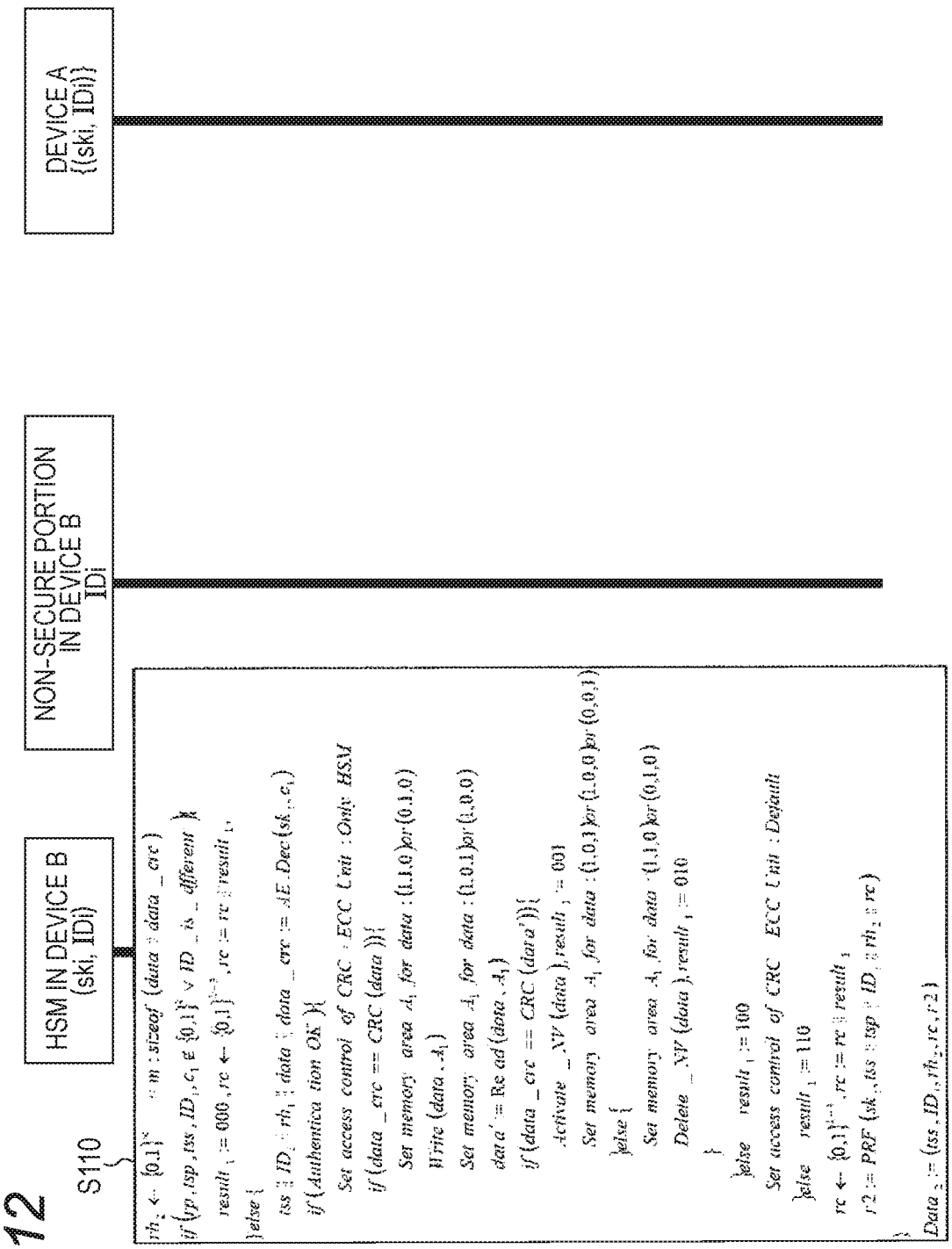
FIG. 12 is a sequence diagram showing the data transmission/reception sequence according to the first embodiment.
Figure 13:
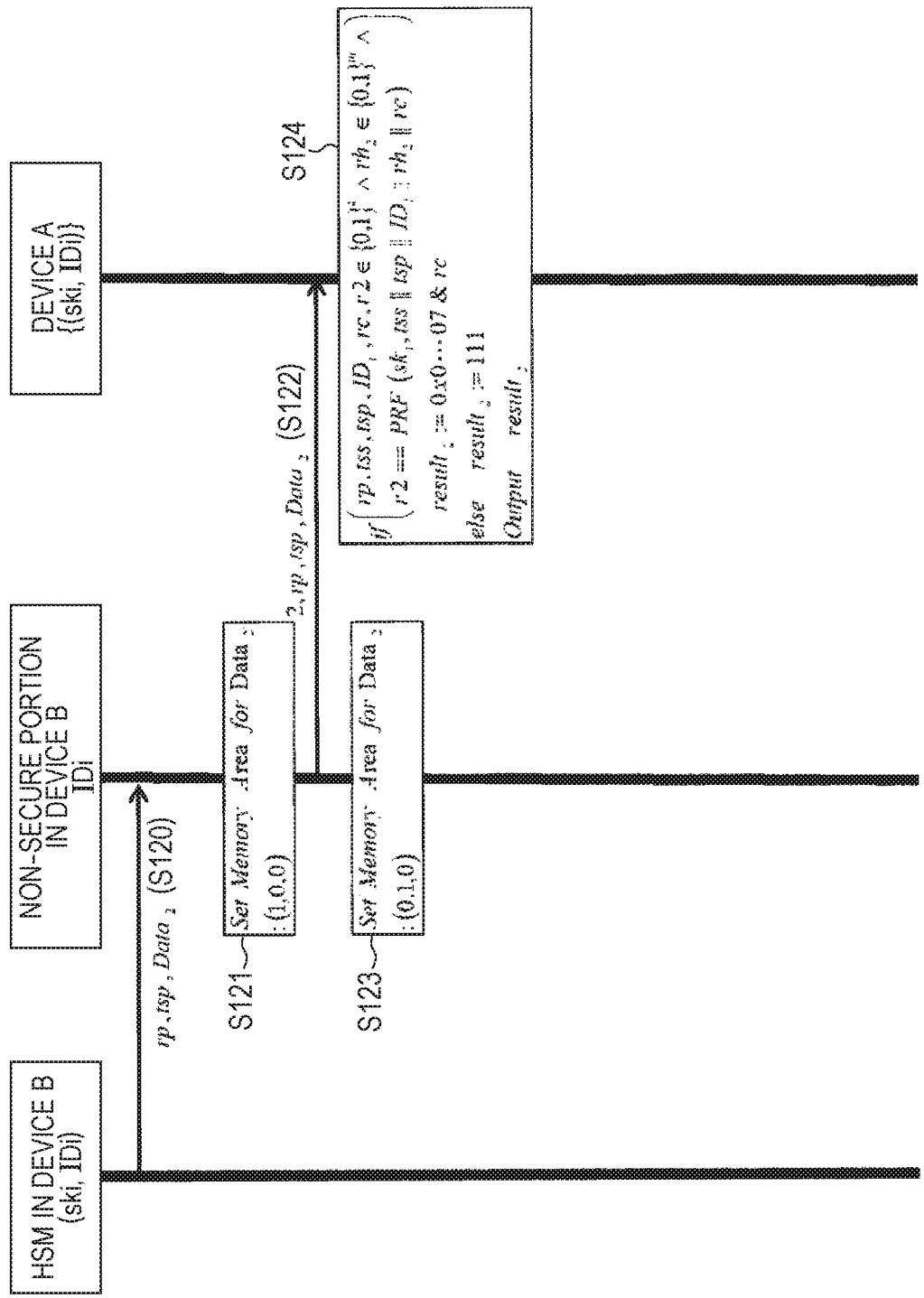
FIG. 13 is a sequence diagram showing the data transmission/reception sequence according to the first embodiment.
Figure 14:
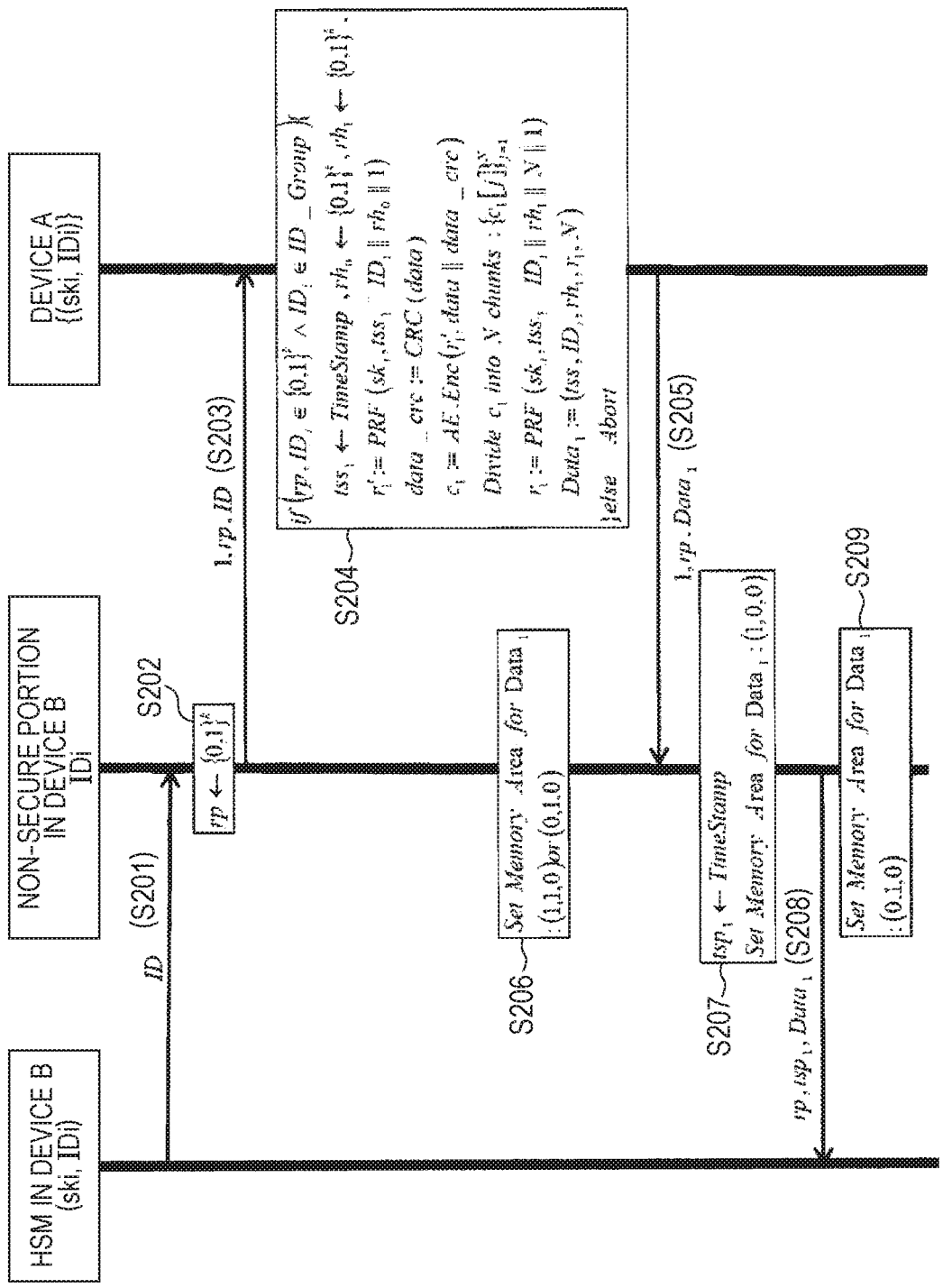
FIG. 14 is a sequence diagram showing a data transmission/reception sequence executed in an authentication system according to a modification of the first embodiment.
Figure 15:
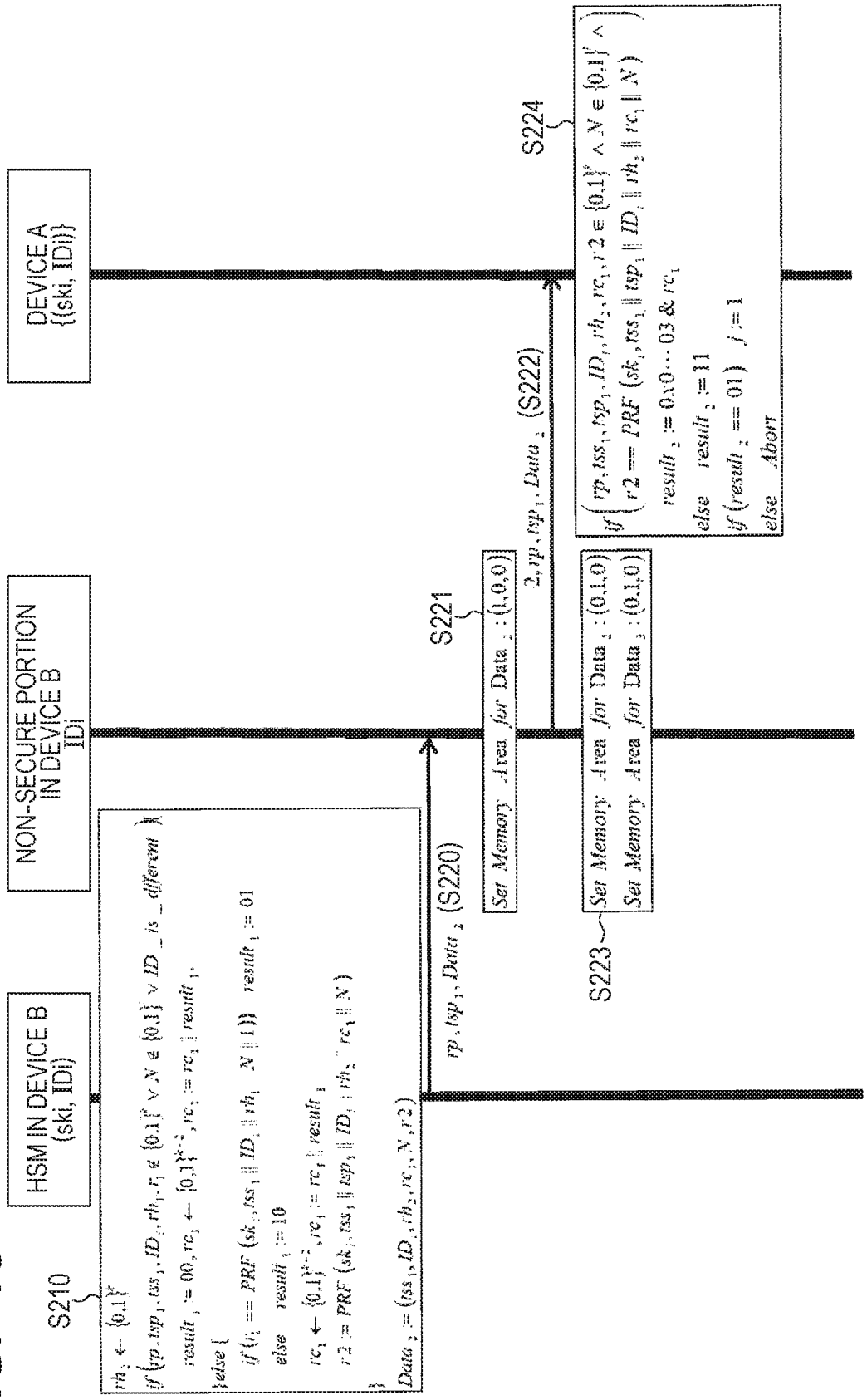
FIG. 15 is a sequence diagram showing the data transmission/reception sequence executed in the authentication system according to the modification of the first embodiment.
Figure 16:
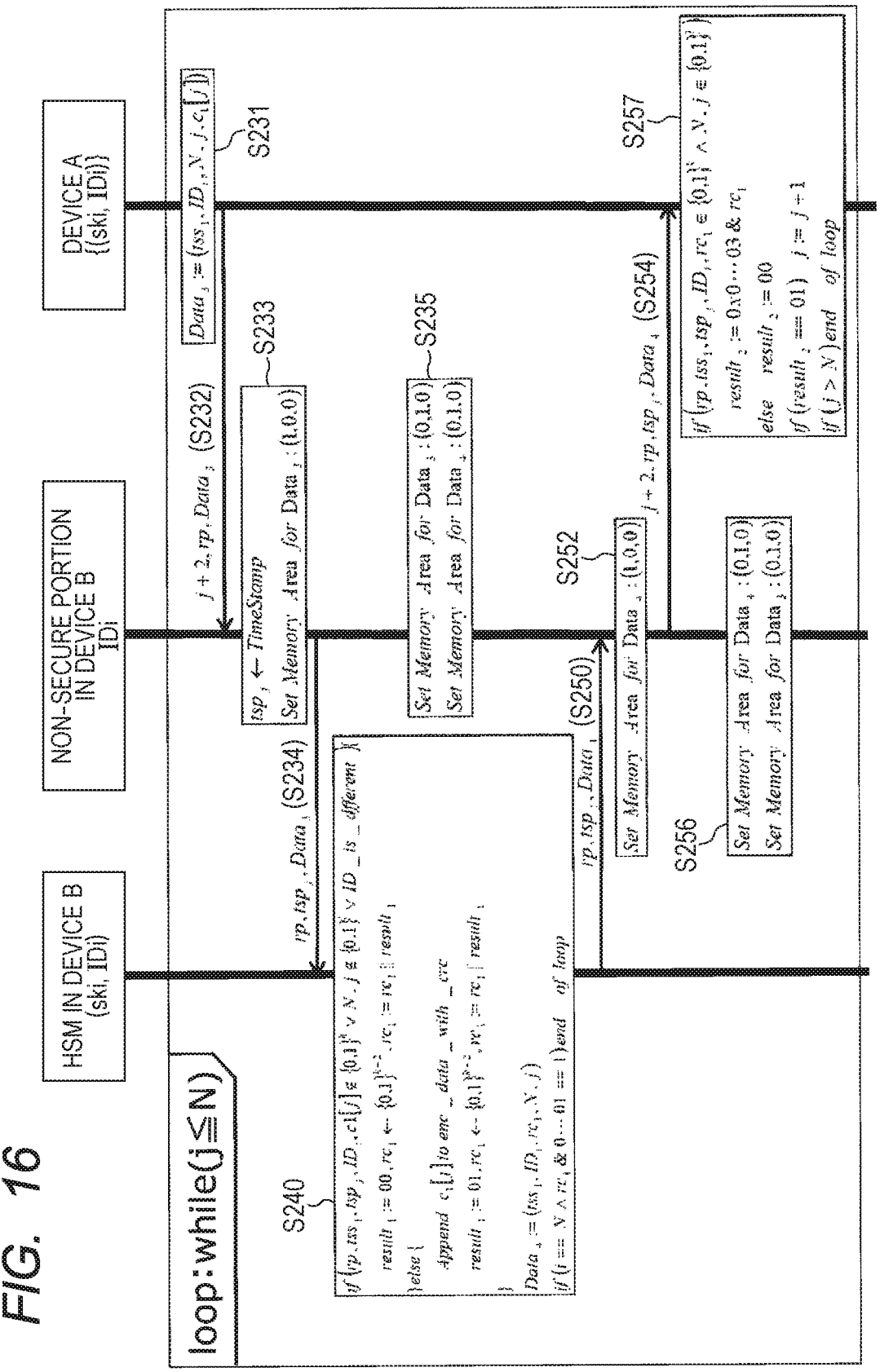
FIG. 16 is a sequence diagram showing the data transmission/reception sequence executed in the authentication system according to the modification of the first embodiment.
Figure 17:
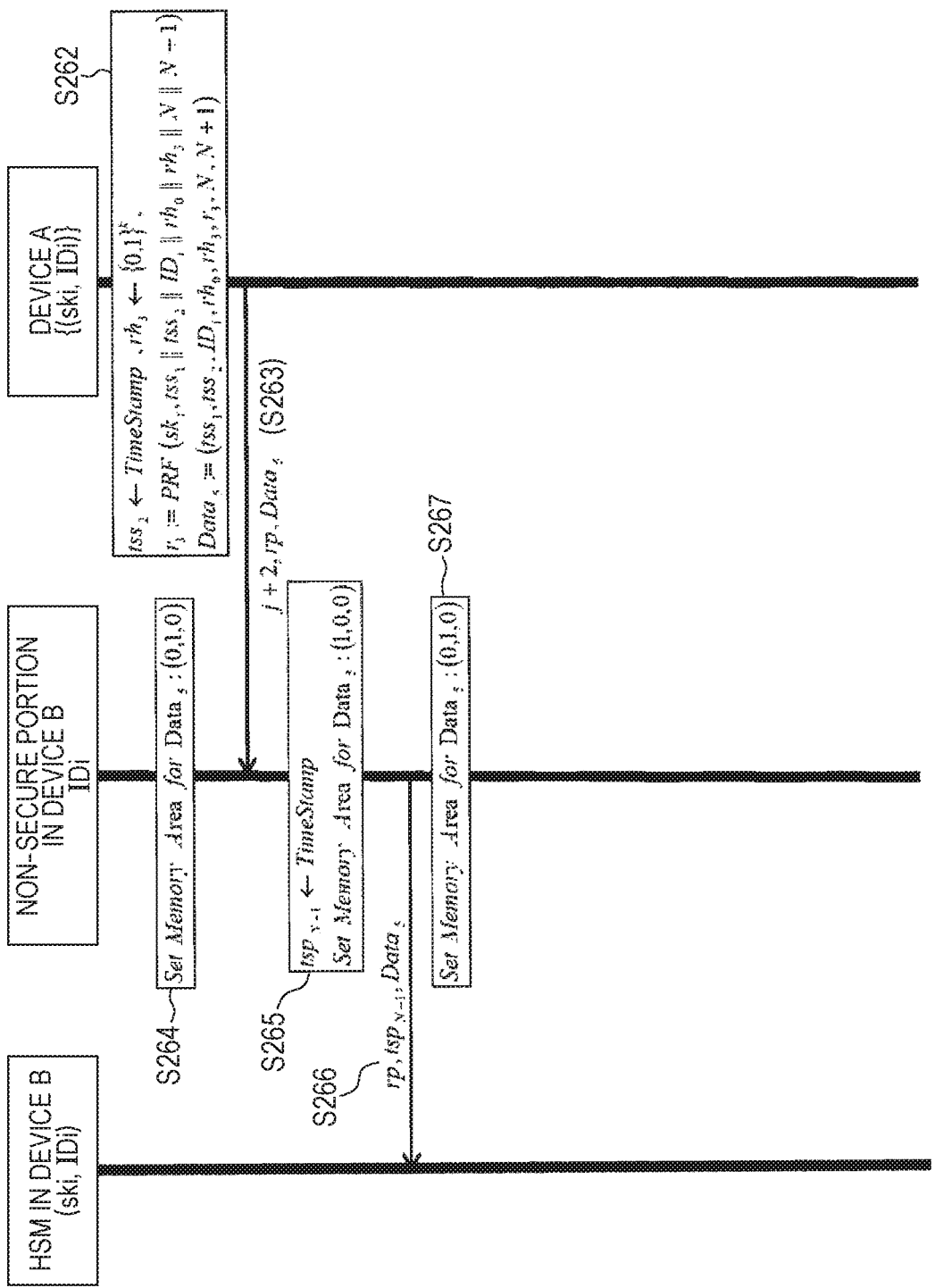
FIG. 17 is a sequence diagram showing the data transmission/reception sequence executed in the authentication system according to the modification of the first embodiment.
Figure 19:
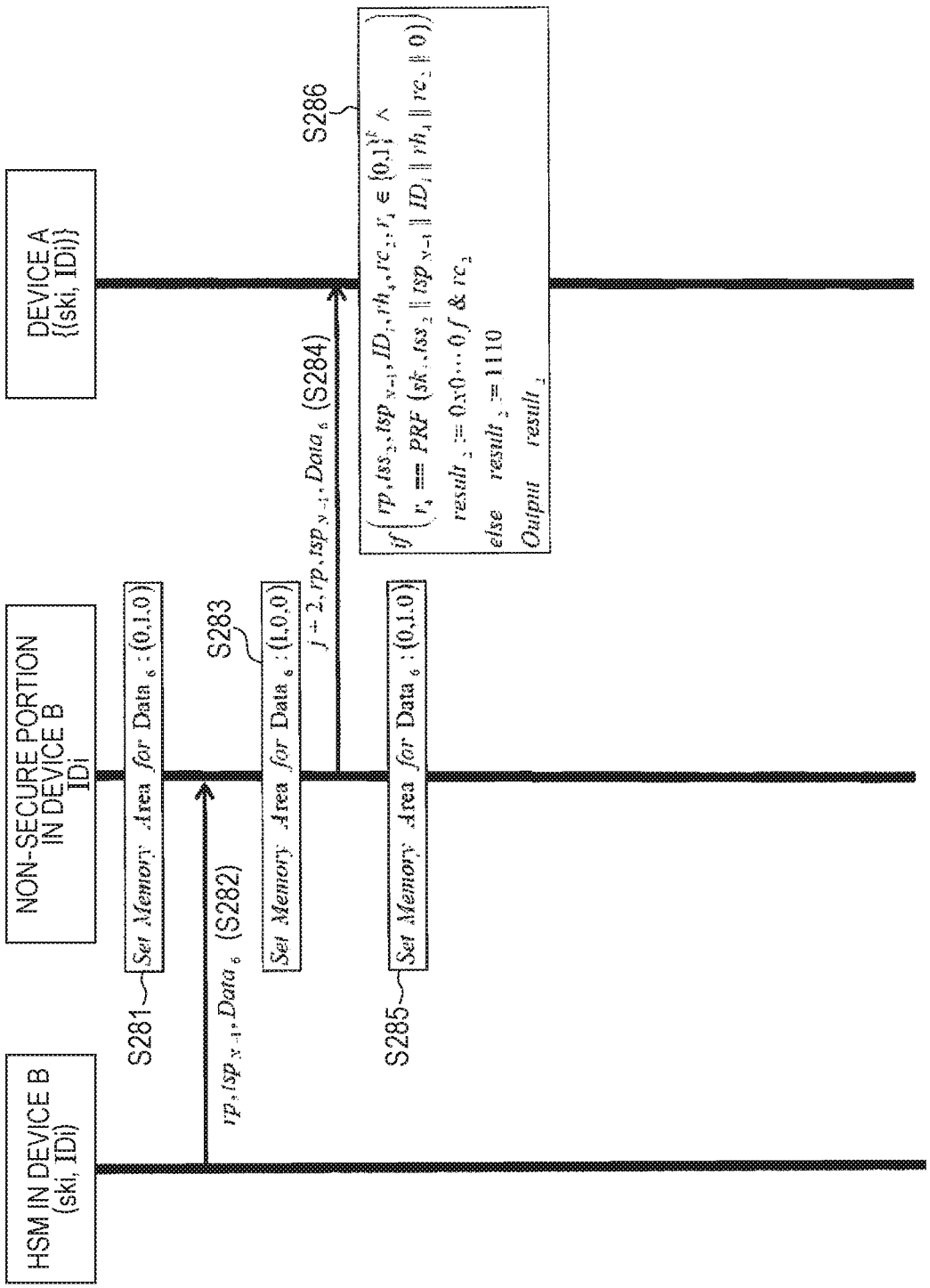
FIG. 19 is a sequence diagram showing the data transmission/reception sequence executed in the authentication system according to the modification of the first embodiment.

FIGS. 11 to 13 are sequence diagrams showing the data transmission/reception sequence according to the first embodiment. It is assumed that, as the initial settings of a common symmetrical key to the devices A102 and B110, the following settings are made in advance.

The device A102 receives 1^k input thereto, where k is a security parameter (k=128 or 256). The device A102 selects a symmetrical key ski←{0, 1}^k (i.e., the bit length of ski is k) for each of the devices B110 to which an authentication identifier IDi∈{0, 1}^k is assigned and transmits (ski, IDi) to the device B110. The device B110 stores (ski, IDi) in a nonvolatile memory. The device also B110 transmits a set ID of the authentication identifier IDi to the device A102. It is assumed herein that the total number of the devices B110 is N and i∈[1,N] is satisfied. For example, it may also be possible that, by making such initial settings before the devices B110 are shipped, a specific key is set to each of the devices B110 and stored in the device A102. It is also assumed that the non-secure portion 120 of each of the devices B110 is allowed to read IDi stored in the hardware security module circuit 10 embedded in the device B110, but is not allowed to perform an override operation and an erase operation under appropriate access control.

(1) Construction of Device Authentication Information in Device A

The non-secure portion 120 of each of the devices B110 acquires IDi from the hardware security module circuit 10 (Step S101). The non-secure portion 120 may read IDi from the hardware security module circuit 10 or may also receive IDi from the hardware security module circuit 10. On acquiring IDi, the non-secure portion 120 selects session information $rp \in \{0,1\}^{\wedge}k$ for session management (Step S102) and transmits (1, rp, IDi) to the device A102 (Step S103). In (1,rp,IDi), "1" shows a first process in the session information rp. On receiving (1, rp, IDi), the device A102 performs the following process (Step S104), whereby the device B110 is authenticated.

1. It is verified whether or not rp, $IDi \in \{0,1\}^{\wedge}k$ and $IDi \in ID$ are satisfied. In other words, the bit lengths of rp and IDi are verified and it is verified whether or not IDi has been registered. If rp, $IDi \in \{0,1\}^{\wedge}k$ and $IDi \in ID$ are not satisfied, the process is ended. If rp, $IDi \in \{0,1\}^{\wedge}k$ and $IDi \in ID$ are satisfied, the following process is executed.

2. The current time is selected as tss←TimeStamp.

3. A random number is selected as $rh1 \leftarrow \{0,1\}^{\wedge}k$.

4. For transmitted data, CRC or ECC is calculated. Assuming that, e.g., CRC is calculated, data_crc:=CRC (data) is set up.

5. c1:=AE.Enc(ski, tss||IDi||rh1||data||data_crc) is calculated.

Then, the device A102 sets up Data1:=(tss, IDi, c1) and transmits (1, rp, Data1) to the non-secure portion 120 of the device B110 (Step S105). The operator "||" represents bit concatenation, while c1 is authenticated encryption data. Also, AE.ENc is an authenticated ciphertext, which may also be AES-GCM or AES-CCM.

Alternatively, AE.Enc may also be configured as follows as a combination of, e.g., a ciphertext and a CMAC value. This is particularly effective in such a case where an authenticated ciphertext cannot be used.

A random number is selected as $rh0 \leftarrow \{0,1\}^{\wedge}m$, where m:=size of(data||data_crc) is satisfied.

r1':=PRF(ski, tss||IDi||rh1||rh0||2)
c1':=Enc(r1', tss||IDi||rh1||data||data_crc)
r1:=PRF(ski, tss||IDi||rh1||c1'||1)

In this case, c1 in Data1 satisfies c1:=(rh1, rh0, c1', r1). In the foregoing, PRF is a pseudo-random function which is used as a CMAC value, Enc is a common key block encryption which is, e.g., AES-CBC, r1' is a common key for issuing a signature for the pseudo-random function, and r1 is the result of signed encryption.

(2) Data Decryption, Data Storage, and Result Collection in Device B

The non-secure portion 120 of each of the devices B110 sets the (R, W, E) attributes of the memory area in which Data1 is stored to (1, 1, 0) or (0, 1, 0) using, e.g., the access control circuit 20 described above (Step S106). In other words, the access control circuit 20 sets the (R, W, E) attributes such that data is writable and a program is inexecutable. The non-secure portion 120 also selects the current time as tsp←TimeStamp. On receiving Data1, the non-secure portion 120 sets the (R, W, E) attributes of the memory area of the non-secure portion 120 to (1, 0, 0) using, e.g., the access control circuit 20 (Step S107). In short, the access control circuit 20 sets the (R, W, E) attributes such that data is only readable.

Then, the non-secure portion 120 transmits (rp, tsp, Data1) to the hardware security module circuit 10 of the device B110 (Step S108). At this time, when the transmission is completed, the non-secure portion 120 sets the (R, W, E) attributes of the memory area of the non-secure portion 120 to (0,1,0) using, e.g., the access control circuit 20, and then erases Data1 (Step S109). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tsp, Data1=(tss, IDi, c1)), the hardware security module circuit 10 of the device B110 sets up $rh2 \leftarrow \{0,1\}^{\wedge}m$ on the assumption that m is the size of data||data_crc (i.e., on the assumption that the bit length of rh2 is m) and performs the following process (Step S110). Thus, the process of authenticating the device A102, verifying the received data, and decrypting the data is performed.

1. It is verified whether or not rp, tsp, tss, IDi, $c1 \in \{0,1\}^{\wedge}k$ is satisfied, i.e., whether or not the length of each data item has a prescribed value. Then, it is checked whether or not IDi matches the identifier of the device B110. Thus, simple screening is performed. Note that, when c1:=(rh1, rh0, c1', r1) is satisfied, it is also verified whether or not rh1, rh0, c1', $r1 \in \{0,1\}^{\wedge}k$ is satisfied.

If rh1, rh0, c1', $r1 \in \{0,1\}^{\wedge}k$ is not satisfied, result1:=000, $rc \leftarrow \{0,1\}^{\wedge}(k-3)$, rc:=rc||result1 is set up, and a process as will be described later is no longer executed. The value "000" of result1 used herein shows that an unauthorized access has been made. If rh1, rh0, c1', $r1 \in \{0,1\}^{\wedge}k$ is satisfied, the following operation is performed.

2. tss||IDi||rh1||data||data_crc=AE.Dec(ski, c1), i.e., decryption in accordance with authenticated encryption is performed to verify whether or not authentication is successful. If the authentication is unsuccessful, result1 is set to satisfy result1:=110 showing that the result of the authenticated encryption is a failure. If the authentication is successful, the process in and subsequent to 3. is performed.

Note that, when c1:=(rh1, rh0, c1', r1) is satisfied, it is verified whether or not r1=PRN(ski, tss||ID||rh1||c1'||1) is satisfied (i.e., a signature check is performed). When r1=PRN(ski, tss||ID||rh1||c1'||1) is not satisfied, result1 is set to satisfy result1:=110. When r1=PRN(ski, tss||ID||rh1||c1'||1) is satisfied, the following operation is performed. Specifically, after r1':=PRN(ski, tss||ID||rh1||rh0||2), tss||IDi||rh1||data||data_crc:=Dec(r1', c1') is executed as the decryption process, the process in and subsequent to 3 is executed. Note that Dec used herein is decryption in accordance with the common key block encryption, which is the decryption in, e.g., an AES-CBC mode.

3. For example, the access control circuit 20 sets access control such that only the hardware security module circuit 10 is allowed to access the error detection circuit 4. Using the error detection circuit 4, the CRC of data obtained as a result of the decryption is calculated using CRC(data), and it is verified whether or not the calculated CRC of data matches data_crc. When there is no match, result1 is set to satisfy result1:=100 showing that the CRC checking has failed. When there is a match, the following operation is executed.

4. The (R, W, E) attributes of the area A1 where data obtained as a result of the decryption is stored are set to (1, 1, 0) or (0, 1, 0) (i.e., such that data is writable and a program is inexecutable), and data is stored (written) in the area A1. Thus, when data that has passed the CRC checking (i.e., in which no error is detected) is written, it is set that only the hardware security module circuit 10 is allowed to write data. This inhibits an attacker or the like from falsifying the data. In addition, the (R, W, E) attributes of the area A1 are set to (1, 0, 1) or (1, 0, 0) (i.e., such that data is readable and unwritable), and data is read again from the area A1 and set as data'. The CRC of data' is calculated using CRC(data'), and it is verified whether or not the CRC of data' matches data_crc. Since the data may be broken when written in the nonvolatile memory, to improve fault tolerance, the data is thus read after being written and subjected to the CRC checking. At this time, since it is set that only the hardware security module circuit 10 is allowed read the data, it is possible to inhibit an attacker or the like from falsifying the data when the data is read for the detection of an error that has occurred during the writing of the data.

When there is a match between CRC(data') and data_crc, the (R, W, E) attributes of the area A1 are set to (1, 0, 1), (1, 0, 0), or (0, 0, 1) (i.e., such that data is unwritable). When the area A1 is a nonvolatile memory portion, an activation process is performed thereon. Then, result1 is set to satisfy result1:=001 showing that all the processes are successful. When data is a critical program and needs confidentiality, the (R, W, E) attributes are set to (0, 0, 1) such that the program is only executable. When there is no match between CRC(data') and data_crc, the (R, W, E) attributes of the area A1 are set to (1, 1, 0) or (0, 1, 0) (i.e., such that data is writable and the program is inexecutable), and data written in the area A1 is erased. This can inhibit inappropriate execution or reading of the data. Then, result1 is set to satisfy result1:=010 showing that the CRC checking has failed (data writing has failed) again.

5. For example, the access control circuit 20 sets access control such that another module which needs processing by the error detection circuit 4, such as the CPU 2, is allowed to access the error detection circuit 4. Then, a random number is selected as rc←{0, 1}^(k−3) to satisfy rc:=rc||result1∈{0, 1}^k.

6. r2:=PRF(ski, tss||tsp||IDi||rh2||rc) is calculated. Then, the hardware security module circuit 10 of the device B110 sets up Data2:=(tss, IDi, rh2, rc, r2) and transmits (rp, tsp, Data2) as Data2:=(tss, IDi, rh2, rc, r2) to the non-secure portion 120 of the device B110 (Step S120).

7. On receiving Data2, the non-secure portion 120 of the device B110 sets the (R, W, E) attributes of the corresponding memory area to (1, 0, 0) (Step S121), and then transmits (2, rp, tsp, Data2) to the device A102 (Step S122), where "2" represents a second process in the session information rp. When the transmission is completed, the non-secure portion 120 sets the (R, W, E) attributes of the corresponding memory area to (0, 1, 0) and then erases Data2 (Step S123).

Note that the (R, W, E) attributes may also be updated using the (R, W, E) attribute control mechanism (access control circuit 20) shown in FIGS. 3 to 9. Note that, when the (R, W, E) attribute control mechanism shown in FIGS. 3 to 9 is not used, settings may also be made using a memory protection unit (MPU) or a memory management unit (MMU). In the case of using the mechanism in FIG. 6, even when each of the attributes R and W is "0", data can be read and written by setting the hardware security module circuit 10. Accordingly, the attributes need to be changed in consideration of this. When a transition is not made between S1 and S2 in FIG. 6, an updatable range is limited, and therefore the attributes need to be changed within the limited range.

Note that, when there is a time limit to the transmission from the device A102 to the non-secure portion 120 of the device B110 and tsp is reliable, it may also be possible to recognize the time limit by comparing tss to tsp during the size checking in the process in 1, described above. When there is a time limit to the authentication process in a target terminal to be authenticated and the clock of the non-secure portion 120 of the device B110 is reliable, it may also be possible to recognize the time limit by comparing tsp to the time (hereinafter referred to as tsp2) when the authentication result is received from the terminal to be authenticated. As a result, when an excessively long time is needed for a process, an inappropriate process can be detected.

(3) Verification of Authentication Result in Device A

The non-secure portion 120 of each of the devices B110 transmits (2, rp, tsp, Data2) to the device A102 (S122). On receiving (2, rp, tsp, Data2=(tss, IDi, rh2, rc,r2)), the device A102 executes the following process (Step S124). Thus, the device A102 and the device B110 perform mutual authentication therebetween.

The device A102 verifies whether or not rp, tss, tsp, IDi, rc, r2∈{0, 1}^k and rh2∈{0, 1}^m are satisfied, i.e., whether or not the length of each data item has a prescribed value. When rp, tss, tsp, IDi, rc, r2∈{0, 1}^k and rh2∈{0,1}^m are not satisfied, the device A102 sets result2 to satisfy result2:=000. When rp, tss, tsp, IDi, rc, r2∈{0, 1}^k and rh2∈{0, 1}^m are satisfied, the device A102 verifies whether or not r2=PRF(ski, tss||tsp||IDi||rh2||rc) is satisfied (i.e., whether or not the signature is correct). When the signature is correct, the device A102 sets result2 to satisfy result2:=lower 3 bits of rc (i.e., the value of result1) and otherwise sets result2 to satisfy result2:=000.

Then, the device A102 outputs result2 as the authentication result and records the authentication result. When result2 shows "001", "001" means that the data is successfully stored in the data storage area of the device B110 without being falsified by a man-in-the middle, without leaking, and without suffering from a loss. When result2 shows "010", "010" means a write failure due to a data loss in the writing of the data. When result2 shows "100", "100" means that authentication/decryption is successful, but a data loss has occurred before the writing of the data. When result2 shows "110", "110" means the occurrence of a reception error (message falsification may have occurred).

Note that, when there is a limit to the time period between the transmission of the authenticated encryption data from the device A102 to the non-secure portion 120 of the device B110 and the acquisition of the authenticated encryption data by the device A102 from the non-secure portion 120 of the device B110, it may also be possible to recognize the time limit by comparing tss to the current time in the device A102 during the size checking described above. When there is a limit to the transmission of whether or not an operation of decrypting the authenticated encryption data is successful from the non-secure portion 120 of the device B110 to the device A102 and the clock of the non-secure portion 120 of the device B110 is reliable, it may also be possible to recognize the time limit by transmitting the data to which tsp2 has been added from the non-secure portion 120 of the device B110 to the device A102 and comparing tsp2 to tss.

When the target data to be transferred is transferred from the device A102 as the external device to the semiconductor device 1 (device B110) according to the first embodiment, the hardware security module circuit 10 receives authentication data (Data1, Data2) from the device A102 via the memory area of the non-secure portion 120 and transmits the authentication data to the device A102. This allows the semiconductor device 1 (device B110) to perform mutual authentication with the device A102. The memory area of the non-secure portion 120 is configured so as not to be accessed by an attacker or the like under the access control.

Accordingly, when the target data to be transferred is transferred, it is possible to inhibit an attacker or the like from spoofing as a device at the destination.

The data transmission/reception sequence according to the first embodiment is fail-safe since, when rp is falsified, the corresponding session is no longer present or, even when the corresponding session is present, the sequence does not continue due to an authentication failure in the device B110 in a different session. The data transmission/reception sequence according to the first embodiment is also fail-safe when rh2 is falsified since the verification of whether or not the process of decrypting the authenticated ciphertext is successful in the device A102 fails. Also, in the data transmission/reception sequence according to the first embodiment, even when an attacker or the like falsifies the value of rc, due to a verification means which verifies whether or not the operation of decrypting the authenticated ciphertext is successful in the device A102, the attacker or the like cannot pretend that the verification in the device A102 is successful. Also, in the data transmission/reception sequence according to the first embodiment, even when tsp is falsified, due to the means which verifies the result of the authentication in the device A102, the attacker or the like cannot pretend that the verification in the device A102 is successful. In other words, even when any of rp, rh2, and tsp is falsified, in the verification of whether or not the process of decrypting the authenticated ciphertext formed in the hardware security module circuit 10 of the device B110 is successful, the attacker or the like cannot pretend that the data writing is successful or the verification is successful.

Accordingly, in the first embodiment, when all or any of rp, rh2, and rc is falsified, it is possible to sense the presence of any falsification. Note that, for the purpose of efficiently detecting an authentication failure or a verification failure due to falsification, it may also be possible to add a hash value to tsp.

Modification of First Embodiment

Next, a description will be given of a modification of the first embodiment. The sequence diagrams shown in FIGS. 11 to 13 show a sequence for transferring target data to be transferred from the device A102 to the device B110 by one session. When the data size of the target data to be transferred is larger than a transferrable size and therefore the data needs to be segmented and transferred by a plurality of sessions and when the sequence shown in FIGS. 11 to 13 is used without alteration, it is necessary to execute a process such as authentication a plurality of times corresponding to the plurality of sessions.

When the transferable size is limited, it is conceivably more efficient to encrypt the whole target data to be transferred by an authenticated encryption method, segment the whole encrypted data into a plurality of data segments, and transfer the data segments than to segment the target data to be transferred into a plurality of data segments, individually encrypt each of the data segments upon transfer thereof, and transfer the encrypted data segment in one of transfer sessions. For example, when consideration is given to the storage of data in a nonvolatile memory, it is more efficient to store a sufficient amount of data in the hardware security module circuit 10 of the device B110, then decrypt the sufficient amount of stored data in accordance with the authenticated encryption method, and then write the decrypted data to a data area. The authenticated encryption method may also be a method which adds a ciphertext in accordance with a block encryption method and a signature to the result of encryption under the premise that different keys are used for encryption and production of a signature.

FIGS. 14 to 19 are sequence diagrams each showing a data transmission/reception sequence executed in the authentication system 100 according to the modification of the first embodiment. Since the configuration of the authentication system 100 according to the modification of the first embodiment is substantially the same as that of the authentication system 100 according to the first embodiment shown in FIG. 10, a description thereof is omitted.

Using the sequence diagrams in FIGS. 14 to 19, an operation in accordance with a protocol which allows simultaneous encryption of data considering functional safety and having falsification resistance and confidentiality as well as transmission/reception of the encrypted data by segmental transfer. The sequence in FIGS. 14 to 19 mentioned herein has (1) a mutual authentication process (S201 to S224) involving the notification of the number of the transfer sessions, (2) a repetitive segmental transfer process (S231 to S257) for the wholly encrypted data, and (3) a mutual authentication process (S262 to S286) involving the decryption of the combined data and data storage. It is assumed that, as a result of initial setting of a common symmetrical key for the device A102 and the device B110, the following settings are made.

The device A102 receives $1^{\wedge}k$ input thereto where k is a security parameter. The device A102 selects a symmetrical key ski-$\{0, 1\}^{\wedge}k$ for the device B110 to which an authentication identifier $IDi \in \{0, 1\}^{\wedge}k$ is assigned and transmits (ski, IDi) to the device B110. The device B110 stores (ski, IDi) in the nonvolatile memory. The device B110 also transmits the set ID of the authentication identifier IDi to the device A102. It is assumed herein that the total number of the devices B110 is M and $i \in \{1, M\}$ is satisfied. It may also be possible that, by performing such a process before the devices B110 are shipped, a specific key is set to each of the devices B110 and stored in the device A102. It is also assumed that the non-secure portion 120 of each of the devices B110 is allowed to read IDi stored in the hardware security module circuit 10 embedded in the device B110, but is not allowed to perform an override operation and an erase operation under appropriate access control.

(1) Mutual Authentication Process Involving Notification of Number of Transfer Sessions (1-1) Construction of Device Authentication Information in Device A The non-secure portion 120 of each of the devices B110 acquires IDi from the hardware security module circuit 10 (Step S201). The non-secure portion 120 may read IDi from the hardware security module circuit 10 or may also receive IDi from the hardware security module circuit 10. On acquiring IDi, the non-secure portion 120 selects the session information $rp \in \{0, 1\}^{\wedge}k$ for session management (Step S202) and transmits (1, rp, IDi) to the device A102 (Step S203). In (1, rp, IDi), "1" shows a first process in the session information rp. On receiving (1, rp, IDi), the device A102 performs the following process (Step S204), whereby the device B110 is authenticated and a signature is given to the number of transfer sessions.

1. It is verified whether or not rp, $IDi \in \{0, 1\}^{\wedge}k$ and $IDi \in ID$ are satisfied. If rp, $IDi \in \{0, 1\}^{\wedge}k$ and $IDi \in ID$ are not satisfied, the process is ended. If rp, $IDi \in \{0, 1\}^{\wedge}k$ and $IDi \in ID$ are satisfied, the following process is executed.

2. The current time is selected as $tss1 \leftarrow TimeStamp$.

3. Two random numbers are selected as $rh0 \leftarrow \{0,1\}^{\wedge}k$ and $rh1 \leftarrow \{0,1\}^{\wedge}k$.

4. As a session key, $r1' := PRF(ski, tss1 \| IDi \| rh0 \| 1)$ is calculated, where "ski" is a key for signature verification.

5. For the whole data to be transmitted (target data to be transferred), CRC or ECC is calculated. Assuming that, e.g., CRC is calculated, data_crc:=CRC(data) is set up.

6. $c1 := AE.Enc(r1', data \| data\_crc)$ is calculated. Then, the device A102 segments c1 into N segments in consideration of the size of the target data to be transferred to construct {c1[j]; j=1, ..., N} where the operator "||" represents bit concatenation. In the same manner as in the example described above, AE.ENc is an authenticated ciphertext, which may also be AES-GCM, AES-CCM, or a combination of, e.g., the ciphertext and a CMAC value.

7. To make a notification of the number N of the data segments to be transferred, r1:=PRF(ski, tss1||IDi||rh1||N||1) is calculated, where r1 is not a signature added to the target data to be transferred, but a signature added to the number N of the transfer sessions.

8. Data1:=(Tss, IDi, rh1, r1, N) is set up, and (1, rp, Data1) is transmitted to the non-secure portion 120 of the device B110 (Step S205).

(1-2) Data Decryption, Data Storage, and Result Collection in Device B

The non-secure portion 120 of each of the devices B110 sets the (R, W, E) attributes of the memory area in which Data1 is stored to (1, 1, 0) or (0, 1, 0) (Step S206). In other words, the (R, W, E) attributes are set such that data is writable and a program is inexecutable. The (R, W, E) attributes may also be changed using, e.g., the access control circuit 20 described above. The non-secure portion 120 also selects the current time as tsp1←TimeStamp. On receiving Data1, the non-secure portion 120 sets the (R, W, E) attributes of the corresponding memory area to (1, 0, 0) (Step S207). In short, the access control circuit 20 sets the (R, W, E) attributes such that data is only readable.

Then, the non-secure portion 120 transmits (rp, tsp1, Data1) to the hardware security module circuit 10 of the device B110 (Step S208). When the transmission is completed, the non-secure portion 120 sets the (R, W, E) attributes of the memory area of the non-secure portion 120 to (0, 1, 0), and then erases Data1 (Step S209). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tsp1, Data1=(tss1, IDi, rh1, r1, N)), the hardware security module circuit 10 of the device B110 sets up rh2←{0,1}^k and executes the following process (Step S210). Thus, the device A102 and the number N of transfer sessions are authenticated.

1. It is verified whether or not rp, tsp1, tss1, IDi, rh1, r1∈{0,1}^k is satisfied, i.e., whether or not the length of each data item has a prescribed value. Then, it is checked whether or not IDi matches the identifier of the device B110. Note that, when rp, tsp1, tss1, IDi, rh1, r1∈{0,1}^k is not satisfied, result1:=00, rc1←{0,1}^(k−2), rc1:=rc1||result1 is set up. Then, a process as will be described later is no longer executed. The value "00" of result1 used herein shows that an unauthorized access has been made. If rp, tsp1, tss1, IDi, rh1, r1∈{0, 1}^k is satisfied, the following operation is executed.

2. It is verified whether or not r1=PRF(ski, tss1||IDi||rh1||N||1) is satisfied. When r1=PRF(ski, tss1||IDi||rh1||N||1) is satisfied, result1 is set to satisfy result1:=01 showing that the authentication of the device A102 and the number N of transfer sessions is successful. When r1=PRF(ski, tss1||IDi||rh1||N||1) is not satisfied, result1 is set to satisfy result1:=10 showing that the authentication of the device A102 and the number N of transfer sessions has failed. Note that, since the number N of the data segments resulting from the segmentation is transmitted to the hardware security module circuit 10, the hardware security module circuit 10 is allowed to recognize how many times data is transmitted from the device A102 (i.e., how many data segments results from the segmentation).

3. A random number is selected as rc1←{0, 1}^k−2, and rc1:=rc1||result1 is set up.

4. r2:=PRF(ski, tss1||tsp1||IDi||rh2||rc1||N) is calculated, where r2 is a signature added to the number N of transfer sessions. Then, the device B110 sets up Data2:=(tss1, IDi, rh2, rc1, N, r2) and transmits (rp, tsp1, Data2) to the non-secure portion 120 of the device B110 (Step S220).

5. On receiving Data2, the non-secure portion 120 of the device B110 sets the (R, W, E) attributes of the corresponding memory area to (1, 0, 0) (Step S221), and then transmits (2, rp, tsp1, Data2) to the device A102 (Step S222), where "2" represents a second process in the session information rp. When the transmission is completed, the non-secure portion 120 sets the (R, W, E) attributes of the corresponding memory area to (0, 1, 0) and then erases Data2. The non-secure portion 120 further sets the (R, W, E) attributes of the memory area where Data3 is placed to (0, 1, 0) in preparation for the reception of Data3 from the device A102 (Step S223).

Note that the (R, W, E) attributes may also be updated using the (R, W, E) attribute control mechanism (access control circuit 20) shown in FIGS. 3 to 9. Note that, when the (R, W, E) attribute control mechanism shown in FIGS. 3 to 9 is not used, settings may also be made using a memory protection unit (MPU) or a memory management unit (MMU). In the case of using the mechanism in FIG. 6, even when each of the attributes R and W is "0", data can be read and written by setting the hardware security module circuit 10. Accordingly, the attributes need to be changed in consideration of this. When a transition is not made between S1 to S2 in FIG. 6, an updatable range is limited, and therefore the attributes need to be changed within the limited range. This also holds true in a modification of the second embodiment described later.

Note that, when there is a time limit to the transmission from the device A102 to the non-secure portion 120 of the device B110 and tsp is reliable, it may also be possible to recognize the time limit by comparing tss1 to tsp1 during the size checking in the process 1, described above. When there is a time limit to the authentication process in a target terminal to be authenticated and the clock of the non-secure portion 120 of the device B110 is reliable, it may also be possible to recognize the time limit by comparing tsp1 to the time (hereinafter referred to as tsp') when the authentication result is received from the terminal to be authenticated. As a result, when an excessively long time is needed for a process, an inappropriate process can be detected. The same holds true even in the modification of the second embodiment described later.

(1-3) Verification of Authentication Result in Device A

The non-secure portion 120 of each of the devices B transmits (2, rp, tsp1, Data2) to the device A102 (S222). On receiving (2, rp, tsp1, Data2=(tss1, IDi, rh2, rc1, N, r2), the device A102 executes the following process (Step S224). Thus, before the target data to be transferred is transferred, the device A102 and the device B110 perform mutual authentication therebetween.

The device A102 verifies whether or not rp, tss1, tsp1, IDi, rh2, rc1, r2∈{0, 1}^k and N∈{0, 1}^l are satisfied, i.e., whether or not the length of each data item has a prescribed value. When rp, tss1, tsp1, IDi, rh2, rc1, r2∈{0, 1}^k and N∈{0, 1}^l are not satisfied, the device A102 sets result2 to satisfy result2:=11. When rp, tss1, tsp1, IDi, rh2, rc1, r2∈{0, 1}^k and N∈{0, 1}^l are satisfied, the device A102 verifies whether or not r2=PRF(ski, tss1||tsp1||IDi||rh2||rc1||N) is satisfied (i.e., whether or not the signature is correct). When the signature is correct, the device A102 sets result2 to satisfy result2:=lower 2 bits of rc1 and otherwise sets result2 to satisfy result2:=11 showing failed mutual authentication.

Then, the device A102 outputs result2 as the authentication result and records the authentication result. When result2 shows "01", "01" means that the number N of the data segments has been reported from the device A102 to the device B110 without being falsified and the mutual authentication between the device A102 and the device B110 is successful. When result2 shows "10", "10" means the occurrence of a reception error (message may have been falsified). When result2=01 is satisfied, the device A102 sets an index variable j representing the number of transfer sessions to satisfy j=1 (initial value). When result2=01 is not satisfied, the process is ended.

Note that when there is a limit to the time period between the transmission of the authentication data from the device A102 to the non-secure portion 120 of the device B110 and the acquisition of the authentication data by the device A102 from the non-secure portion 120 of the device B110, it may also be possible to recognize the time limit by comparing tss1 to the current time in the device A102 during the size checking described above. When there is a limit to the transmission of whether or not the verification of the authentication data is successful from the non-secure portion 120 of the device B110 to the device A102 and the clock of the non-secure portion 120 of the device B110 is reliable, it may also be possible to recognize the time limit by transmitting the data to which tsp' has been added from the non-secure portion 120 of the device B110 to the device A102 and comparing tsp' to tss1. This also holds true in the modification of the second embodiment described later. When the target data to be transferred is transferred from the device A102 as the external device to the semiconductor device 1 (device B110) according to the modification of the first embodiment, the hardware security module circuit 10 receives the authentication data (Data1, Data2) from the device A102 via the memory area of the non-secure portion 120 and transmits the authentication data to the device A102. This allows the semiconductor device 1 (device B110) to perform mutual authentication with the device A102. Accordingly, when the target data to be transferred is transferred, it is possible to inhibit an attacker or the like from spoofing as a device at the destination.

The data transmission/reception sequence according to the modification of the first embodiment is fail-safe since, when rp is falsified, the corresponding session is no longer present or, even when the corresponding session is present, authentication in the device B110 in a different session is performed and fails. The data transmission/reception sequence according to the modification of the first embodiment is also fail-safe when rh2 is falsified since the verification of whether or not the process of decrypting the authenticated ciphertext is successful in the device A102 fails. Also, in the data transmission/reception sequence according to the modification of the first embodiment, even when an attacker or the like falsifies the value of rc1, due to a verification means using PRF in the device A102, the attacker or the like cannot pretend that the verification in the device A102 is successful. Also, in the data transmission/reception sequence according to the modification of the first embodiment, even when tsp1 is falsified, due to the means which verifies the result of the authentication in the device A102, the attacker or the like cannot pretend that the verification in the device A102 is successful. In other words, even when any of rp, rh2, and tsp1 is falsified, the attacker or the like cannot pretend that Data2 formed in the hardware security module circuit 10 of the device B110 has succeeded in verification. Accordingly, when all or any of rp, rh2, and rc1 is falsified, it is possible to sense the presence of any falsification. Note that, for the purpose of efficiently detecting an authentication failure or a verification failure due to falsification, it may also be possible to add a hash value to tsp1.

(2) Repetitive Segmental Transfer Process for Wholly Encrypted Data

The processes (2-1) to (2-3) are repetitively executed below until the transfer of the data segments $\{c1[j]; j=1, \ldots, N\}$ from the device A102 to the device B110 is completed. The mutual authentication between the device A102 and the device B110 is not performed herein in the segmental data transfer process.

(2-1) Construction of Transferred Data in Device A

Assuming that j=1 is satisfied, the device A102 performs the following process.

1. The device A102 generates Data3:=(tss1, IDi, N, j, c1[j]) (Step S231) and transmits (j+2, rp, Data3) to the non-secure portion 120 of the device B110 (Step S232).

(2-2) Data Decryption, Data Storage, and Result Collection in Device B

The non-secure portion 120 of each of the devices B110 selects the current time as tspj←TimeStamp. On receiving Data3, the non-secure portion 120 sets the (R, W, E) attributes of the corresponding memory area to (1, 0, 0) (Step S233). Then, the non-secure portion 120 transmits (rp, tspj, Data3) to the hardware security module circuit 10 of the device B110 (Step S234).

When the transmission is completed, the non-secure portion 120 sets the (R, W, E) attributes of the corresponding memory area to (0, 1, 0), and then erases Data3. The non-secure portion 120 further sets the (R, W, E) attributes of the memory area where Data4 is placed to (0, 1, 0) in preparation for the reception of Data4 from the device B110 (Step S235). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tspj, Data3)=(tss1, IDi, N, j, c1[j]), the hardware security module circuit 10 of the device B110 sets up enc_data_with_crc:={ } and performs the following process (Step S240).

1. It is verified whether or not rp, tss1, tspj, IDi, c1[j]∈$\{0, 1\}^k$ and N, j∈$\{0, 1\}^k$ are satisfied, i.e., whether or not the length of each data item has a prescribed value. Then, it is checked whether or not IDi matches the identifier of the device B110. When rp, tss1, tspj, IDi, c1[j]∈$\{0, 1\}^k$ and N, j∈$\{0, 1\}^1$ are not satisfied, result1:=00, rc←$\{0, 1\}^{(k-2)}$, rc1:=rc1∥result1 is set up. When rp, tss1, tspj, IDi, c1[j]∈$\{0, 1\}^k$ and N, j∈$\{0, 1\}^1$ are satisfied, the following operation is executed.

2. enc_data_with_crc:=enc_data_with_crc∪c1[j] is calculated, and result=01 is set up.

3. A random number is selected as rc1←$\{0, 1\}^{k-2}$, and rc1:=rc1∥result1 is set up.

4. The hardware security module circuit 10 sets up Data4:=(tss1, IDi, rc1, N, j) and transmits (rp, tspj, Data4) to the non-secure portion 120 of the device B110 (Step S250). If j=N is satisfied and the least significant bit of rc1 is "1", the hardware security module circuit 10 completes the operation of receiving the N-segmented data.

5. On receiving Data4, the non-secure portion 120 of the device B110 sets the (R, W, E) attributes of the corresponding memory area to (1,0,0) (Step S252), and then transmits (j+2, rp, tspj, Data4) to the device A102 (Step S254). When the transmission is completed, the non-secure portion 120 sets the (R, W, E) attributes of the corresponding memory area to (0,1,0) and then erases Data4. When j<N is satisfied, the non-secure portion 120 sets the (R, W, E) attributes of the memory area where Data3 is placed to (0,1,0) in preparation for the reception of Data3 from the device A102 (Step S256).

Note that, when there is a time limit to the transmission from the device A102 to the non-secure portion 120 of the device B110 and tspj is reliable, it may also be possible to recognize the time limit by comparing tss1 to tspj during the size checking in the process 1, described above. When there is a time limit to the authentication process in a target terminal to be authenticated and the clock of the non-secure portion 120 of the device B110 is reliable, it may also be possible to recognize the time limit by comparing tspj to the time (hereinafter referred to as tsp') when the authentication result is received from the terminal to be authenticated.

(2-3) Verification of Authentication Result in Device A

The non-secure portion 120 of each of the devices B110 transmits (j+2, rp, tspj, Data4) to the device A102 (S254). On receiving (j+2, rp, tspj, Data4=(tss1, IDi, rc1, N, j)), the device A102 executes the following process (Step S257).

The device A102 verifies whether or not rp, tss1, tspj, IDi, rc1∈{0, 1}^k and N, j∈{0, 1}^1 are satisfied, i.e., whether or not the length of each data item has a prescribed value. When rp, tss1, tspj, IDi, rc1∈{0, 1}^k and N, j∈{0, 1}^1 are not satisfied, the device A102 sets result2 to satisfy result2:=00. When rp, tss1, tspj, IDi, rc1∈{0, 1}^k and N, j∈{0, 1}^1 are satisfied, the device A102 sets result2 to satisfy result2:=lower 2 bits of rc. When result2=01 is satisfied, the device A102 sets j:=j+1. When j>N is satisfied, the device A102 completes the transfer of the data segments from the device A102. When result2 shows "01", "01" means that data c1[j] is successfully stored in the data storage area of the device B110, while retaining the size. When result2 shows "00", "00" means that there is a data size mismatch.

Note that, when there is a limit to the time period between the transmission of the authenticated encryption data segments from the device A102 to the non-secure portion 120 of the device B110 and the acquisition of a response from the non-secure portion 120 of the device B110 by the device A102, it may also be possible to recognize the time limit by comparing tss1 to the current time in the device A102 during the size checking described above. When there is a limit to the transmission of whether or not the size checking of the authenticated encryption data segments is successful from the non-secure portion 120 of the device B110 to the device A102 and the clock of the non-secure portion 120 of the device B110 is reliable, it may also be possible to recognize the time limit by transmitting the data to which tsp' has been added from the non-secure portion 120 of the device B110 to the device A102 and comparing tsp' to tss1.

In the data transmission/reception sequence according to the modification of the first embodiment, after all the authenticated encryption data segments are combined, authentication and decryption is performed in accordance with an authenticated encryption method in (3) Mutual Authentication Process Involving Decryption of Combined Data and Data Storage described later. Accordingly, when all or any of {c1[j]; j=1, . . . , N} is falsified, it is possible to sense the presence of any falsification.

(3) Mutual Authentication Process Involving Decryption of Combined Data and Data Storage (3-1) Construction of Device Authentication Information in Device A When j>N is satisfied in the repetitive execution of (2), the device A102 recognizes the completion of the repetitive execution of (2) and performs the following process (Step S262).

1. The current time is selected as tss2←TimeStamp.
2. A random number is selected as rh←{0, 1}^k.
3. r3:=PRF(ski, tss1∥tss2∥IDi∥rh0∥rh3∥N∥N+1) is calculated, where the final "N+1" is intended to give an instruction to decrypt the target data to be transferred since the transfer of the data segments is ended. Then, the device A102 sets up Data5:=(tss1, tss2, IDi, rh0, rh3, r3, N, N+1) and transmits (j+2, rp, Data5) to the non-secure portion 120 of the device B110 (Step S263). Note that the operator "∥" used herein represents bit concatenation.

(3-2) Data Decryption, Data Storage, and Result Collection in Device B

The non-secure portion 120 of each of the devices B110 sets the (R, W, E) attributes of the memory area in which Data5 is stored to (0, 1, 0) (Step S264). In short, the (R, W, E) attributes are set such that data is only writable. The non-secure portion 120 also selects the current time as tspN+1←TimeStamp. On receiving Data5, the non-secure portion 120 sets the (R, W, E) attributes of the corresponding memory area to (1, 0, 0) (Step S265). In short, the (R, W, E) attributes are set such that data is only readable.

Then, the non-secure portion 120 transmits (rp, tspN+1, Data5) to the hardware security module circuit 10 of the device B110 (Step S266). When the transmission is completed, the non-secure portion 120 sets the (R, W, E) attributes of the memory area of the non-secure portion 120 to (0, 1, 0), and then erases Data5 (Step S267). The non-secure portion 120 also sets the (R, W, E) attributes of the memory area where Data6 received from the hardware security module circuit 10 of the device B110 to (0, 1, 0) (Step S281). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tspN+1, Data5=(tss1, tss2, IDi, rh0, rh3, r3, N, N+1)), the hardware security module circuit 10 of the device B110 sets up rh4←{0, 1}^k and performs the following process (Step S270). Thus, the process of authenticating the device A102, verifying the received data, and decrypting the data is performed.

1. It is verified whether or not rp, tspN+1, tss1, tss2, IDi, rh0, rh3, r∈{0, 1}^k and N, N+1∈{0, 1}^1 are satisfied, i.e., whether or not the length of each data item has a prescribed value. Then, it is checked whether or not IDi matches the identifier of the device B110. When rp, tspN+1, tss1, tss2, IDi, rh0, rh3, r3∈{0, 1}^k and N, N+1∈{0, 1}^1 are not satisfied, result2:=0000, rc2←{0, 1}^(k−4), rc2:=rc2∥result2 is set up. When rp, tspN+1, tss1, tss2, IDi, rh0, rh3, r3∈{0, 1}^k and N, N+1∈{0, 1}^1 are satisfied, the following operation is executed. Then, a process as will be described later is no longer executed. The value "0000" of result2 used herein shows that an unauthorized access has been made.
2. It is verified whether or not r3=PRF(ski, tss1∥tss2∥IDi∥rh0∥rh3∥N∥N+1) is satisfied.

When r3=PRF(ski, tss1∥tss2∥IDi∥rh0∥rh3∥N∥N+1) is not satisfied, result2 is set to satisfy result2:=1100 showing that the result of authentication verification is a failure. When r3=PRF(ski, tss1||tss2||IDi||rh0||rh3||N||N+1) is satisfied, r1'=PRF(ski, tss1||IDi||rh0||1) is calculated, and the following operation is executed.

3. For data||data_crc=AE.Dec(r1', enc_data_with_crc), i.e., the authenticated ciphertext, enc_data_with_crc obtained by concatenating {c1[j]; j=1, . . . , N} in the repetitive execution of (3) is decrypted, and it is verified whether or not the authentication is successful. When authentication is not successful, result2 is set to satisfy result2:=1000 showing that the result of data authentication is a failure. When the authentication is successful, the following operation is executed.

4. Access control is set such that only the hardware security module circuit 10 is allowed to access the error detection circuit 4. The CRC of data obtained as a result of the decryption is calculated using CRC(data), and it is verified whether or not the calculated CRC of data matches data_crc. When there is no match, result2 is set to satisfy result2:=0100 showing that the CRC checking has failed. When there is a match, the following operation is executed.

5. The (R, W, E) attributes of the area A1 where data obtained as a result of the decryption is stored are set to (1, 1, 0) or (0, 1, 0) (i.e., such that data is writable and a program is inexecutable), and data is stored (written) in the area A1. Thus, when data that has passed the CRC checking (i.e., in which no error is detected) is written, it is possible to inhibit an attacker or the like from falsifying the data. Then, the (R, W, E) attributes of the area A1 are set to (1, 0, 1) or (1, 0, 0) (i.e., such that data is readable and unwritable), and data is read again from the area A1 and set as data'. The CRC of data' is calculated using CRC(data), and it is verified whether the calculated CRC of data' matches data_crc. Since the data may be broken when written in a nonvolatile memory, to improve fault tolerance, the data is thus read after being written and subjected to the CRC checking. Such a process can inhibit an attacker or the like from falsifying the data when the data is read for the detection of an error that has occurred during the writing of the data.

When CRC(data') matches data_crc, the (R, W, E) attributes of the area A1 are set to (1, 0, 1), (1, 0, 0), or (0, 0, 1) (i.e., such that data is unwritable). Then, when the area A1 is a nonvolatile memory portion, an activation process is performed thereon. Further, result2 is set to satisfy result2:=0001 showing that all the processes are successful. When data is a critical program and needs confidentiality, the (R, W, E) attributes are set to (0, 0, 1) to allow only execution of the program. When there is no match, the (R, W, E) attributes of the area A1 are set to (1, 1, 0) or (0, 1, 0) (i.e., such that data is writable and the program is inexecutable), and data written in the area A1 is erased. This can inhibit inappropriate execution or reading of the data. Then, result2 is set to satisfy result2:=0010 showing that the CRC checking has failed again.

6. The access control is set to allow another module which needs processing by the error detection circuit 4, such as the CPU 2, to access the error detection circuit 4 ("Default"). Then, a random number is selected as rc2←{0, 1}^(k−3) to satisfy rc2:=rc2||result2∈{0, 1}^k.

7. r4:=PRF(ski, tss2||tspN+1||IDi||rh4||rc2||0) is calculated. Then, the hardware security module circuit 10 of the device B110 sets up Data6:=(tss2, IDi, rh4, rc2, r4) and transmits (rp, tspN+1, Data6) to the non-secure portion 120 of the device B110 (Step S282).

8. On receiving Data6, the non-secure portion 120 of the device B110 sets the (R, W, E) attributes of the corresponding memory area to (1, 0, 0) (Step S283), and then transmits (j+2, rp, tspN+1, Data6) to the device A102 (Step S284).

When the transmission is completed, the non-secure portion 120 sets the (R, W, E) attributes of the corresponding memory area to (0, 1, 0), and then erases Data6 (Step S285).

Note that the (R, W, E) attributes may also be updated using the (R, W, E) attribute control mechanism (access control circuit 20) shown in FIGS. 3 to 9. Note that, when the (R, W, E) attribute control mechanism shown in FIGS. 3 to 9 is not used, settings may also be made using a memory protection unit (MPU) or a memory management unit (MMU). In the case of using the mechanism in FIG. 6, even when each of the attributes R and W is "0", data can be read and written by setting the hardware security module circuit 10. Accordingly, the attributes need to be changed in consideration of this. When a transition is not made between S1 and S2 in FIG. 6, an updatable range is limited, and therefore the attributes need to be changed within the limited range.

Note that, when there is a time limit to the transmission from the device A102 to the non-secure portion 120 of the device B110 and tspN+1 is reliable, it may also be possible to recognize the time limit by comparing tss2 to tspN+1 during the size checking in the process 1, described above. When there is a time limit to the authentication process in a target terminal to be authenticated and the clock of the non-secure portion 120 of the device B110 is reliable, it may also be possible to recognize the time limit by comparing tspN+1 to the time (hereinafter referred to as tsp') when the authentication result is received from the terminal to be authenticated. As a result, when an excessively long time is needed for a process, an inappropriate process can be detected.

(3-3) Verification of Authentication Result in Device A

The non-secure portion 120 of each of the devices B110 transmits (j+2, rp, tspN+1, Data6) to the device A102 (S284). On receiving (j+2, rp, tspM+1, Data6=(tss2, IDi, rh4, rc2, r4)), the device A102 executes the following process (Step S286). Thus, the device A102 and the device B110 perform mutual authentication therebetween.

The device A102 verifies whether or not rp, tss2, tspN+1, IDi, rh4, rc2, r4∈{0, 1}^k is satisfied, i.e., whether or not the length of each data item has a prescribed value. When rp, tss2, tspN+1, IDi, rh4, rc2, r4∈{0, 1}^k is not satisfied, the device A102 sets result2 to satisfy result2:=1110. When rp, tss2, tspN+1, IDi, rh4, rc2, r4∈{0, 1}^k is satisfied, the device A102 verifies whether or not r4=PRF(ski, tss2||tspN+1||IDi||rh4||rc2||0) is satisfied (i.e., whether or not the signature is correct). When the signature is correct, the device A102 sets result2 to satisfy result2:=lower 4 bits of rc2 and otherwise sets result2 to satisfy result2:=1110.

Then, the device A102 outputs result2 as the authentication result and records the authentication result. When result2 shows "0001", "0001" means that mutual authentication between the device A102 and the device B110 is successful and data is successfully stored in the data storage area of the device B110 without being falsified by a man-in-the middle, without leaking, and without suffering from a loss. When result2 shows "0010", "0010" means a write failure due to a data loss in the writing of the data. When result2 shows "0100", "0100" means that authentication/decryption is successful, but a data loss has occurred before the writing of the data. When result2 shows "1000", "1000" means that the authentication of enc_data_with_crc in accordance with the authenticated encryption method has failed, i.e., any of {c1[j]; j=1, . . . , N} may have been falsified. When result2 shows "1100", "1100" means the occurrence of a reception error (message falsification may have occurred).

Note that, when there is a limit to the time period between the transmission of the authentication data from the device A102 to the non-secure portion 120 of the device B110 and the acquisition of the authentication data by the device A102 from the non-secure portion 120 of the device B110, it may also be possible to recognize the time limit by comparing tss2 to the current time in the device A102 during the size checking described above. When there is a limit to the transmission of whether or not an operation of decrypting the authenticated encryption data is successful from the non-secure portion 120 of the device B110 to the device A102 and the clock of the non-secure portion 120 of the device B110 is reliable, it may also be possible to recognize the time limit by transmitting the data to which tsp' has been added from the non-secure portion 120 of the device B110 to the device A102 and comparing tsp' to tss2.

The data transmission/reception sequence according to the modification of the first embodiment is fail-safe since, when rp is falsified, the corresponding session is no longer present or, even when the corresponding session is present, authentication is performed in the device B110 in a different session and fails, and therefore the sequence does not continue. The data transmission/reception sequence according to the modification of the first embodiment is also fail-safe even when rh4 is falsified since the verification of whether or not the process of decrypting the authenticated ciphertext is successful in the device A102 fails. Also, in the data transmission/reception sequence according to the modification of the first embodiment, even when an attacker or the like falsifies the value of rc2, due to a verification means which verifies whether or not the operation of decrypting the authenticated ciphertext is successful in the device A102, the attacker or the like cannot pretend that the verification in the device A102 is successful. Also, in the data transmission/reception sequence according to the modification of the first embodiment, even when tspN+1 is falsified, due to the means which verifies the result of the authentication in the device A102, the attacker or the like cannot pretend that the verification in the device A102 is successful. In other words, even when any of rp, rh4, and tspN+1 is falsified, in the verification of whether or not the process of decrypting the authenticated ciphertext formed in the hardware security module circuit 10 of the device B110 is successful, the attacker or the like cannot pretend that the data writing is successful or the verification is successful. Accordingly, when all or any of rp, rh4, and rc2 is falsified, it is possible to sense the presence of any falsification. Note that, for the purpose of efficiently detecting an authentication failure or a verification failure due to falsification, it may also be possible to add a hash value to tspN+1.

In the data transmission/reception sequence according to the modification of the first embodiment, when there is a limit to the data size, mutual authentication is performed before and after the transfer of the target data to be transferred. To the whole target data to be transferred, CRC is added, the data with the added CRC is encrypted in accordance with the authenticated encryption method, and the whole encrypted data is segmented and transferred.

Consequently, when each of the data segments resulting from the segmentation is transferred, mutual authentication is no longer necessary. Accordingly, in the data transmission/reception sequence according to the modification of the first embodiment, the data can be transferred more efficiently than when the target data to be transferred is segmented in advance and each of the data segments resulting from the segmentation is encrypted and transferred in one of transfer sessions.

Second Embodiment

Next, a description will be given of the second embodiment. The sequence diagrams shown in FIGS. 11 to 13 implement a data transmission/reception protocol using an authenticated encryption method, considering functional safety, and having falsification resistance and confidentiality. On the other hand, when only the falsification resistance needs to be ensured, a sequence considering functional safety can be configured by only verifying the issued signature, where "considering functional safety" mentioned herein indicates taking measures against a data error in a communication path and a data error due to a hardware fault.

Figure 20:
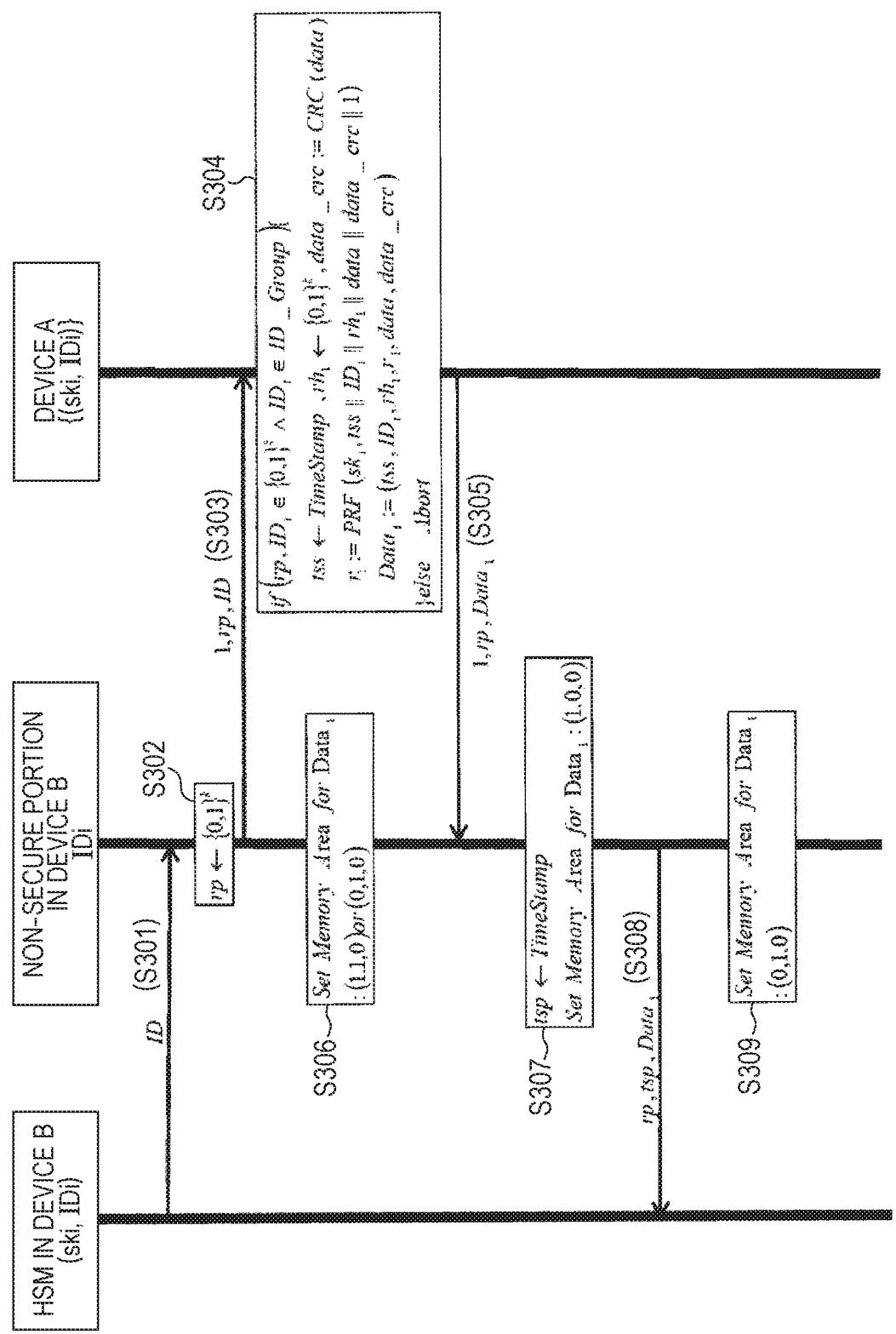
FIG. 20 shows a data transmission/reception sequence executed in an authentication system according to a second embodiment.
Figure 21:
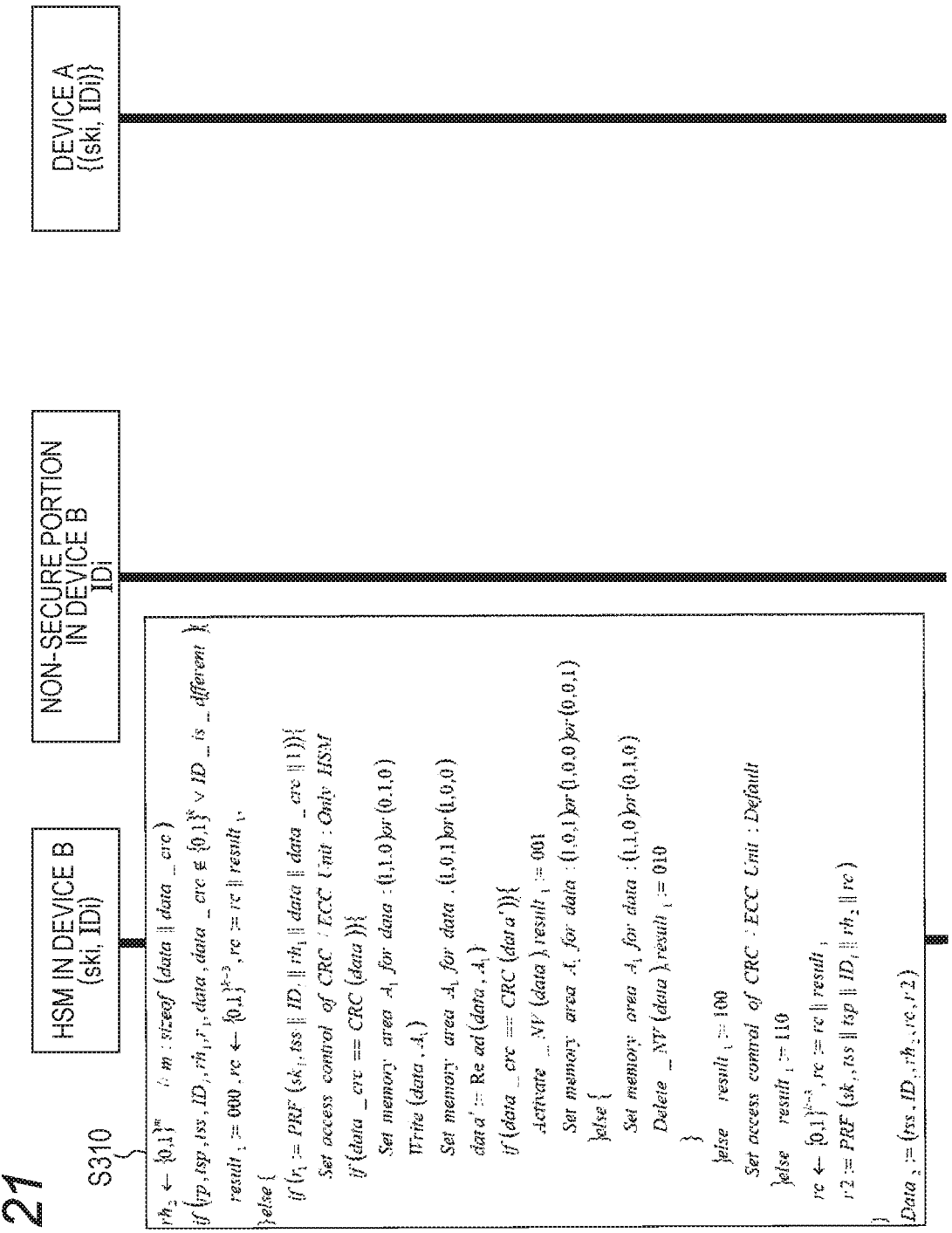
FIG. 21 shows the data transmission/reception sequence executed in the authentication system according to the second embodiment.
Figure 22:
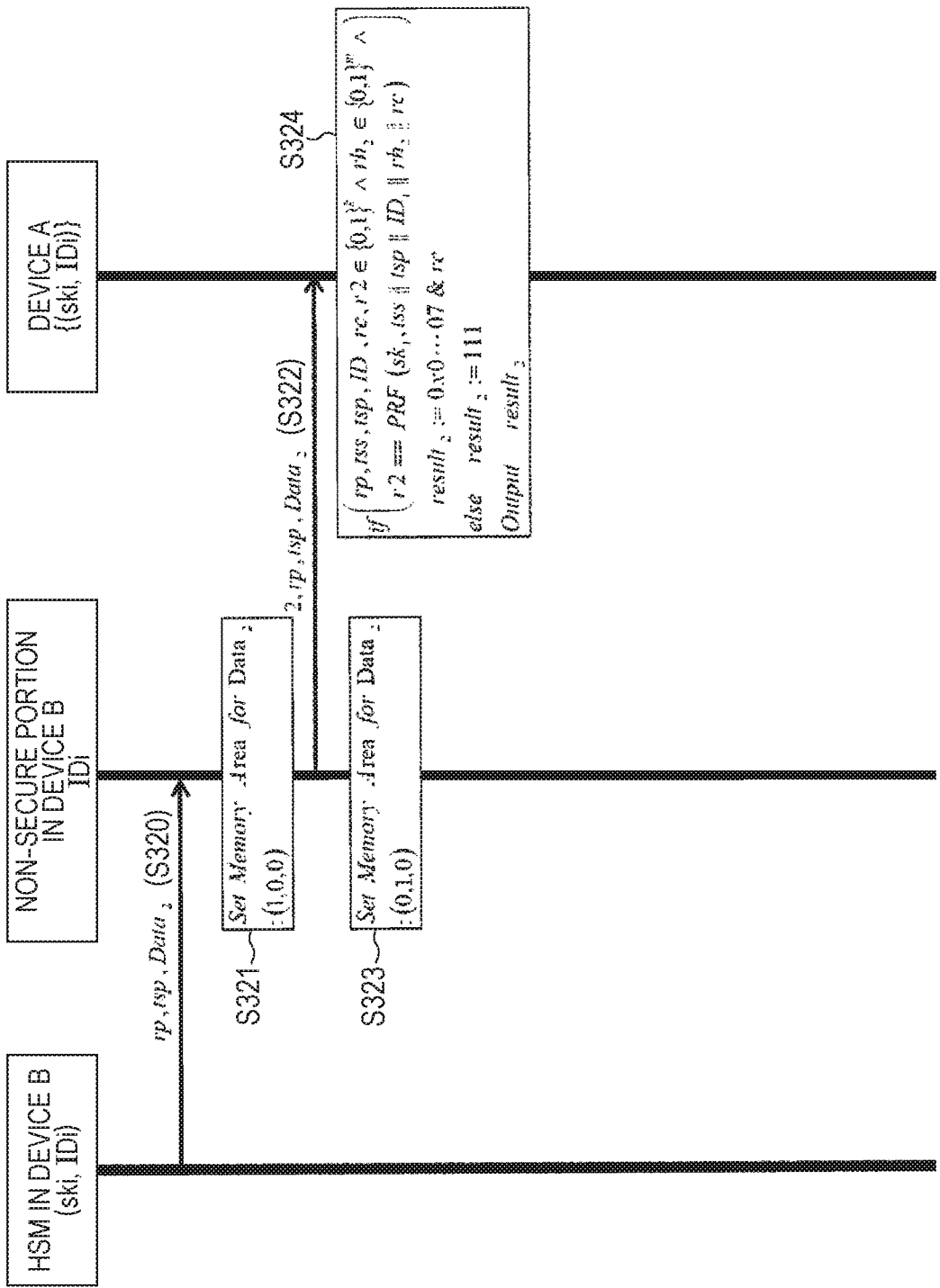
FIG. 22 shows the data transmission/reception sequence executed in the authentication system according to the second embodiment.
Figure 23:
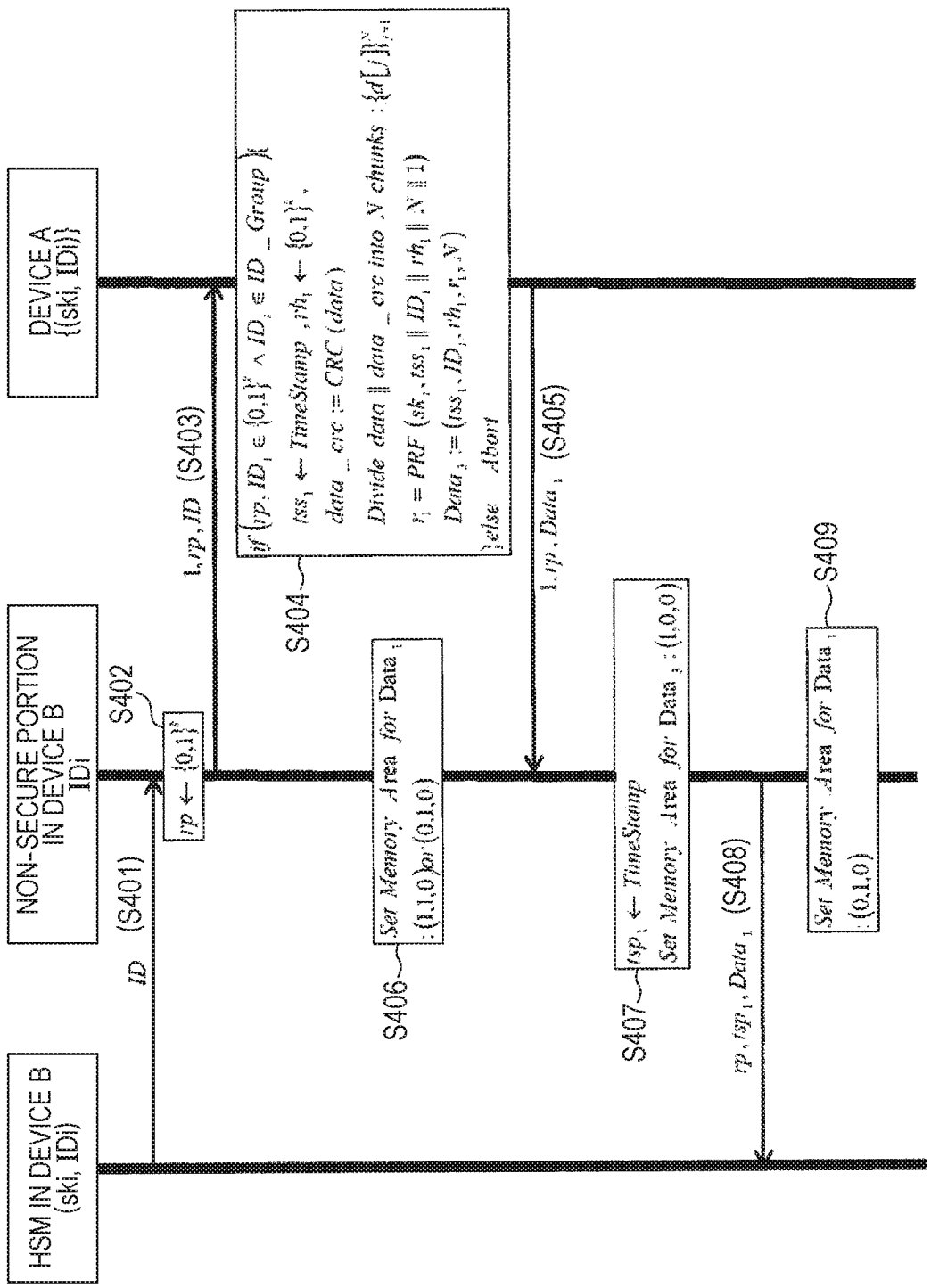
FIG. 23 is a sequence diagram showing a data transmission/reception sequence executed in an authentication system according to a modification of the second embodiment.
Figure 24:
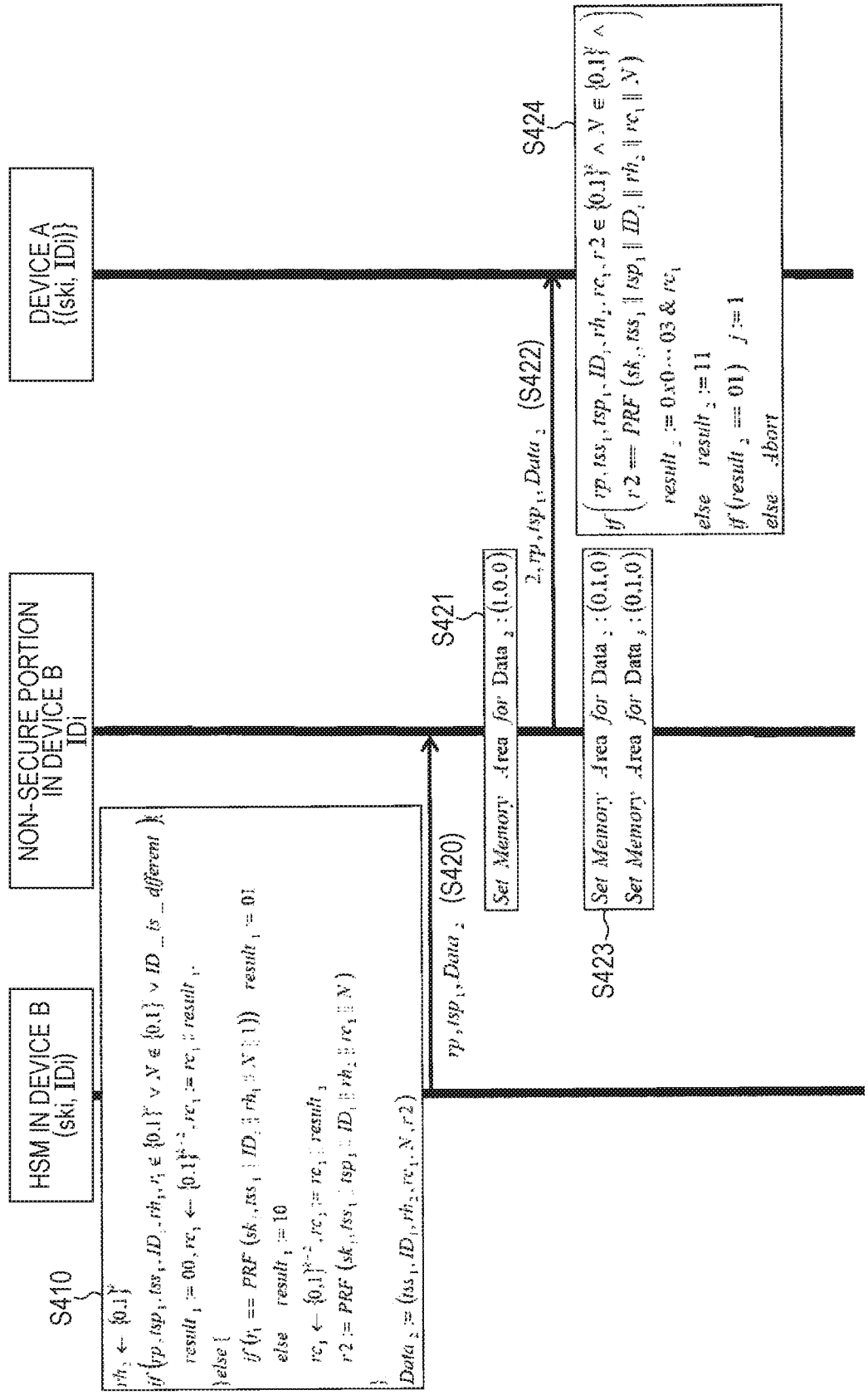
FIG. 24 is a sequence diagram showing the data transmission/reception sequence executed in the authentication system according to the modification of the second embodiment.
Figure 25:
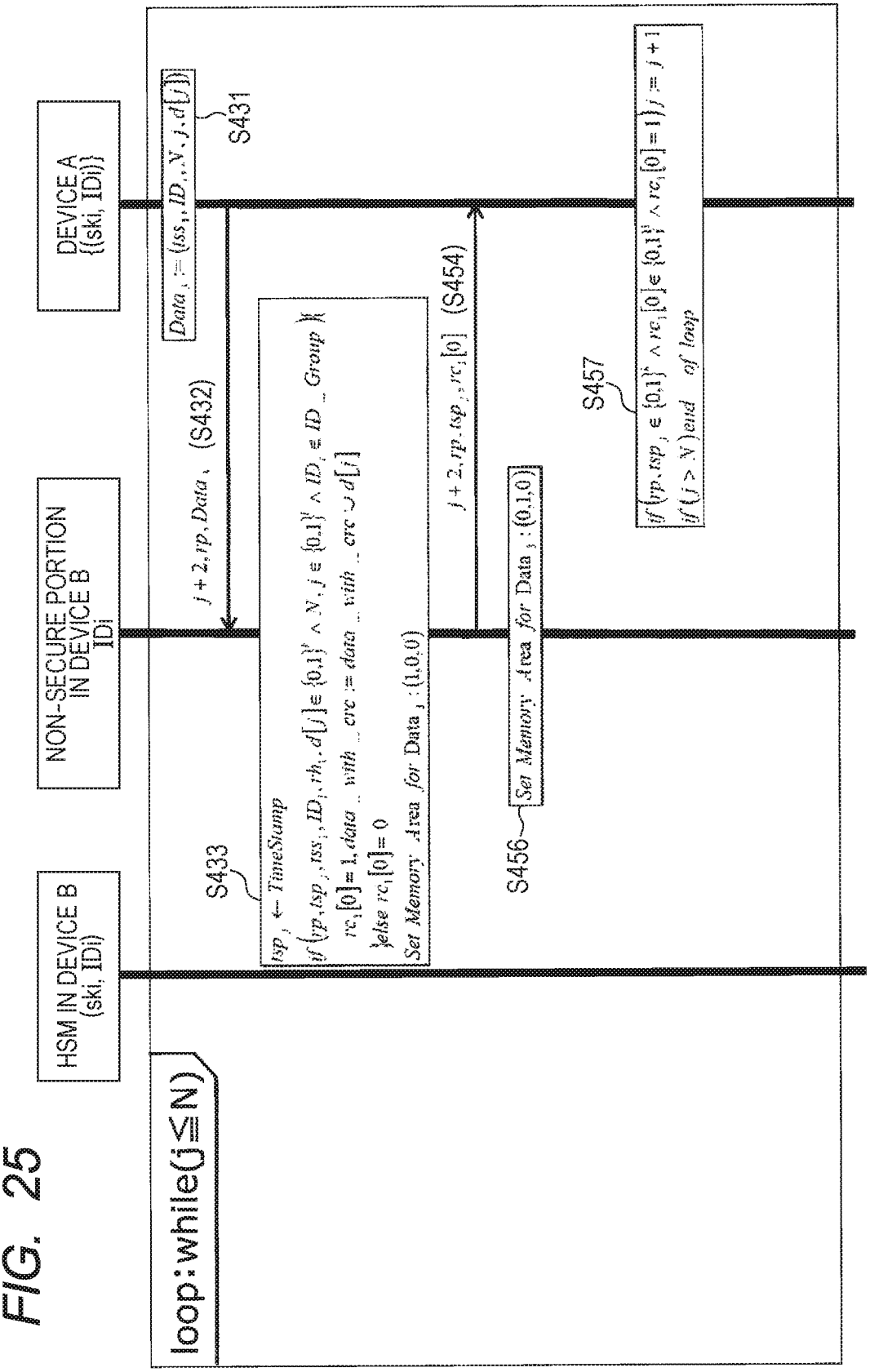
FIG. 25 is a sequence diagram showing the data transmission/reception sequence executed in the authentication system according to the modification of the second embodiment.
Figure 26:
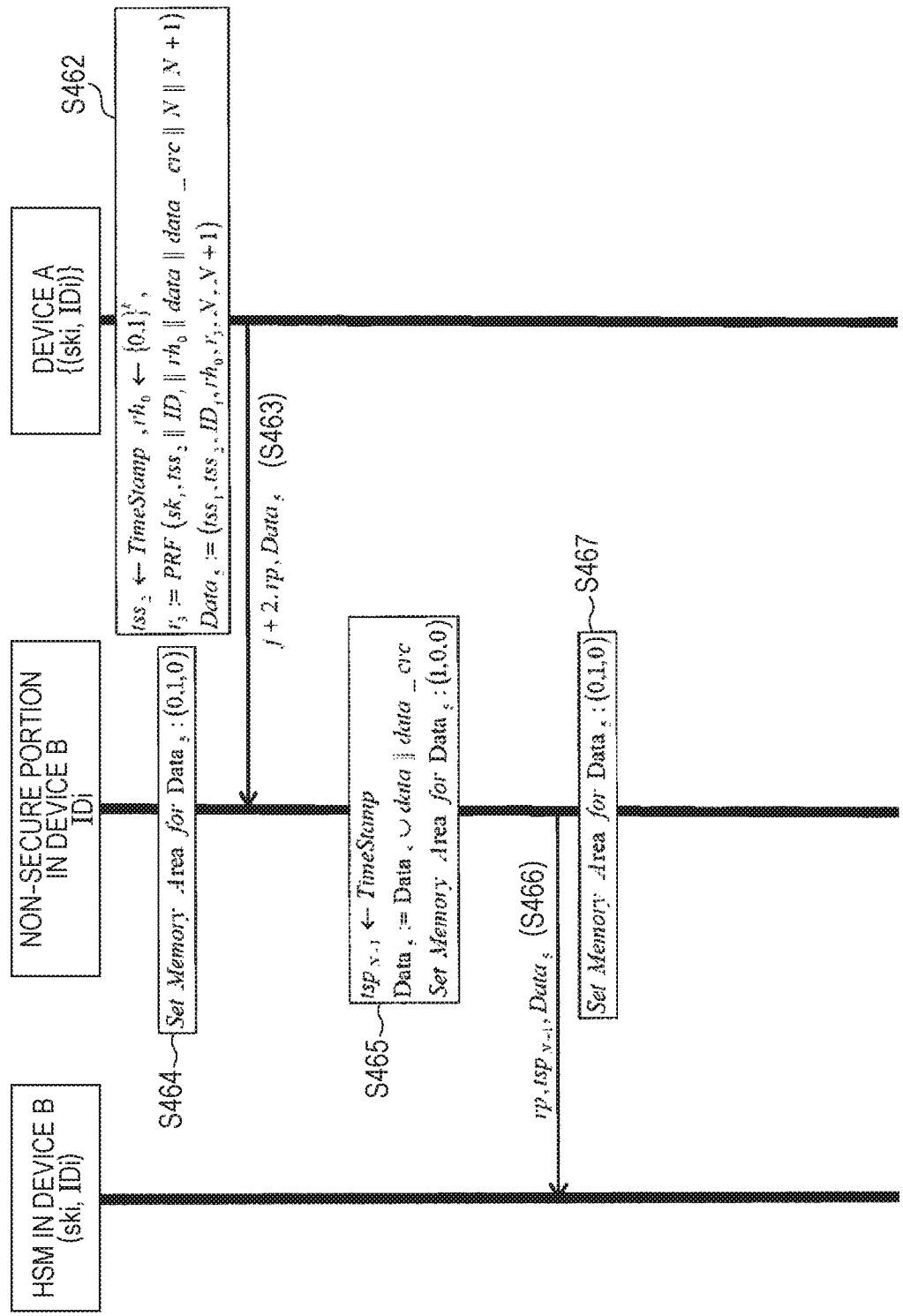
FIG. 26 is a sequence diagram showing the data transmission/reception sequence executed in the authentication system according to the modification of the second embodiment.
Figure 27:
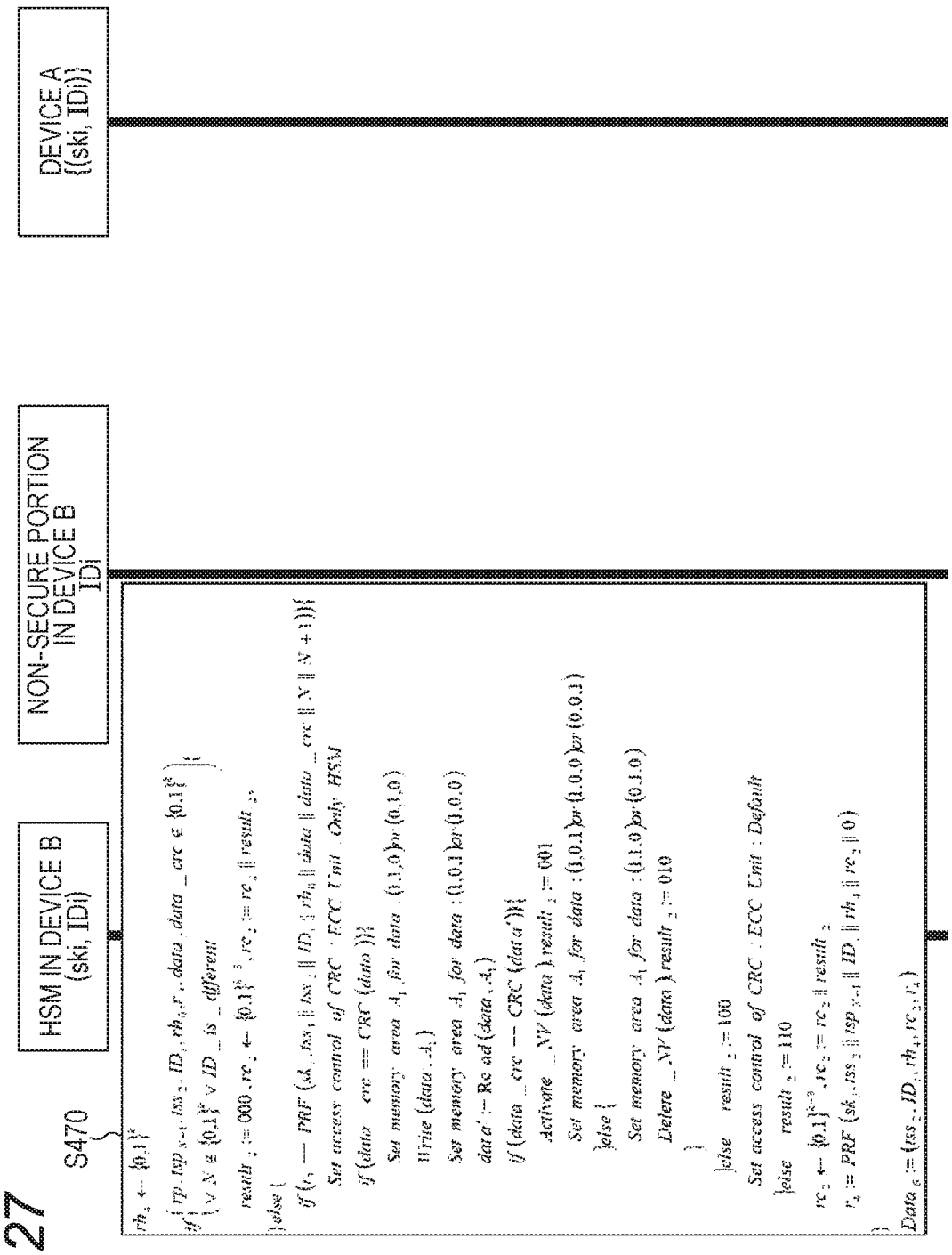
FIG. 27 is a sequence diagram showing the data transmission/reception sequence executed in the authentication system according to the modification of the second embodiment.
Figure 28:
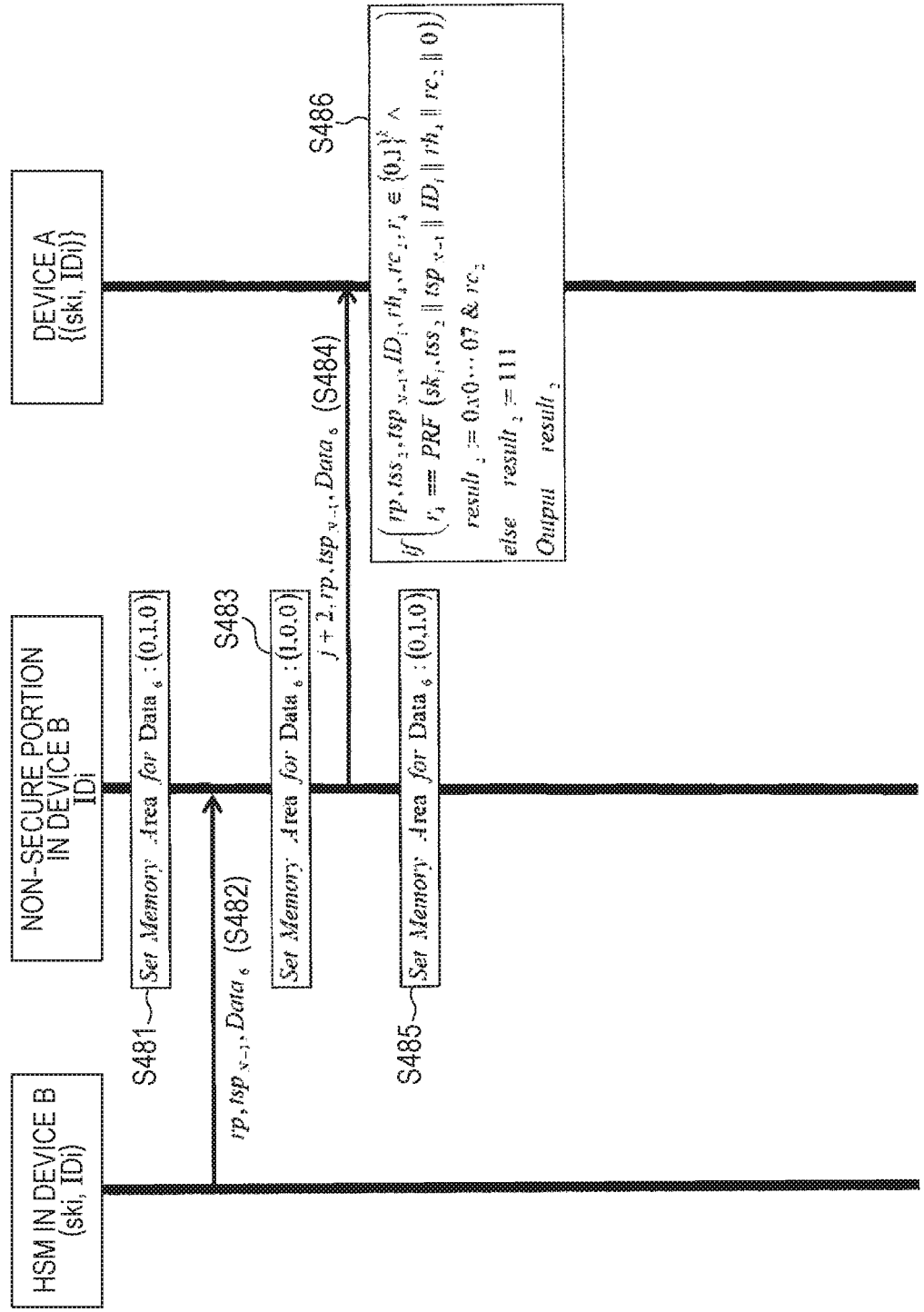
FIG. 28 is a sequence diagram showing the data transmission/reception sequence executed in the authentication system according to the modification of the second embodiment.
Figure 29:
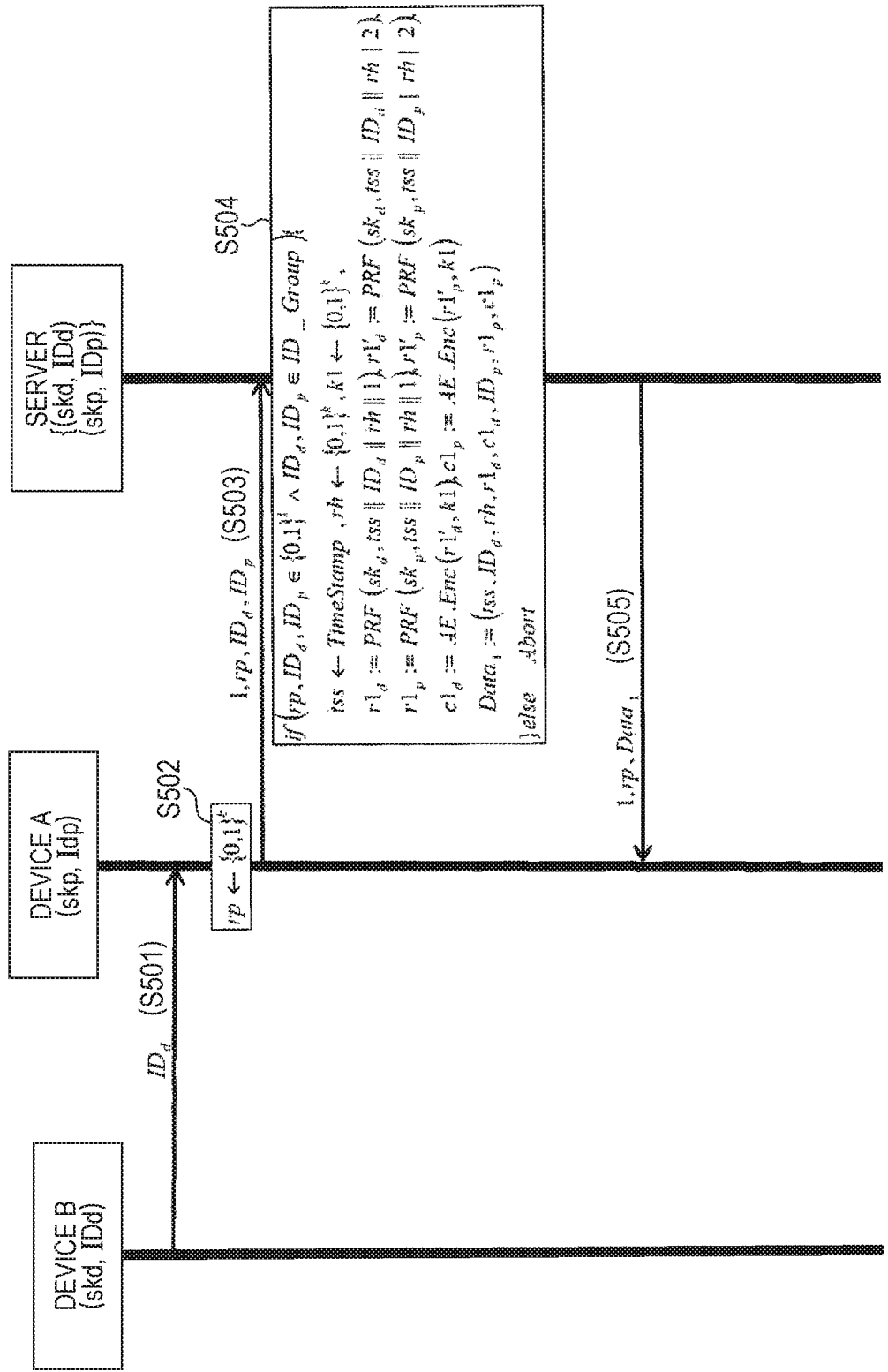
FIG. 29 is a sequence diagram showing a data transmission/reception sequence executed in an authentication system according to a third embodiment.
Figure 30:
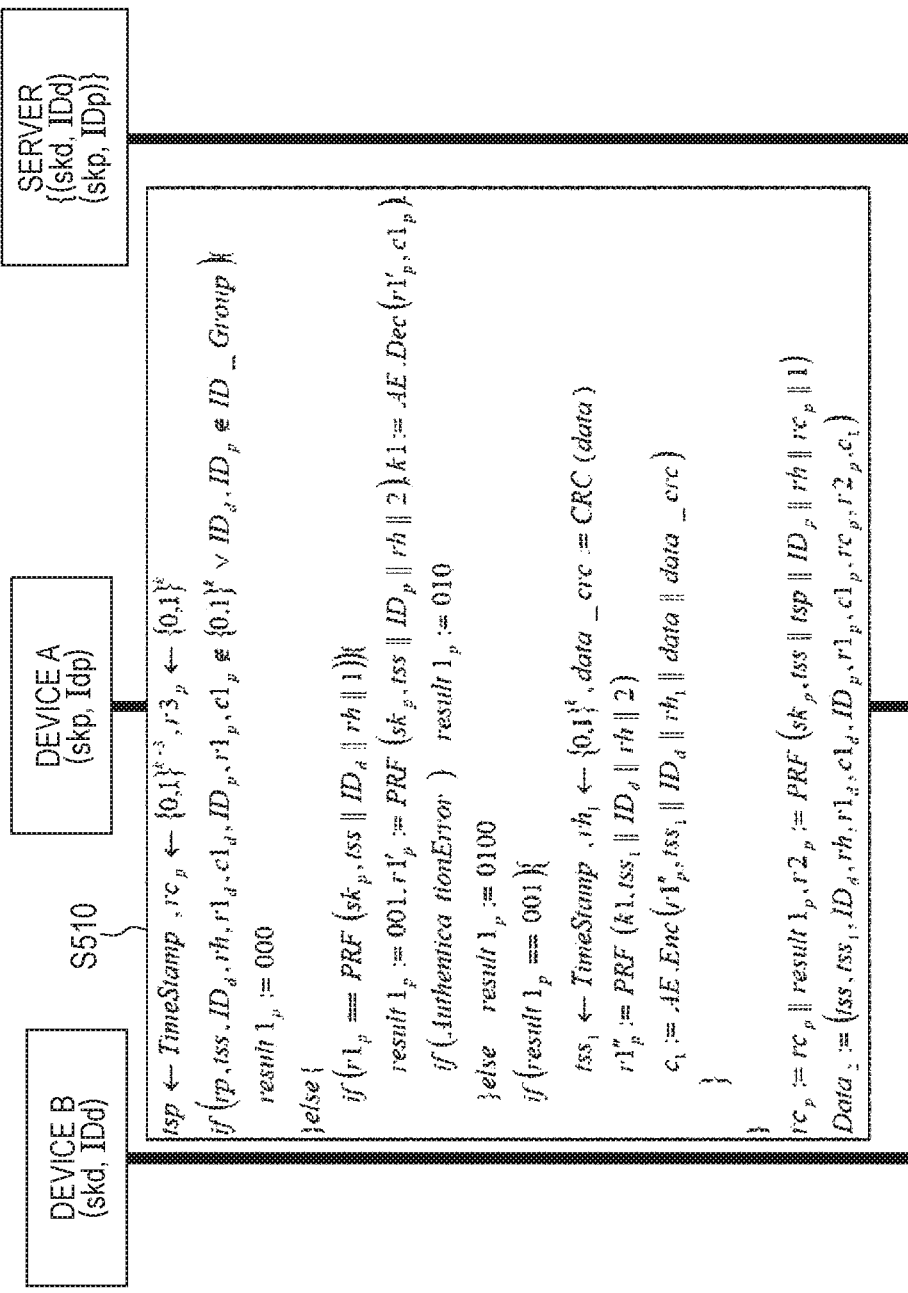
FIG. 30 is a sequence diagram showing the data transmission/reception sequence executed in the authentication system according to the third embodiment.
Figure 31:
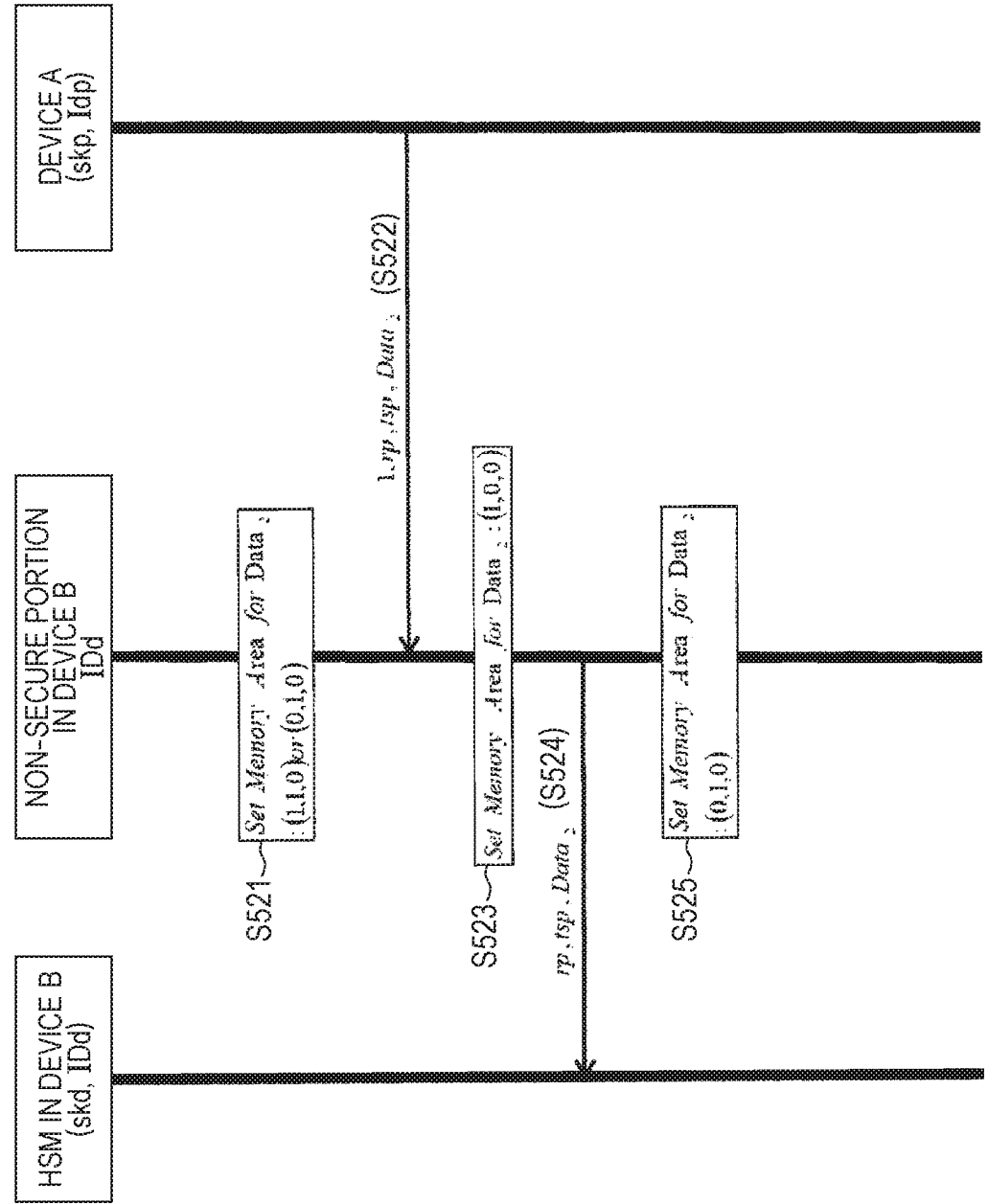
FIG. 31 is a sequence diagram showing the data transmission/reception sequence executed in the authentication system according to the third embodiment.
Figure 32:
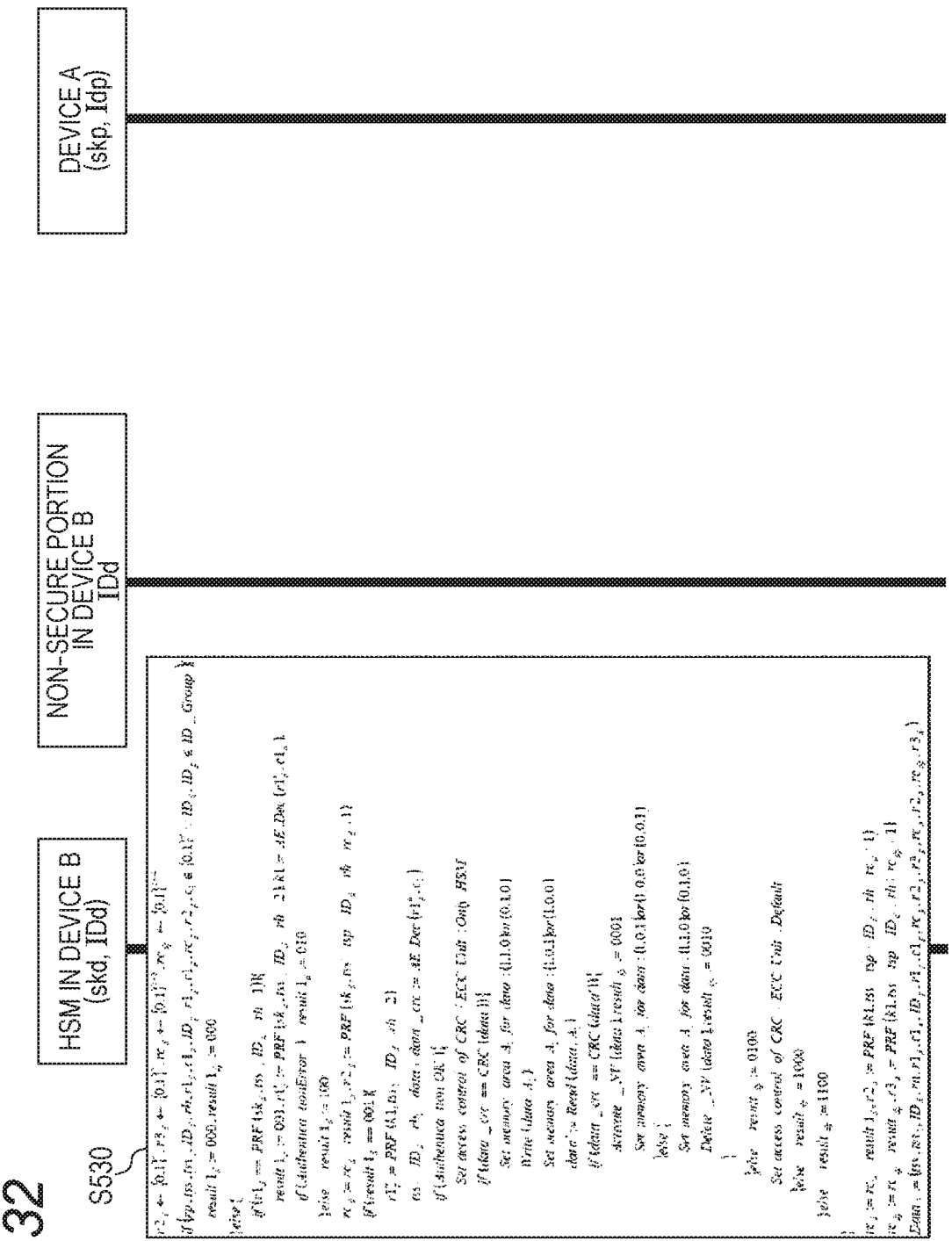
FIG. 32 is a sequence diagram showing the data transmission/reception sequence executed in the authentication system according to the third embodiment.
Figure 34:
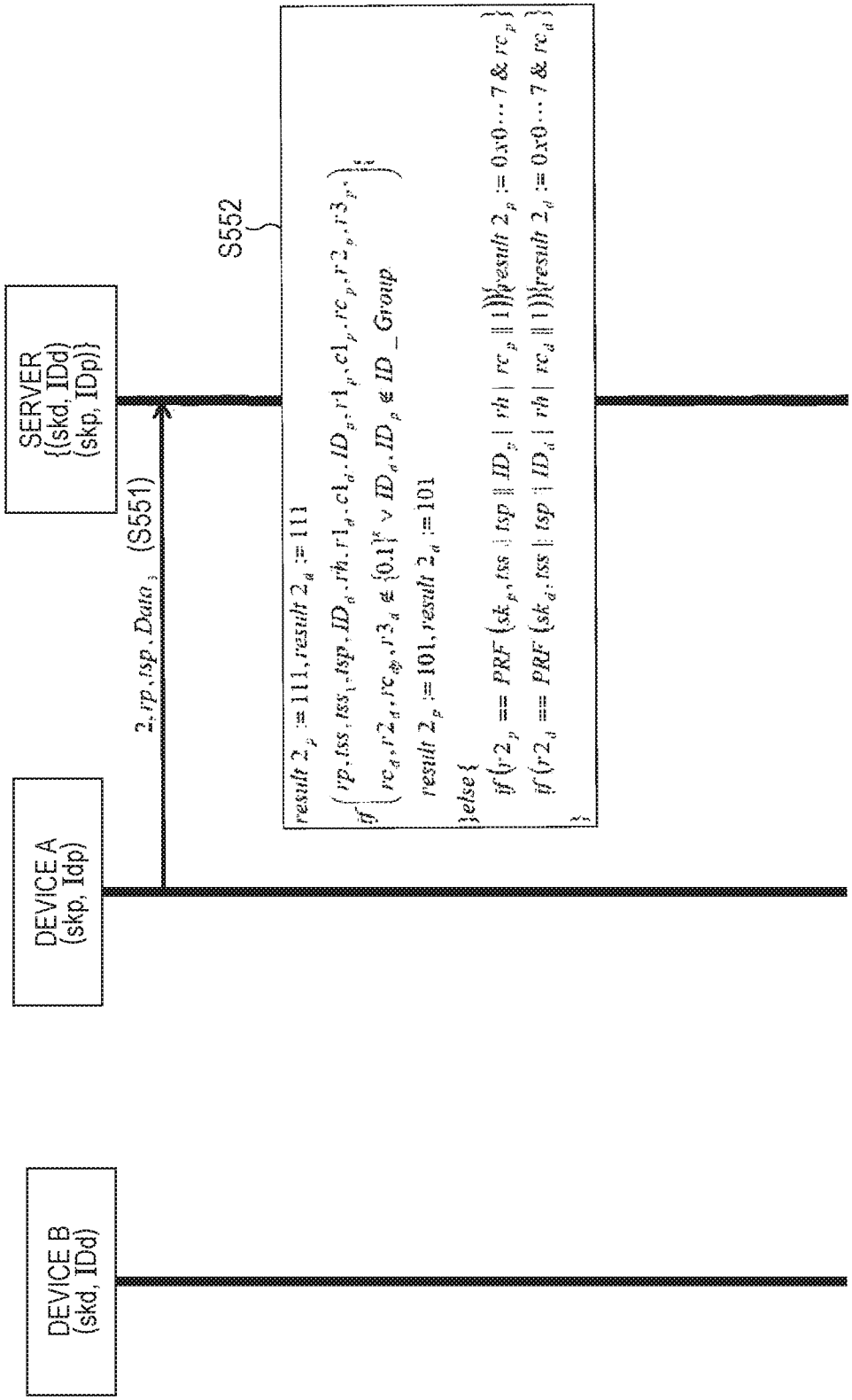
FIG. 34 is a sequence diagram showing the data transmission/reception sequence executed in the authentication system according to the third embodiment.

FIGS. 20 to 22 show a data transmission/reception sequence executed in the authentication system 100 according to the second embodiment. Note that, since the configuration of the authentication system 100 according to the second embodiment is substantially the same as that of the authentication system 100 according to the first embodiment shown in FIG. 10, a description thereof is omitted. It is assumed that, as the initial settings of a common symmetrical key for the devices A102 and B110, the following settings are made in advance.

The device A102 receives $1^k$ input thereto, where k is a security parameter. The device A102 selects a symmetrical key ski-$\{0, 1\}^k$ for each of the devices B110 to which an authentication identifier IDi$\in\{0, 1\}^k$ is assigned and transmits (ski, IDi) to the device B110. The device B110 stores (ski, IDi) in a nonvolatile memory. The device B110 also transmits the set ID of the authentication identifier IDi to the device A102. It is assumed herein that the total number of the devices B110 is N and i$\in$[1, N] is satisfied. For example, it may also be possible that, by making such initial settings before the devices B110 are shipped, a specific key is set to each of the devices B110 and stored in the device A102. It is also assumed that the non-secure portion 120 of each of the devices B110 is allowed to read IDi stored in the hardware security module circuit 10 embedded in the device B110, but is not allowed to perform an override operation and an erase operation under appropriate access control.

(1) Construction of Device Authentication Information in Device A

The non-secure portion 120 of each of the devices B110 acquires IDi from the hardware security module circuit 10 (Step S301). The non-secure portion 120 may read IDi from the hardware security module circuit 10 or may also receive IDi from the hardware security module circuit 10. On acquiring IDi, the non-secure portion 120 selects session information rp$\in\{0, 1\}^k$ for session management (Step S302) and transmits (1, rp, IDi) to the device A102 (Step S303). In (1, rp, IDi), "1" shows a first process in the session information rp. On receiving (1, rp, IDi), the device A102 performs the following process (Step S304), whereby the device B110 is authenticated.

1. It is verified whether or not rp, IDi$\in\{0, 1\}^k$ and IDi$\in$ID are satisfied. In other words, the bit lengths of rp and IDi are verified and it is verified whether or not IDi has been registered. If rp, IDi$\in\{0, 1\}^k$ and IDi$\in$ID are not satisfied, the process is ended. If rp, IDi$\in\{0, 1\}^k$ and IDi$\in$ID are satisfied, the following process is executed.

2. The current time is selected as tss←TimeStamp.

3. A random number is selected as rh1←$\{0, 1\}^k$.

4. For transmitted data, CRC or ECC is calculated. Assuming that, e.g., CRC is calculated, data_crc:=CRC (data) is set up.

5. r1:=PRF(ski, tss1||IDi||rh1||data||data_crc||1) is calculated, where r1 is a signature to the data. Thus, in the second embodiment, c1 (authenticated encryption data) is not generated. In other words, in the second embodiment, data is not encrypted.

Then, the device A102 sets up Data1:=(tss, IDi, rh1, r1, data, data_crc) and transmits (1, rp, Data1) to the non-secure portion 120 of the device B110 (Step S305).

(Data Signature Verification, Data Storage, and Result Collection in Device B)

The non-secure portion 120 of each of the devices B110 sets the (R, W, E) attributes of the memory area in which Data1 is stored to (1, 1, 0) or (0, 1, 0) using, e.g., the access control circuit 20 described above (Step S306). In other words, the access control circuit 20 sets the (R, W, E) attributes such that data is writable and a program is inexecutable. The non-secure portion 120 also selects the current time as tsp←TimeStamp. On receiving Data1, the non-secure portion 120 sets the (R, W, E) attributes of the memory area of the non-secure portion 120 to (1, 0, 0) using, e.g., the access control circuit 20 (Step S307). In short, the access control circuit 20 sets the (R, W, E) attributes such that data is only readable.

Then, the non-secure portion 120 transmits (rp, tsp, Data1) to the hardware security module circuit 10 of the device B110 (Step S308). At this time, when the transmission is completed, the non-secure portion 120 sets the (R, W, E) attributes of the memory area of the non-secure portion 120 to (0, 1, 0) using, e.g., the access control circuit 20, and then erases Data1 (Step S309). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tsp, Data1=(tss, IDi, rh1, r1, data, data_crc)), the hardware security module circuit 10 of the device B110 sets up rh2←{0, 1}^m on the assumption that m is the size of data//data_crc and performs the following process (i.e., on the assumption that the bit length of rh2 is m) (Step S310). Thus, the device A102 is authenticated and the received data is verified.

1. It is verified whether or not rp, tsp, tss, IDi, rh1, r1, data, data_crc∈{0, 1}^k is satisfied. In other words, it is verified whether or not the length of each data item has a prescribed value. Then, it is checked whether or not IDi matches the identifier of the device B110. Thus, simple screening is performed.

If rp, tsp, tss, IDi, rh1, r1, data, data_crc∈{0, 1}^k is not satisfied, result1:=000, rc←{0, 1}^(k-3),rc:=rc||result1 is set up, and a process as will be described later is no longer executed. The value "000" of result1 used herein shows that an unauthorized access has been made. If rp, tsp, tss, IDi, rh1, r1, data, data_crc∈{0, 1}^k is satisfied, the following operation is executed.

2. It is verified whether or not r1=PRF(ski, tss1||IDi||rh1||data||data_crc||1) is satisfied, i.e., whether or not authentication (signature verification) is successful. When the authentication is not successful, result1 is set to satisfy result1:=110 showing that the signature authentication has failed. When the authentication is successful, the following operation is executed.

3. For example, the access control circuit 20 sets access control such that only hardware security module circuit 10 is allowed to access the error detection circuit 4. Separately from data_crc, the CRC of data is calculated using CRC (data), and it is verified whether or not the calculated CRC of data matches data_crc. When there is no match, result1 is set to satisfy result1=100 showing that the CRC checking has failed. When there is a match, the following operation is executed.

When there is no access control mechanism, the error detection circuit 4 disposed in the non-secure portion 120 in the device B110 is requested to perform the CRC checking. In that case, the hardware security module circuit 10 selects a random number rh2'←{0, 1}^k, sets up r0:=PRF(ski, tss1||IDi||rh2'||data||data_crc||2), and transmits data to the error detection circuit 4 disposed in the non-secure portion 120 in the device B110. Thus, the hardware security module circuit 10 assigns the CRC checking to the error detection circuit 4 and receives the result and data_crc2. Then, to check that there is no data falsification, the hardware security module circuit 10 verifies whether or not r0=PRF(ski, tss1||IDi||rh2'||data||data_crc2||2) is satisfied. When r0=PRF(ski, tss||IDi||rh2'μdata||data_crc2||2) is not satisfied or the result of receipt is "fail", the hardware security module circuit 10 sets result1 to satisfy result1:=100. When r0=PRF(ski, tss||IDi||rh2'||data||data_crc2||2) is satisfied and the result is "pass", the following operation is executed.

4. The (R, W, E) attributes of the area A1 where data is stored are set to (1, 1, 0) or (0, 1, 0) (i.e., such that data is writable and a program is inexecutable), and data is stored (written) in the area A1. As a result, when data that has passed the CRC checking (i.e., in which no error is detected) is written, it is possible to inhibit an attacker or the like from falsifying the data. In addition, the (R, W, E) attributes of the area A1 are set to (1, 0, 1) or (1, 0, 0) (i.e., such that data is readable and unwritable), and data is read again from the area A1 and set as data'. The CRC of data' is calculated using CRC(data'), and it is verified whether or not the CRC of data' matches data_crc. Since the data may be broken when written in the nonvolatile memory, to improve fault tolerance, the data is thus read after being written and subjected to CRC checking. Such a process can inhibit an attacker or the like from falsifying the data when the data is read for the detection of an error that has occurred during the writing of the data.

When there is a match between CRC(data') and data_crc, the (R, W, E) attributes of the area A1 are set to (1, 0, 1), (1, 0, 0), or (0, 0, 1) (i.e., such that data is unwritable). When the area A1 is a nonvolatile memory portion, an activation process is performed thereon. Then, result1 is set to satisfy result1:=001 showing that all the processes are successful. When data is a critical program and needs confidentiality, the (R, W, E) attributes of the area A1 are set to (0, 0, 1) such that the program is only executable. When there is no match between CRC(data') and data_crc, the (R, W, E) attributes of the area A1 are set to (1, 1, 0) or (0, 1, 0) (i.e., such that data is writable and the program is inexecutable), and data written in the area A1 is erased. This can inhibit inappropriate execution or reading of the data. Then, result1 is set to satisfy result1:=010 showing that the CRC checking has failed again.

When access control over the error detection circuit 4 cannot be set, the error detection circuit 4 is requested to perform the CRC checking. In this case, a process as shown below may also be performed. That is, the hardware security module circuit 10 selects a random number rh2"{0, 1}^k, sets up r0':=PRF(ski, tss||IDi||rh2"||data||data_crc||3), and transmits data to the error detection circuit 4 disposed in the non-secure portion 120 in the device B110. Thus, the hardware security module circuit 10 assigns the CRC checking to the error detection circuit 4 and receives the result and data_crc2'. Then, to check that there is no data falsification, the hardware security module circuit 10 verifies whether or not r0'=PRF(ski, tss∥IDi∥rh2'''∥data∥data_crc2'∥3) is satisfied. When r0'=PRF(ski, tss∥IDi∥rh2'''∥data∥data_crc2'∥3) is not satisfied or when the result of the reception is "fail", the hardware security module circuit 10 sets the (R, W, E) attributes of the area A1 to (1, 1, 0), (1, 0, 0) or (0, 1, 0), erases data written in the area A1, and sets result1 to satisfy result1:=010. When r0'=PRF(ski, tss∥IDi∥rh2'''∥data∥data_crc2'∥3) is satisfied and the result of the reception is "pass", the hardware security module circuit 10 sets the (R, W, E) attributes of the area A1 to (1, 1, 0), (1, 0, 0) or (0, 0, 1). When the area A1 is a nonvolatile memory portion, the hardware security module circuit 10 performs an activation process thereon. The hardware security module circuit 10 further sets result1 to satisfy result1:=001. When data is a critical program and needs confidentiality, the hardware security module circuit 10 sets the (R, W, E) attributes to (0, 0, 1) to allow only execution of the program.

5. For example, the access control circuit 20 sets access control such that another module which needs processing by the error detection circuit 4, such as the CPU 2, is allowed to access the error detection circuit 4. Then, a random number is selected as rc←{0, 1}^(k-3) to satisfy rc:=rc∥result1∈{0,1}^k.

6. r2:=PRF(ski, tss∥tsp∥IDi∥rh2∥rc) is calculated. Then, the hardware security module circuit 10 of the device B110 sets up Data2:=(tss, IDi, rh2, rc, r2) and transmits (rp, tsp, Data2) to the non-secure portion 120 of the device B110 (Step S320).

7. On receiving Data2, the non-secure portion 120 of the device B110 sets the (R, W, E) attributes of the corresponding memory area to (1, 0, 0) (Step S321), and then transmits (2, rp, tsp, Data2) to the device A102 (Step S322), where "2" represents a second process in the session information rp. When the transmission is completed, the non-secure portion 120 sets the (R, W, E) attributes of the corresponding memory area to (0, 1, 0) and then erases Data2 (Step S323).

Note that the (R, W, E) attributes may also be updated using the (R, W, E) attribute control mechanism (access control circuit 20) shown in FIGS. 3 to 9. Note that, when the (R, W, E) attribute control mechanism shown in FIGS. 3 to 9 is not used, settings may also be made using a memory protection unit (MPU) or a memory management unit (MMU). In the case of using the mechanism in FIG. 6, even when each of the attributes R and W is "0", data can be read and written by setting the hardware security module circuit 10. Accordingly, the attributes need to be changed in consideration of this. When a transition is not made between S1 and S2 in FIG. 6, an updatable range is limited, and therefore the attributes need to be changed within the limited range.

Note that, when there is a time limit to the transmission from the device A102 to the non-secure portion 120 of the device B110 and tsp is reliable, it may also be possible to recognize the time limit by comparing tss to tsp during the size checking in the process 1, described above. When there is a time limit to the authentication process in a target terminal to be authenticated and the clock of the non-secure portion 120 of the device B110 is reliable, it may also be possible to recognize the time limit by comparing tsp to the time (hereinafter referred to as tsp2) when the authentication result is received from the terminal to be authenticated. As a result, when an excessively long time is needed for a process, an inappropriate process can be detected.

(3) Verification of Authentication Result in Device A The non-secure portion 120 of each of the devices B110 transmits (2, rp, tsp, Data2) to the device A102 (S322). On receiving (2, rp, tsp, Data2=(tss, IDi, rh2, rc, r2)), the device A102 executes the following process (Step S324). Thus, the device A102 and the device B110 perform mutual authentication therebetween. Note that, since the data has not been encrypted, the data is not decrypted.

The device A102 verifies whether or not rp, tss, tsp, IDi, rc, r2∈{0, 1}^k and rh2∈{0, 1}^m are satisfied, i.e., whether or not the length of each data item has a prescribed value. When rp, tss, tsp, IDi, rc, r2∈{0, 1}^k and rh2∈{0, 1}^m are not satisfied, the device A102 sets result2 to satisfy result2:=000. When rp, tss, tsp, IDi, rc, r2∈{0, 1}^k and rh2∈{0, 1}^m are satisfied, the device A102 verifies whether or not r2=PRF(ski, tss∥tsp∥IDi∥rh2∥rc) is satisfied (i.e., whether or not the signature is correct). When the signature is correct, the device A102 sets result2 to satisfy result2:=lower 3 bits of rc (i.e., the value of result1) and otherwise sets result2 to satisfy result2:=000.

Then, the device A102 outputs result2 as the authentication result and records the authentication result.

When result2 shows "001", "001" means that the data is successfully stored in the data storage area of the device B110 without being falsified by a man-in-the middle and without suffering from a loss. When result2 shows "010", "010" means a write failure due to a data loss in the writing of the data. When result2 shows "100", "100" means that authentication is successful, but a data loss has occurred before the writing of the data. When result2 shows "110", "110" means the occurrence of a reception error (message falsification may have occurred).

Note that, when there is a limit to the time period between the transmission of the authentication data from the device A102 to the non-secure portion 120 of the device B110 and the acquisition of the authentication data by the device A102 from the non-secure portion 120 of the device B110, it may also be possible to recognize the time limit by comparing tss to the current time in the device A102 during the size checking described above. When there is a limit to the transmission of whether or not signature verification performed on signature data is successful from the non-secure portion 120 of the device B110 to the device A102 and the clock of the non-secure portion 120 of the device B110 is reliable, it may also be possible to recognize the time limit by transmitting the data to which tsp2 has been added from the non-secure portion 120 of the device B110 to the device A102 and comparing tsp2 to tss.

When the target data to be transferred is transferred from the device A102 as the external device to the semiconductor device 1 (device B110) according to the second embodiment, the hardware security module circuit 10 receives the authentication data (Data1, Data2) from the device A102 via the memory area of the non-secure portion 120 and transmits the authentication data to the device A102. This allows the semiconductor device 1 (device B110) to perform mutual authentication with the device A102. The memory area of the non-secure portion 120 is configured so as not to be accessed by an attacker or the like under the access control. Accordingly, when the target data to be transferred is transferred, it is possible to inhibit an attacker or the like from spoofing as a device at the destination.

The data transmission/reception sequence according to the second embodiment is fail-safe since, when rp is falsified, the corresponding session is no longer present or, even when the corresponding session is present, the sequence does not continue due to an authentication failure in the device B110 in a different session. The data transmission/reception sequence according to the second embodiment is also fail-safe even when rh2 is falsified since the signature verification performed on the signature data in the device A102 fails. Also, in the data transmission/reception sequence according to the second embodiment, even when an attacker or the like falsifies the value of rc, due to a means for signature verification performed on the signature data in the device A102, the attacker or the like cannot pretend that the verification in the device A102 is successful. Also, in the data transmission/reception sequence according to the second embodiment, even when tsp is falsified, due to the means which verifies the result of the authentication in the device A102, the attacker or the like cannot pretend that the verification in the device A102 is successful. In other words, even when any of rp, rh2, and tsp is falsified, in the signature verification performed on the signature data formed in the hardware security module circuit 10, the attacker or the like cannot pretend that the data writing is successful or the verification is successful. Accordingly, in the second embodiment, when all or any of rp, rh2, and rc is falsified, it is possible to sense the presence of any falsification. Note that, for the purpose of efficiently detecting an authentication failure or a verification failure due to falsification, it may also be possible to add a hash value to tsp.

Also, in the second embodiment, the target data to be transferred is not encrypted. However, since access control over the non-secure portion 120 is performed, it is possible to inhibit an attacker or the like from reading the data during data transfer and executing the data (program). In addition, even when there is any falsification, it is possible to detect the falsification by performing CRC checking. This allows secure data transmission/reception considering functional safety to be implemented by merely performing signature verification without encrypting the target data to be transferred. Accordingly, it is possible to reduce a process and hardware each for encrypting the target data to be transferred.

Modification of Second Embodiment

Next, a description will be given of a modification of the second embodiment. The sequence diagrams shown in FIGS. 20 to 22 show a sequence for transferring target data to be transferred from the device A102 to the device B110 by one session. When the data size of the target data to be transferred is larger than a transferrable size and therefore the data needs to be segmented and transferred by a plurality of sessions and when the sequence shown in FIGS. 20 to 22 is used without alteration, it is necessary to perform a process such as authentication a plurality of times corresponding to the plurality of sessions.

When the transferable size is limited, it is conceivably more efficient to add signature data or the like to the whole target data to be transferred, segment the whole target data with the added signature data or the like into a plurality of data segments, and transfer the data segments than to segment the target data to be transferred into a plurality of data segments, individually add signature data or the like to each of the data segments upon transfer thereof, and transfer the data segment with the added signature data in one of transfer sessions. For example, when consideration is given to the storage of data in a nonvolatile memory, it is more efficient to store a sufficient amount of data in the hardware security module circuit 10 of the device B110, then perform signature verification or the like thereon, and then write the data to the data area.

FIGS. 23 to 28 are sequence diagrams each showing a data transmission/reception sequence executed in the authentication system 100 according to the modification of the second embodiment. Since the configuration of the authentication system 100 according to the modification of the second embodiment is substantially the same as that of the authentication system 100 according to the first embodiment shown in FIG. 1, a description thereof is omitted.

Using the sequence diagrams in FIGS. 23 to 28, an operation in accordance with a protocol which allows simultaneous addition of signature data or the like considering functional safety and having falsification resistance and confidentiality as well as transmission/reception of the data with the added signature data or the like by segmental transfer. The sequence in FIGS. 23 to 28 mentioned herein has (1) a mutual authentication process (S401 to S424) involving the notification of the number of transfer sessions, (2) a repeated segmental transfer process (S431 to S457) for the wholly signed data, and (3) a mutual authentication process (S462 to S486) involving signature verification performed on the combined data and data storage. It is assumed that, as a result of initial setting of a common symmetrical key for the device A102 and the device B110, the following settings are made.

The device A102 receives $1\hat{}k$ input thereto where k is a security parameter. The device A102 selects a symmetrical key ski-$\{0, 1\}\hat{}k$ for the device B110 to which an authentication identifier IDi$\in\{0, 1\}\hat{}k$ is assigned and transmits (ski, IDi) to the device B110. The device B110 stores (ski, IDi) in the nonvolatile memory. The device B110 also transmits the set ID of the authentication identifiers IDi to the device A102. It is assumed herein that the total number of the devices B110 is M and i$\in[1, M]$ is satisfied. It may also be possible that, by performing such a process before the devices B110 are shipped, a specific key is set to each of the devices B110 and stored in the device A102. It is also assumed that the non-secure portion 120 of each of the devices B110 is allowed to read IDi stored in the hardware security module circuit 10 embedded in the device B110, but is not allowed to perform an override operation and an erase operation under appropriate access control.

(1) Mutual Authentication Process Involving Notification of Number of Transfer Sessions (1-1) Construction of Device Authentication Information in Device A The non-secure portion 120 of each of the devices B110 acquires IDi from the hardware security module circuit 10 (Step S401). The non-secure portion 120 may read IDi from the hardware security module circuit 10 or may also receive IDi from the hardware security module circuit 10. On acquiring IDi, the non-secure portion 120 selects session information rp$\in\{0, 1\}\hat{}k$ for session management (Step S402) and transmits (1, rp, IDi) to the device A102 (Step S403). In (1, rp, IDi), "1" shows a first process in the session information rp. On receiving (1, rp, IDi), the device A102 performs the following process (Step S404), whereby the device B110 is authenticated and a signature is given to the number of transfer sessions.

1. It is verified whether rp, IDi$\in\{0, 1\}\hat{}k$ and IDi$\in$ID are satisfied. If rp, IDi$\in\{0, 1\}\hat{}k$ and IDi$\in$ID are not satisfied, the process is ended. If rp, IDi$\in\{0, 1\}\hat{}k$ and IDi$\in$ID are satisfied, the following process is performed.

2. The current time is selected as tss1$\leftarrow$TimeStamp.

3. A random number is selected as rh1$\leftarrow\{0, 1\}\hat{}k$.

4. For the transmitted data, CRC or ECC is calculated. Assuming that, e.g., CRC is calculated, data_crc:=CRC (data) is set up. Then the device A102 segments data//data_crc into N segments in consideration of the size of the target data to be transferred to construct $\{d[j]; j=1, \ldots, N\}$.

5. To make a notification of the number N of the data segments to be transferred, r1:=PRF(ski, tss1||IDi||rh1||N||1) is calculated, where r1 is not a signature added to the target data to be transferred, but a signature added to the number N of transfer sessions, and "ski" is a key for signature verification.

6. Data1:=(Tss, IDi, rh1, r1, N) is set up, and (1, rp, Data1) is transmitted to the non-secure portion 120 of the device B110 (Step S405).

(1-2) Data Signature Verification, Data Storage, and Result Collection in Device B The non-secure portion 120 of each of the devices B110 sets the (R, W, E) attributes of the memory area in which Data1 is stored to (1, 1, 0) or (0, 1, 0) (Step S406). In other words, thee (R, W, E) attributes are set such that data is writable and a program is inexecutable. The (R, W, E) attributes may also be changed using, e.g., the access control circuit 20 described above. The non-secure portion 120 also selects the current time as tsp1←TimeStamp. On receiving Data1, the non-secure portion 120 sets the (R, W, E) attributes of the corresponding memory area to (1, 0, 0) (Step S407). In short, the access control circuit 20 sets the (R, W, E) attributes such that data is only readable.

Then, the non-secure portion 120 transmits (rp, tsp1, Data1) to the hardware security module circuit 10 of the device B11 (Step S408). When the transmission is completed, the non-secure portion 120 sets the (R, W, E) attributes of the memory area of the non-secure portion 120 to (0, 1, 0), and then erases Data1 (Step S409). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tsp1, Data1=(tss1, IDi, rh1, r1, N)), the hardware security module circuit 10 of the device B110 sets up rh2←{0, 1}^k and performs the following process (Step S410). Thus, the device A102 and the number N of transfer sessions are authenticated.

1. verified whether or not rp, tsp1, tss1, IDi, rh1, r1∈{0, 1}^k is satisfied, i.e., whether or not the length of each data item has a prescribed value. Then, it is checked whether or not IDi matches the identifier of the device B110. Note that, when rp, tsp1, tss1, IDi, rh1, r1∈{0, 1}^k is not satisfied, result1:=00, rc←{0,1}^k−2), rc1:=rc1||result1 is set up. Then, a process as will be described later is no longer executed. The value "00" of result1 used herein shows that an unauthorized access has been made. If rp, tsp1, tss1, IDi, rh1, r1∈{0, 1}^k is satisfied, the following operation is executed.

2. It is verified whether or not r1=PRF(ski, tss1||IDi||rh1||N||1) is satisfied. When r1=PRF(ski, tss1||IDi||rh1||N||1) is satisfied, result1 is set to satisfy result1:=01 showing that the authentication of the device A102 and the number N of transfer sessions is successful. When r1=PRF(ski, tss1||IDi||rh1||N||1) is not satisfied, result1 is set to satisfy result1:=10 showing that the authentication of the device A102 has failed. Note that, since the number N of the data segments resulting from the segmentation is transmitted to the hardware security module circuit 10, the hardware security module circuit 10 is allowed to recognize how many times data is transmitted from the device A102 (i.e., how many data segments results from the segmentation).

3. A random number is selected as rc1←{0, 1}^k−2, and rc1:=rc1||result1 is set up.

4. r2:=PRF(ski, tss1||tsp1||IDi||rh2||rc1||N) is calculated, where r2 is a signature added to the number N of transfer sessions. Then, the device B110 sets up Data2:=(tss1, IDi, rh2, rc1, N, r2) and transmits (rp, tsp1, Data2) to the non-secure portion 120 of the device B110 (Step S420).

5. On receiving Data2, the non-secure portion 120 of the device B110 sets the (R, W, E) attributes of the corresponding memory area to (1, 0, 0) (Step S421), and then transmits (2, rp, tsp1, Data2) to the device A102 (Step S422), where "2" represents a second process in the session information rp. When the transmission is completed, the non-secure portion 120 sets the (R, W, E) attributes of the memory area to (0, 1, 0) and then erases Data2. The non-secure portion 120 further sets the (R, W, E) attributes of the memory area where Data3 is placed to (0, 1, 0) in preparation for the reception of Data3 from the device A102 (Step S423).

(1-3) Verification of Authentication Result in Device A
The non-secure portion 120 of each of the devices B transmits (2, rp, tsp1, Data2) to the device A102 (S422). On receiving (2, rp, tsp1, Data2=(tss1, IDi, rh2, rc1, N, r2), the device A102 executes the following process (Step S424). Thus, the device A102 and the device B110 perform mutual authentication therebetween.

The device A102 verifies whether or not rp, tss1, tsp1, IDi, rh2, rc1, r2∈{0, 1}^k and N∈{0, 1}^1 are satisfied, i.e., whether or not the length of each data item has a prescribed value. When rp, tss1, tsp1, IDi, rh2, rc1, r2∈{0, 1}^k and N∈{0, 1}^1 are not satisfied, the device A102 sets result2 to satisfy result2:=11. When rp, tss1, tsp1, IDi, rh2, rc1, r2∈{0, 1}^k and N∈{0, 1}^1 are satisfied, the device A102 verifies whether or not r2=PRF(ski, tss1||tsp1||IDi||rh2||rc1||N) is satisfied (i.e., whether or not the signature is correct). When the signature is correct, the device A102 sets result2 to satisfy result2:=lower 2 bits of rc1 and otherwise sets result2 to satisfy result2:=11.

Then, the device A102 outputs result2 as the authentication result and records the authentication result. When result2 shows "01", "01" means that the number N of the data segments has been reported from the device A102 to the device B110 without being falsified and the mutual authentication between the device A102 and the device B110 is successful. When result2 shows "10", "10" means the occurrence of a reception error (message may have been falsified). When result2=01 is satisfied, the device A102 sets an index variable j representing the number of transfer sessions to satisfy j=1 (initial value). When result2=01 is not satisfied, the process is ended.

The data transmission/reception sequence according to the modification of the second embodiment is fail-safe since, when rp is falsified, the corresponding session is no longer present or, even when the corresponding session is present, authentication in the device B110 in a different session is performed and fails. The data transmission/reception sequence according to the modification of the second embodiment is also fail-safe when rh2 is falsified since the verification of whether or not the process of decrypting the authenticated ciphertext is successful in the device A102 fails. Also, in the data transmission/reception sequence according to the modification of the second embodiment, even when an attacker or the like falsifies the value of rc1, due to a verification means using PRF in the device A102, the attacker or the like cannot pretend that the verification in the device A102 is successful. Also, in the data transmission/reception sequence according to the modification of the second embodiment, even when tsp1 is falsified, due to the means which verifies the result of the authentication in the device A102, the attacker or the like cannot pretend that the verification in the device A102 is successful. In other words, even when any of rp, rh2, and tsp1 is falsified, the attacker or the like cannot pretend that Data2 formed in the hardware security module circuit 10 of the device B110 has succeeded in verification. Accordingly, when all or any of rp, rh2, and rc1 is falsified, it is possible to sense the presence of any falsification. Note that, for the purpose of efficiently detecting an authentication failure or a verification failure due to falsification, it may also be possible to add a hash value to tsp1.

(2) Repetitive Segmental Transfer Process for Wholly Signed Data

The processes (2-1) to (2-3) are repetitively executed below until the transfer of the segmented data $\{d[j]; j=1, \ldots, N\}$ from the device A102 to the device B110 is completed. The mutual authentication between the device A102 and the device B110 is not performed herein in the segmental data transfer process.

(2-1) Construction of Transferred Data in Device A

Assuming that j=1 is satisfied, the device A102 performs the following process.

1. The device A102 generates Data3:=(tss1, IDi, N, j, d[j]) (Step S431) and transmits (j+2, rp, Data3) to the non-secure portion 120 of the device B110 (Step S432).

(2-2) CRC Checking, Data Storage, and Result Collection in Device B

The non-secure portion 120 of each of the devices B110 selects the current time as tspj←TimeStamp. On receiving (j+2, rp, Data3=(tss1, IDi, N, j, d[j])), the non-secure portion 120 sets up $enc_{13}$ data_with_crc:={ }, and performs the following process (Step S433).

1. It is verified whether or not rp, tspj, tss1, IDi, d[j]∈{0, 1}^k and N, j∈{0, 1}^1 are satisfied, i.e., whether or not the length of each data item has a prescribed value. Then, it is checked whether or not IDi matches the identifier of the device B110. When rp, tspj, tss1, IDi, d[j]∈{0, 1}^k and N, j∈{0, 1}^1 are not satisfied, rc1[0]:=0 is set up. When rp, tspj, tss1, IDi, d[j]∈{0, 1}^k and N, j∈{0, 1}^1 are satisfied, the following operation is executed.

2. enc_data_with_crc:=enc_data_with_crc∪d[j] is calculated, and rc1[0]:=1 is set up.

3. The non-secure portion 120 writes (2, rp, tspj, rc1[0]) in the region where Data3 is stored and sets the (R, W, E) attributes of the memory area to (1, 0, 0).

Then, the non-secure portion 120 transmits (j+2, rp, tspj, rc1[0]) to the device A102 (Step S454). When the transmission is completed, the non-secure portion 120 sets the (R, W, E) attributes of the memory area to (0, 1, 0) and then erases rc1[0] (Step S456). When j<N is satisfied, the non-secure portion 120 sets the (R, W, E) attributes of the memory area where Data3 is placed to (0, 1, 0) in preparation for the reception of Data3 from the device A102.

Note that, when there is a time limit to the transmission from the device A102 to the non-secure portion 120 of the device B110 and tspj is reliable, it may also be possible to recognize the time limit by comparing tss1 to tspj during the size checking in 1. described above. When there is a time limit to the authentication process in a target terminal to be authenticated and the clock of the non-secure portion 120 of the device B110 is reliable, it may also be possible to recognize the time limit by comparing tspj to the time (hereinafter referred to as tsp') when the authentication result is received from the terminal to be authenticated.

(2-3) Verification of Authentication Result in Device A

The non-secure portion 120 of each of the devices B110 transmits (j+2, rp, tspj, rc1[0]) to the device A102 (S454).

On receiving (j+2, rp, tspj, rc1[0]), the device A102 executes the following process (Step S457).

The device A102 verifies whether or not rp, tspj∈{0, 1}^k and rc1[0]∈{0, 1}^1 are satisfied, i.e., whether or not the length of each data item has a prescribed value and verifies whether or not rc1[0]=1 is satisfied. When rp, tspj∈{0, 1}^k, rc1[0]∈{0, 1}^1, and rc1[0]=1 are all satisfied, the device A102 sets up j:=j+1. Then, when j>N is satisfied, the device A102 completes the transfer of the data segments from the device A102.

Note that, when there is a limit to the time period between the transmission of the signed data segments from the device A102 to the non-secure portion 120 of the device B110 and the acquisition of a response from the non-secure portion 120 of the device B110 by the device A102, it may also be possible to recognize the time limit by comparing tss1 to the current time in the device A102 during the size checking described above. When there is a limit to the transmission of whether or not the size checking of the signed data segments is successful from the non-secure portion 120 of the device B110 to the device A102 and the clock of the non-secure portion 120 of the device B110 is reliable, it may also be possible to recognize the time limit by transmitting the data to which tsp' has been added from the non-secure portion 120 of the device B110 to the device A102 and comparing tsp' to tss1.

In the data transmission/reception sequence according to the modification of the second embodiment, after all the signed data segments are combined, signature verification is performed in (3) Mutual Authentication Process Involving Signature Verification of Combined Data and Data Storage described later. Accordingly, when all or any of {d[j]; j=1, . . . , N} is falsified, it is possible to sense the presence of any falsification.

(3) Mutual Authentication Portion Involving Signature Verification of Combined Data and Data Storage (3-1) Construction of Device Authentication Information in Device A When j>N is satisfied in the repetitive execution of (2), the device A102 recognizes the completion of the repetitive execution of (2) and performs the following process (Step S462).

1. The current time is selected as tss2←TimeStamp.

2. A random number is selected as rh0←{0, 1}^k.

3. r3:=PRF(ski, tss2∥IDi∥rh0∥data∥data_crc∥N∥N+1) is calculated, where the final "N+1" is intended to give an instruction to perform signature verification of the target data to be transferred since the transfer of the data segments is ended, and r3 is a signature added to the target data to be transferred. Then, the device A102 sets up Data5:=(tss1, tss2, IDi, rh0, r3, N, N+1) and transmits (j+2, rp, Data5) to the non-secure portion 120 of the device B110 (Step S463). Note that the operator "∥" used herein represents bit concatenation, and PRF represents a pseudo-random function.

(3-2) Signature Verification, Data Storage, and Result Collection in Device B

The non-secure portion 120 of each of the devices B110 sets the (R, W, E) attributes of the memory area in which Data5 is stored to (0, 1, 0) (Step S464). In short, the (R, W, E) attributes are set such that data is only writable. The non-secure portion 120 also selects the current time as tspN+1←TimeStamp. On receiving Data5, the non-secure portion 120 calculates Data5:=Data5∪data∥data_crc and further sets the (R, W, E) attributes of the corresponding memory area to (1, 0, 0) (Step S465). In short, the (R, W, E) attributes are set such that data is only readable.

Then, the non-secure portion 120 transmits (rp, tspN+1, Data5) to the hardware security module circuit 10 of the device B110 (Step S466). When the transmission is completed, the non-secure portion 120 sets the (R, W, E) attributes of the memory area of the non-secure portion 120 to (0, 1, 0), and then erases Data5 (Step S467). The non-secure portion 120 also sets the (R, W, E) attributes of the memory area where Data6 received from the hardware security module circuit 10 of the device B110 to (0, 1, 0) (Step S481). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tspN+1, Data5=(tss1, tss2, IDi, rh0, rh3, r3, N, N+1, data, data_crc)), the hardware security module circuit 10 of the device B110 sets up rh4←$\{0,1\}^k$ and performs the following process (Step S470). Thus, the authentication of the device A102 and the signature verification of the received data is performed.

1. It is verified whether or not rp, tspN+1, tss1, tss2, IDi, rh0, r3, data, data_crc∈$\{0, 1\}^k$ and N, N+1∈$\{0, 1\}^l$ are satisfied, i.e., whether or not the length of each data item has a prescribed value. Then, it is checked whether or not IDi matches the identifier of the device B110. When rp, tspN+1, tss1, tss2, IDi, rh0, r3, data, data_crc∈$\{0, 1\}^k$ and N, N+1∈$\{0, 1\}^l$ are not satisfied, result2:=000, rc2←$\{0,1\}^{(k-3)}$, rc2:=rc2∥result2 is set up. When rp, tspN+1, tss1, tss2, IDi, rh0, r3, data, data_crc∈$\{0, 1\}^k$ and N, N+1∈$\{0, 1\}^l$ are satisfied, the following operation is executed. Then, a process as will be described later is no longer executed. The value "000" of result2 used herein shows that an unauthorized access has been made.

2. It is verified whether or not r3=PRF(ski, tss1∥tss2∥IDi∥rh0∥data∥data_crc∥N∥N+1) is satisfied. When r3=PRF(ski, tss1∥tss2∥IDi∥rh0∥data∥data_crc∥N∥N+1) is not satisfied, result2 is set to satisfy result2=110 showing that the result of the signature verification is a failure. When r3=PRF(ski, tss1∥tss2∥IDi∥rh0∥data∥data_crc∥N∥N+1) is satisfied, the following operation is executed.

3. Access control is set such that only the hardware security module circuit 10 is allowed to access the error detection circuit 4. The CRC of obtained data is calculated using CRC(data), and it is verified whether or not the calculated CRC of data matches data_crc. When there is no match, result2 is set to satisfy result2:=0100 showing that the CRC checking has failed. When there is a match, the following operation is executed.

When there is no access control mechanism, the error detection circuit 4 disposed in the non-secure portion 120 in the device B110 is requested to perform the CRC checking. In that case, the hardware security module circuit 10 selects a random number rh2'←$\{0, 1\}^k$, sets up r0:=PRF(ski, tss1∥IDi∥rh2'∥data∥data_crc∥2), and transmits data to the error detection circuit 4 disposed in the non-secure portion 120 in the device B110. Thus, the hardware security module circuit 10 assigns the CRC checking to the error detection circuit 4 and receives the result and data_crc2. Then, to check that there is no data falsification, the hardware security module circuit 10 verifies whether or not r0=PRF(ski, tss1∥IDi∥rh2'∥data∥data_crc2∥2) is satisfied. When r0=PRF(ski, tss1∥IDi∥rh2'∥data∥data_crc2∥2) is not satisfied or the result of receipt is "fail", the hardware security module circuit 10 sets result1 to satisfy result1:=100. When r0=PRF(ski, tss1∥IDi∥rh2'μdataμdata_crc2∥2) is satisfied and the result is "pass", the following operation is executed.

4. The (R, W, E) attributes of the area A1 where data obtained as a result of the signature verification is stored are set to (1, 1, 0) or (0, 1, 0) (i.e., such that data is writable and a program is inexecutable), and data is stored (written) in the area A1. As a result, when data that has passed the CRC checking (i.e., in which no error is detected) is written, it is possible to inhibit an attacker or the like from falsifying the data. In addition, the (R, W, E) attributes of the area A1 is set to (1, 0, 1) or (1, 0, 0) (i.e., such that data is readable and unwritable), and data is read again from the area A1 and set as data'. The CRC of data' is calculated using CRC(data'), and it is verified whether or not the CRC of data' matches data_crc. Since the data may be broken when written in the nonvolatile memory, to improve fault tolerance, the data is thus read after being written and subjected to CRC checking. Such a process can inhibit an attacker or the like from falsifying the data when the data is read for the detection of an error that has occurred during the writing of the data.

When there is a match between the CRC(data') and data_crc, the (R, W, E) attributes of the area A1 are set to (1, 0, 1), (1, 0, 0), or (0, 0, 1) (i.e., such that data is unwritable). When the area A1 is a nonvolatile memory portion, an activation process is performed thereon. Then, result2 is set to satisfy result2:=001 showing that all the processes are successful. When data is a critical program and needs confidentiality, the (R, W, E) attributes of the area A1 are set to (0, 0, 1) such that the program is only executable). When there is no match between the CRC(data') and data_crc, the (R, W, E) attributes of the area A1 are set to (1, 1, 0) or (0, 1, 0) (i.e., such that data is writable and the program is inexecutable), and data written in the area A1 is erased. This can inhibit inappropriate execution or reading of the data. Then, result2 is set to satisfy result1:=010 showing that the CRC checking has failed again.

When access control over the error detection circuit 4 cannot be set, the error detection circuit 4 is requested to perform the CRC checking. In this case, a process as shown below may also be performed. That is, the hardware security module circuit 10 selects a random number rh2"←$\{0, 1\}^k$, sets up r0':=PRF(ski, tss1∥IDi∥rh2"∥data∥data_crc∥3), and transmits data' to the error detection circuit 4 disposed in the non-secure portion 120 in the device B110. Thus, the hardware security module circuit 10 assigns the CRC checking to the error detection circuit 4 and receives the result and data_crc2'. Then, to check that there is no data falsification, the hardware security module circuit 10 verifies whether or not r0':=PRF(ski, tss1∥IDi∥rh2"∥data'∥data_crc2'∥3) is satisfied. When r0':=PRF(ski, tss1∥IDi∥rh2"∥data'∥data_crc2'∥3) is not satisfied or when the result of the reception is "fail", the hardware security module circuit 10 sets the (R, W, E) attributes of the area A1 to (1, 1, 0), (1, 0, 0), or (0, 1, 0), erases data written in the area A1, and sets result1 to satisfy result1:=010. When r0':=PRF(ski, tss1∥IDi∥rh2"∥data'∥data_crc2'∥3) is satisfied and the result of the reception is "pass", the hardware security module circuit 10 sets the (R, W, E) attributes of the area A1 to (1, 1, 0), (1, 0, 0), or (0, 1, 0). When the area A1 is a nonvolatile memory portion, the hardware security module circuit 10 performs an activation process thereon. The hardware security module circuit 10 further sets result1 so as to satisfy result1:=001. When data is a critical program and needs confidentiality, the hardware security module circuit 10 sets the (R, W, E) attributes to (0, 0, 1) to allow only execution of the program.

5. Access control is set such that another module which needs processing by the error detection circuit 4, such as the CPU 2, is allowed to access the error detection circuit 4.

Then, a random number is selected as rc2{0, 1}^(k−3) to satisfy rc2:=rc2∥result2∈{0, 1}^k.

6. r4:=PRF(ski, tss2∥tspN+1∥IDi∥rh4∥rc2∥0) is calculated. Then, the hardware security module circuit 10 of the device B110 sets up Data6:=(tss2, IDi, rh4, rc2, r4) and transmits (rp, tspN+1, Data6) to the non-secure portion 120 of the device B110 (Step S482).

7. On receiving Data6, the non-secure portion 120 of the device B110 sets the (R, W, E) attributes of the corresponding memory area to (1, 0, 0) (Step S483), and then transmits (j+2, rp, tsp, Data6) to the device A102 (Step S484). When the transmission is completed, the non-secure portion 120 sets the (R, W, E) attributes of the corresponding memory area to (0, 1, 0) and then erases Data6 (Step S485).

Note that, when there is a time limit to the transmission from the device A102 to the non-secure portion 120 of the device B110 and tspN+1 is reliable, it may also be possible to recognize the time limit by comparing tss2 to tspN+1 during the size checking in 1. described above. When there is a time limit to the authentication process in a target terminal to be authenticated and the clock of the non-secure portion 120 of the device B110 is reliable, it may also be possible to recognize the time limit by comparing tspN+1 to the time (hereinafter referred to as tsp') when the authentication result is received from the terminal to be authenticated. As a result, when an excessively long time is needed for a process, an inappropriate process can be detected.

(3-3) Verification of Authentication Result in Device A

The non-secure portion 120 of each of the devices B110 transmits (j+2, rp, tspN+1, Data6) to the device A102 (S484). On receiving (j+2, rp, tspN+1, Data6=(tss2, IDi, rh4, rc2, r4)), the device A102 executes the following process (Step S486). Thus, the device A102 and the device B110 perform mutual authentication therebetween.

The device A102 verifies whether or not rp,tss2, tspM+1, IDi, rh4, rc2, r4∈{0, 1}^k is satisfied, i.e., whether or not the length of each data item has a prescribed value. When rp, tss2, tspN+1, IDi, rh4, rc2, r4∈{0, 1}^k is not satisfied, the device A102 sets result2 to satisfy result2:=000. When rp, tss2, tspN+1, IDi, rh4, rc2, r4∈{0, 1}^k is satisfied, the device A102 verifies whether or not r4=PRF(ski, tss2∥tspN+1∥IDi∥rh4∥rc2∥0) is satisfied (i.e., whether or not the signature is correct). When the signature is correct, the device A102 sets result2 to satisfy result2:=lower 3 bits of rc2 and otherwise sets result2 to satisfy result2:=111.

Then, the device A102 outputs result2 as the authentication result and records the authentication result. When result2 shows "001", "001" means that mutual authentication between the device A102 and the device B110 is successful and data is successfully stored in the data storage area of the device B110 without being falsified by a man-in-the middle and without suffering from a loss. When result2 shows "010", "010" means a write failure due to a data loss in the writing of the data. When result2 shows "100", "100" means that authentication is successful, but a data loss has occurred before the writing of the data. When result2 shows "100", "100" also means that the signature verification of enc_data_with_crc has failed, i.e., any of {d[j]; j=1, . . . , N} may have been falsified. When result2 shows "110", "110" means the occurrence of a reception error (message falsification may have occurred).

Note that, when there is a limit to the time period between the transmission of the authentication data from the device A102 to the non-secure portion 120 of the device B110 and the acquisition of the authentication data by the device A101 from the non-secure portion 120 of the device B110, it may also be possible to recognize the time limit by comparing tss2 to the current time in the device A102 during the size checking described above. When there is a limit to the transmission of whether or not signature verification performed on the signature data is successful from the non-secure portion 120 of the device B110 to the device A102 and the clock of the non-secure portion 120 of the device B110 is reliable, it may also be possible to recognize the time limit by transmitting the data to which tsp' has been added from the non-secure portion 120 of the device B110 to the device A102 and comparing tsp' to tss2.

The data transmission/reception sequence according to the modification of the second embodiment is fail-safe since, when rp is falsified, the corresponding session is no longer present or, even when the corresponding session is present, authentication is performed in the device B110 in a different session and fails, and therefore the sequence does not continue. The data transmission/reception sequence according to the modification of the second embodiment is also fail-safe even when rh4 is falsified since the signature verification performed on the signature data in the device A102 fails. Also, in the data transmission/reception sequence according to the modification of the second embodiment, even when an attacker or the like falsifies the value of rc2, due to a means for signature verification performed on the signature data in the device A102, the attacker or the like cannot pretend that the verification in the device A102 is successful. Also, in the data transmission/reception sequence according to the modification of the second embodiment, even when tspN+1 is falsified, due to the means which verifies the result of the authentication in the device A102, the attacker or the like cannot pretend that the verification in the device A102 is successful. In other words, even when any of rp, rh4, and tspN+1 is falsified, in the signature verification performed on the signature data formed in the hardware security module circuit 10, the attacker or the like cannot pretend that the data writing is successful or the verification is successful.

Accordingly, when all or any of rp, rh4, and rc2 is falsified, it is possible to sense the presence of any falsification. Note that, for the purpose of efficiently detecting an authentication failure or a verification failure due to falsification, it may also be possible to add a hash value to tspN+1.

In the data transmission/reception sequence according to the modification of the second embodiment, when there is a limit to the data size, mutual authentication is performed before and after the transfer of the target data to be transferred. To the whole target data to be transferred, CRC is added and a signature is added, and the whole data with the added signature is segmented and transferred. Consequently, when each of the data segments resulting from the segmentation is transferred, mutual authentication is no longer necessary.

Accordingly, in the data transmission/reception sequence according to the modification of the second embodiment, the data can be transferred more efficiently than when the target data to be transferred is segmented in advance, a signature is added to each of the data segments resulting from the segmentation, and the data segment with the added signature is transferred in one of transfer sessions.

Third Embodiment

Next, a description will be given of the third embodiment. In each of the first and second embodiments described above, it is assumed that the device A102 and the device B110 share the symmetrical key ski in advance. When keys are written in devices before the shipment thereof, it can be considered that a server (server 104) registers a set of IDi∈ID of the devices and a set of the keys ski as {(IDi, ski); IDi∈ID, ski←{0, 1}^k, k:positive integer security parameter} in a database.

On the other hand, since it is generally not easy to predict which two or more of the devices perform data transmission/reception therebetween after being shipped, it is desirable to be able to set a common symmetrical key after the assembly of the devices (such as when, e.g., the devices are used). When it is assumed that the IDs of the devices can freely be read, but an override operation and an erase operation cannot be performed, in data transmission/reception between the device A102 and the device B110, the exactly the same symmetrical key may be placed in, e.g., a device A' other than the device A102 and the device B110. In this case, when the device B receives data, it is not easy to recognize from which one of the device A102 and the device A' the data is transmitted. Accordingly, it is desirable to be able to place the symmetrical key shared only by the two devices A102 and B110.

The data transmitted from the device A102 to the device B110 may be data generated by the device A102 or data from the data transmission server (server 104) which is specially disposed in the device A102 using an appropriate means such as secure communication. Particularly in the latter case, it is desirable that the data to be transmitted from the device A102 to the device B110 is stored in the HSM disposed in the device

A102 in accordance with a secure protocol such as TLS (Transport Layer Security). Considerations should also be given to the situation in which the respective identifiers IDi of the individual devices and the keys ski thereto are not registered in the database of the data transmission server and the situation in which there is no such database in the first place and the respective identifiers IDi of the individual devices and the keys ski thereto are managed by a server different from the data transmission server. In the third embodiment, the server 104 issues key information (random number) used only for data transmission/reception between the device A102 and the device B110.

FIGS. 29 to 34 are sequence diagrams each showing the data transmission/reception sequence executed in the authentication system 100 according to the third embodiment. The sequence diagrams shown in FIGS. 29 to 34 show an operation in accordance with a protocol which transmits data generated by a source device (or securely placed in a source device using another means) to a destination device. The sequence diagrams shown in FIGS. 29 to 34 show an operation in accordance with a data transmission/reception protocol considering functional safety and having falsification resistance and confidentiality on the assumption that the source device and the destination device do not have a common key in advance. It is assumed that, as the initial settings of a common symmetrical key to the device A102 and the device B110, the following settings are made in advance.

The device A102 receives 1^k input thereto where k is a security parameter. The server 104 selects a symmetrical key skp←{0, 1}^k for the device A102 to which an authentication identifier IDp∈{0, 1}^k is assigned and transmits (skp, IDp) to the device A102. Likewise, the server 104 selects a symmetrical key skd←{0, 1}^k for the device B110 to which an authentication identifier IDd∈{0, 1}^k is assigned and transmits (skd, IDd) to the device B110. The "skp" used herein is a common key to the server 104 and the device A102, while the "skd" used herein is a common key to the server 104 and the device B110. The device A102 and the device B110 store respective correspondents to (skp, IDp) and (skd, IDd) in the respective nonvolatile memories thereof. For example, it may also be possible that, by performing such processes before the device A102 and the device B110 are shipped, a specific key is set to each of the devices A102 and B110. It is also assumed that the non-secure portion 120 of the device B110 is allowed to read IDi stored in the hardware security module circuit 10 embedded in the device B110, but is not allowed to perform an override operation and an erase operation under appropriate access control.

(1) Construction of Device Authentication Information and Information about Common Key Placed between Devices A102 and B110

The device A102 acquires IDd from the device B110 (Step S501). The device A102 may read IDd from the device B110 or may also receive IDd from the device B110. The device A102 selects rp∈{0, 1}^k for session management (Step S502) and transmits (1, rp, IDd, IDp) to the server 104 (Step S503). On receiving (1, rp, ID, IDp), the server 104 performs the following process (Step S504). Thus, the device A102 and the device B110 are authenticated and a session key for a session between the device A102 and the device B110 is generated.

1. It is verified whether or not rp, IDd, IDp∈{0, 1}^k and IDd, IDp∈ID are satisfied. If rp, IDd, IDp∈{0, 1}^k and IDd, IDp∈ID are not satisfied, the process is ended. If rp, IDd, IDp∈{0, 1}^k and IDd, IDp∈ID are satisfied, the following process is executed.

2. The current time is selected as tss←TimeStamp.

3. A random number is selected as rh←{0, 1}^k.

4. The session key to the device A102 and the device B110 is selected as k1←{0, 1}^k.

5. As information for mutual authentication between the device A102 and the server 104, r1p:=PRF(skp, tss1‖IDp‖rh‖1) is calculated.

6. As information for mutual authentication between the device B110 and the server 104, r1d:=PRF(skd, tss1‖IDd‖rh‖1) is calculated.

7. To transmit a session key k1 to the device A102 and the device B110, the following process is performed.

For the device A102, r1'p:=PRF(skp, tss1‖IDp‖rh‖2) and c1p:=AE.Enc(r1'p, k1) are calculated, where r1'p is a key for encrypting the key k1.

For the device B110, r1'd:=PRF(skd, tss1‖IDd‖rh‖2) and c1d:=AE.Enc(r1'd, k1) are calculated, where r1'd is a key for encrypting the key k1.

8. The server 104 sets up Data1:=(tss, IDd, rh, r1d, c1d, IDp, r1p, c1p) and transmits (1, rp, Data1) to the device A102 (Step S505).

(2) Verification of Server Device Authentication Information and Construction of Authenticated Encryption Data Transmitted to Device B in Device A The device A102 selects the current time as tsp←TimeStamp and selects two random numbers as rcp←{0, 1}^(k−3), r3p←{0, 1}^k. The device A102 also sets the (R, W, E) attributes of the memory area where Data1 is stored to (1, 1, 0) or (0, 1, 0) (i.e., data1 is writable and a program is inexecutable). On receiving Data1, the device A102 writes Data1 in the corresponding memory area. Then, the device A102 sets the (R, W, E) attributes of the corresponding memory area to (1, 0, 0) and performs the following process (Step S510).

1. It is verified whether or not rp, tss, IDd, rh, r1d, c1d, IDp, r1p, c1p∈{0, 1}^k and IDd, IDp∈ID are satisfied. When rp, tss, IDd, rh, r1d, c1d, IDp, r1p, c1p∈{0, 1}^k and IDd, IDp∈ID are not satisfied, result1p:=000, rcp:=rcp~result1p is set up, and a random number is selected as r2p←{0, 1}^k. The value "000" of result1p shows that an unauthorized access has been made between the server 104 and the device A102. When rp, tss, IDd, rh, r1d, c1d, IDp, r1p, c1p∈{0, 1}^k and IDd, IDp∈ID are satisfied, the following process is executed.

2. It is verified whether or not r1p=PRF(skp, tss~IDp~rh~1) is satisfied. When r1p=PRF(skp, tss~IDp~rh~1) is not satisfied, result1p is set to satisfy result1p:=0100. When r1p=PF(skp, tss~IDp~rh~1) is satisfied, the following process is performed.

result1p is set to satisfy result1p:=001.
 r1'p:=PRF(skp, tss||IDp||rh||2), k1:=AE.Dec(r1'p, c1p) is calculated, here AE.Dec is decryption in accordance with an authenticated encryption method. Note that when a ciphertext and a signature are given in a pair, signature verification of the ciphertext is performed and, when the verification is successful, the ciphertext is decrypted.
 When an authentication error is detected in authentication in accordance with the authenticated encryption method, result1p is overridden on result1p:=010.

3. As the result of the authentication of the server 104 in the device A102 and authentication information used for the authentication of the device A102 by the server 104, rcp:=rcp||result1p, r2p:=PRF(skp, tss||tsp||IDp||rh||rcp||1) is calculated.

4. A random number is selected as rh1←{0, 1}^k.

Note that the processes 3. and 4 may also be performed after the process in 5. Also, when the process 5, described below is performed, the process 4 need not necessarily be performed.

5. It is verified whether or not result1p=001 is satisfied. When result1p=001 is satisfied, the following process is performed. When result1p=001 is not satisfied, the processes including and subsequent to the process 6 is performed.

The current time is selected as tss1←TimeStamp, and a random number is selected as rh1←{0, 1}^k.
 For data to be transmitted to the device B110, in the error detection circuit (ECC/CRC processing unit) in the device A102, e.g., data_crc:=CRC(data) is set up, and CRC is calculated. It is assumed herein that the present process involves an appropriate access limit and is performed in the HSM in the device A102 within a range which ensures falsification resistance and confidentiality. When only the falsification resistance can be ensured in this process, in the device A102, only the falsification resistance can be ensured. Against an attack by a man-in-the middle in a path from the device A102 to storage in the HSM in the device B110, the falsification resistance and confidentiality are provided.
 For mutual authentication between the device A102 and the device B110,
 r1''p:=PRF(k1, tss||IDd||rh||2), c1:=AE.Enc(r1''p, tss||IDd||rh1||data||data_crc) is calculated.

6. The device A102 sets up Data2:=(tss, tss1, IDd, rh, r1d, c1d, IDp, r1p, c1p, rcp, r2p, c1) and transmits (1, rp, tsp, Data2) to the non-secure portion 120 of the device B110 (Step S522).

(3) Data Decryption, Data Storage, and Result Collection in Device B

The non-secure portion 120 of each of the devices B110 sets the (R, W, E) attributes of the memory area in which Data1 is stored to (1, 1, 0) or (0, 1, 0) (Step S521). On receiving Data2 (S522), the non-secure portion 120 sets the (R, W, E) attributes of the corresponding memory area to (1, 0, 0) (Step S523) and then transmits (rp, tsp, Data2) to the hardware security module circuit 10 of the device B110 (Step S524). When the transmission is completed, the non-secure portion 120 sets the (R, W, E) attributes of the corresponding memory area to (0, 1, 0) and then erases Data2 (Step S525). The (R, W, E) attributes may also be changed herein using the CPU 11 embedded in the hardware security module circuit 10 of the device B110 or using the CPU 2 of the non-secure portion 120. In either case, it is assumedly recognized that the setting software has not been falsified using secure boot or the like prior to the execution thereof.

On receiving (rp, tsp, Data2=(tss, tss1, 1Dd, rh, r1d, c1d, IDp, r1p, c1p, rcp, r2p, c1)), the hardware security module circuit 10 of the device B110 selects four random numbers as r2d←{0, 1}^k, r3d←{0, 1}^k, rcd←{0, 1}^(k−3), rcdp←{0, 1}^(k−4). Then, the hardware security module circuit 10 performs the following process (Step S530).

1. It is verified whether or not rp, tsp, tss, tss1, IDd, rh, r1d, c1d, IDp, r1p, c1p, rcp, r2p, c1∈{0, 1}^k is satisfied, i.e., whether or not the length of each data item has a prescribed value and whether or not IDd, IDp∈ID is satisfied. If rp, tsp, tss, tss1, IDd, rh, r1d, c1d, IDp, r1p, c1p, rcp, r2p, c1∈{0, 1}^k and IDd, IDp∈ID are not satisfied, result1:=000, rcd:=rcd||result1d, result1dp:=000, rcdp:=rcdp||result1dp is set up, where the value "000" of result1d shows that an unauthorized access has been made between the server 104 and the device B110, and the value "000" of result1dp shows that an authorized access has been made from the device A102 to the device B110. If rp, tsp, tss, tss1, IDd, rh, r1d, c1d, IDp, r1p, c1p, rcp, r2p, c1∈{0, 1}^k and IDd, IDp∈ID are satisfied, the following operation is executed.

2. It is verified whether or not r1d=PRF(skd, tss||IDd||rh||1) is satisfied. When r1d=PRF(skd, tss||IDd||rh||1) is not satisfied, result1d is set to satisfy result1d:=100. When r1d=PRF(skd, tss||IDd||rh||1) is satisfied, the following process is performed.

result1d:=001 is set up.
 r1'd:=PRF(skd, tss||IDd||rh||2), k1:=AE.Dec(r1'd, c1d) is calculated.
 When an authentication error is detected in authentication in accordance with the authenticated encryption method, result1d is overridden on result1d:=010.

3. As the result of the authentication of the server 104 in the device B110 and authentication information used for the authentication of the device B110 by the server 104, rcd:=rcd||result1d, r2d:=PRF(skd, tss||tsp||IDd||rh||rcd||1) is calculated.

4. It is verified whether or not result1d=001 is satisfied. When result1d=001 is not satisfied, result1dp=1100 is set up. When result1d=001 is satisfied, r1''p:=PRF(k1, tss||IDd||rh||2), tss||IDd||rh||data||data_crc:=AE.Dec(r1''p, c1) is calculated. Thus, c1 is checked.

5. tss||IDd||rh||data||data_crc:=AE.Dec(r1''p, c1), i.e., authenticated decryption in accordance with the authenticated encryption method is performed to verify whether or not authentication is successful. If the authentication is not successful, result1dp:=1000 is set up. If the authentication is successful, the following operation is executed. In the foregoing decryption, AE.Dec represents decryption in accordance with the authenticated encryption method. When a ciphertext and a signature are given in a pair, signature verification of the ciphertext is performed and, when the verification is successful, the ciphertext is decrypted. The signature verification performed herein corresponds to authentication.

6. Under the set access control, only the hardware security module circuit 10 is allowed to access the error detection circuit 4. The CRC of data obtained as a result of the decryption is calculated using CRC(data) and it is verified whether or not the calculated CRC matches data_crc. When there is no match, result1dp:=0100 showing that CRC checking has failed is set up. When there is a match, the following operation is executed.

The (R, W, E) attributes of the area A1 where data obtained as a result of the decryption are set to (1, 1, 0) or (0, 1, 0) (i.e., such that data is writable and a program is inexecutable), and data is stored in the area A1. Thus, when data that has passed the CRC checking (i.e., in which no error is detected) is written, it is set that only the hardware security module circuit 10 is allowed to write data. This inhibits an attacker or the like from falsifying the data. In addition, the (R, W, E) attributes of the area A1 are set to (1, 0, 1) or (1, 0, 0) (i.e., such that data is readable and unwritable), and data is read again from the area A1 and set as data'. The CRC of data' is calculated using CRC(data'), and it is verified whether or not the CRC of data' matches data_crc. Since the data may be broken when written in the nonvolatile memory, to improve fault tolerance, the data is thus read after being written and subjected to the CRC checking. Such a process can inhibit an attacker or the like from falsifying the data when the data is read for the detection of an error that has occurred during the writing of the data.

When there is a match between CRC(data') and data_crc, the (R, W, E) attributes of the area A1 are set to (1, 0, 1), (1, 0, 0), or (0, 0, 1) (i.e., such that data is unwritable). When the area A1 is a nonvolatile memory portion, an activation process is performed thereon. Then, result1dp is set to satisfy result1dp:=0001 showing that all the processes are successful. When data is a critical program and needs confidentiality, the (R, W, E) attributes are set to (0, 0, 1) such that the program is only executable. When there is no match between CRC(data') and data_crc, the (R, W, E) attributes of the area A1 are set to (1, 1, 0) or (0, 1, 0) (i.e., such that data is writable and the program is inexecutable), and data written in the area A1 is erased. This can inhibit inappropriate execution or reading of the data. Then, result1dp is set to satisfy result1dp:=0010 showing that the CRC checking has failed again.

Under the set access control, another module which needs processing by the error detection circuit 4, such as the CPU2, is allowed to access the error detection circuit 4.

As the result of the authentication of the device A120 in the device B110 and authentication information used for the authentication of the device B110 by the device A102, rcdp:=rcdp||result1dp, r3d:=PRF(k1, tss||tsp||IDd||rh||rcdp||1) is calculated.

7. The hardware security module circuit 10 of the device B110 sets up Data3:=(tss, tss1, IDd, rh, r1d, c1d, IDp, r1p, c1p, rcp, r2p, r3p, rcd, r2d, rcdp, r3d) and transmits (rp, tsp, Data3) to the non-secure portion 120 of the device B110 (Step S540).

8. On receiving Data3, the non-secure portion 120 of the device B110 sets the (R, W, E) attributes of the corresponding memory area to (1, 0, 0) (Step S541), and then transmits (2, rp, tsp, Data3) to the device A102 (Step S542). When the transmission is completed, the non-secure portion 120 sets the (R, W, E) attributes of the corresponding memory area to (0, 1, 0) and then erases Data3 (Step S543).

Note that the (R, W, E) attributes may also be updated using the (R, W, E) attribute control mechanism (access control circuit 20) shown in FIGS. 3 to 9. Note that, when the (R, W, E) attribute control mechanism shown in FIGS. 3 to 9 is not used, settings may also be made using a memory protection unit (MPU) or a memory management unit (MMU). In the case of using the mechanism in FIG. 6, even when each of the attributes R and W is "0", data can be read and written by setting the hardware security module circuit 10. Accordingly, the attributes need to be changed in consideration of this. When a transition is not made between S1 and S2 in FIG. 6, an updatable range is limited, and therefore the attributes need to be changed within the limited range.

Note that when there is a time limit to the transmission from the device A102 to the non-secure portion 120 of the device B110 and tsp and tss1 are reliable, it may also be possible to recognize the time limit by comparing tss and tsp to tss1 during the size checking in the process 1, described above. When there is a time limit to the authentication process in a target terminal to be authenticated and the clock of the non-secure portion 120 of the device B110 is reliable, it may also be possible to recognize the time limit by comparing tsp and tss1 to the time (hereinafter referred to as tsp') when the authentication result is received from the terminal to be authenticated. As a result, when an excessively long time is needed for a process, an inappropriate process can be detected.

(3) Verification of Authentication Result from Device B in Device A

The non-secure portion 120 of each of the devices B110 transmits (2, rp, tsp, Data3) to the device A102 (S542). On receiving (2, rp, tsp, Data3=(tss, tss1, IDd, rh, r1d, c1d, IDp, r1p, c1p, rcp, r2p, r3p, rcd, r2d, rcdp, r3d)), the device A102 sets up rcp←$\{0, 1\}^{\wedge}(k-3)$ and executes the following process (Step S544). Thus, the authentication of the server 104 and the verification of k1 is performed.

1. It is verified whether or not rp, tss, tss1, tsp, IDd, rh, r1d, c1d, IDp, r1p, c1p, rcp, r2p, r3p, rcd, r2d, rcdp, r3d∈$\{0, 1\}^{\wedge}$k is satisfied, i.e., whether or not the length of each data item has a prescribed value and whether or not IDd, IDp∈ID is satisfied. If rp, tss, tss1, tsp, IDd, rh, r1d, c1d, IDp, r1p, c1p, rcp, r2p, r3p, rcd, r2d, rcdp, r3d∈$\{0, 1\}^{\wedge}$k and IDd, IDp∈ID are not satisfied, result1pd:=000, result1p:=000 is set up, where the value "000" of result1pd shows that an unauthorized access has been made from the device A102 to the device B110. If rp, tss, tss1, tsp, IDd, rh, r1d, c1d, IDp, r1p, c1p, rcp, r2p, r3p, rcd, r2d, rcdp, r3d∈$\{0, 1\}^{\wedge}$k and IDd, IDp∈ID are satisfied, the following process is performed.

2. It is verified whether or not r1p=PRF(skp, tss||IDp||rh||1) is satisfied (i.e., whether or not the signature is correct). When r1p=PRF(skp, tss||IDp||rh||1) is not satisfied, result1p is set to satisfy result1p:=0100. When r1p=PRF(skp, tss||IDp||rh||1) is satisfied, the following process is performed.

result1p is set to satisfy result1p:=001.
r1'p:=PRF(skp, tss||IDp||rh||2), k1:=AE.Dec(r1'p, c1p) is calculated.
When an authentication error is detected in authentication in accordance with the authenticated encryption method, result1p is overridden on result1p:=010.

3. It is verified whether or not result1p=001 is satisfied. When result1p=001 is not satisfied, the current process shifts to the process 5. When result1p=001 is satisfied, the following process is performed.

4. It is verified whether or not r3d=PRF(k1, tss||tsp||I-Dd||rh||rcd||1) is satisfied. Thus, data to be transmitted to the server 104 is verified. When r3d=PRF(k1, tss||tsp||I-

Dd∥rh∥rcd∥1) is not satisfied, result1pd is set to satisfy result1pd:=100. When r3d=PRF(k1, ts∥tsp∥IDd∥rh∥rcd∥1) is satisfied, result1pd is set to satisfy result1pd:=001.

5. It is verified whether or not result1pd=001 is satisfied. When result1pd=001 is not satisfied, result2pd is set to satisfy result2pd:=111. When result1pd=001 is satisfied, result2pd is set to satisfy result2pd:=0x0 . . . 0f&rcdp (lower 4 bits of rcdp).

Then, the device A102 outputs result2pd as the result of the authentication and records result2pd. When result2pd is "0001", "0001" means that the authenticity of the server 104 is proved, and the data is successfully stored in the data storage area of the device B110 without being falsified by a man-in-the middle, without leaking, and without suffering from a loss. When result2pd is "0010", "0010" means a write failure due to a data loss in the writing of the data. When result2pd is "0100", "0100" means that the authenticity of the server 104 is successfully proved and authentication/decryption are successful, but a data loss has occurred before the writing of the data. When result2pd is "1100", "1100" means that a reception error has occurred (message may have been falsified, i.e., the authenticity of the server 104 is not proved or is successfully proved but the authentication of the common key k1 in accordance with the authenticated encryption method has failed).

(5) Verification of Results of Authentication of Devices A and B in Server

The device A102 transmits (2, rp, tsp, Data3) to the server 104 (Step S551). On receiving (2, rp, tsp, Data3=(tss, tss1, IDd, rh, r1d, c1d, IDp, r1p, c1p, rcp, r2p, r3p, rcd, r2d, rcdp, r3d)), the server 104 sets up result2d:=111, result2p:=111 and performs the following process (Step S552).

1. It is verified whether or not rp, tss, tss1, tsp, IDd, rh, r1d, c1d, IDp, r1p, c1p, rcp, r2p, r3p, rcd, r2d, rcdp, r3d∈{0, 1}^k is satisfied (i.e., whether or not the length of each data item has a prescribed value) and whether or not IDp∈ID is satisfied. If rp, tss, tss1, tsp, IDd, rh, r1d, c1d, IDp, r1p, c1p, rcp, r2p, r3p, rcd, r2d, rcdp, r3d∈{0, 1}^k and IDd, IDp∈ID are not satisfied, result2d:=101, result2p:=101 is set up. If rp, tss, tss1, tsp, IDd, rh, r1d, c1d, IDp, r1p, c1p, rcp, r2p, r3p, rcd, r2d, rcdp, r3d∈{0, 1}^k and IDd, IDp∈ID are satisfied, the following process is performed. In the foregoing, the value "101" of each of result2d and result2p shows that an unauthorized access has been made.

2. For the verification of the result of proving the authenticity of the server 104 in the device A102, it is verified whether or not r2p=PRF(skp, tss∥tsp∥IDp∥rh∥rcp∥1) is satisfied. When r2p=PRF(skp, tss∥tsp∥IDp∥rh∥rcp∥1) is satisfied, result2p:=0x0 . . . 7&rcp (lower 3 bits of rcp) is set up. Then, result2p is recorded as the result of mutual authentication between the device A102 and the server 104. When result2p is "001", "001" means that the authenticity of the server 104 is proved, and data is successfully stored in the data storage area of the device A102 without entailing the falsification of the key k1 by a man-in-the-middle and the leakage of the key k1. When result2p is "010", "010" means a failure in authenticating the key k1 in accordance with the authenticated encryption method (message may have been falsified). When result2p is "100", "100" means a failure in proving the authenticity of the server 104 (message may have been falsified).

For the verification of the result of proving the authenticity of the server 104 in the device B110, it is verified whether or not r2d=PRF(skd, tss∥tsp∥IDd∥rh∥rcd∥1) is satisfied. When r2d=PRF(skd, tss∥tsp∥IDd∥rh∥rcd∥1) is satisfied, result2d:=0x0 . . . 7&rcd (lower 3 bits of rcd) is set up. Then, result2d is recorded as the result of mutual authentication between the device B110 and the server 104. When result2d is "001", "001" means that the authenticity of the server 104 is proved, and data is successfully stored in the data storage area of the device B110 without entailing the falsification of the key k1 by a man-in-the-middle and the leakage of the key k1. When result2d is "010", "010" means a failure in authenticating the key k1 in accordance with the authenticated encryption method (message may have been falsified). When result2d is "100", "100" means a failure in proving the authenticity of the server 104 (message may have been falsified).

Note that when there is a limit to the time period from the transmission of the authenticated encryption data of the key k1 from the server 104 to the device A102 and the acquisition of the results of the authenticity proof of the server 104, which is performed by the devices A102 and B110, and the result of the authentication of the key k1 by the server 104, it may also be possible to recognize the time limit by comparing tss to the current time in the server 104 during the size checking described above.

The data transmission/reception sequence according to the third embodiment is fail-safe since, when rp is falsified, the corresponding session is no longer present or, even when the corresponding session is present, authentication in the device B110 in a different session is performed and fails. The data transmission/reception sequence according to the third embodiment is also fail-safe even when rh is falsified since the verification of whether or not the process of decrypting the authenticated ciphertext of the key k1 is successful in the devices A102 and B110 fails. The data transmission/reception sequence according to the third embodiment is also fail-safe when rh is falsified since, due to the means which verifies whether or not the operation of decrypting the authenticated ciphertext is successful in the device B110, the authentication of the data transmitted from the device A102 to the device B100 upon decryption thereof fails. Also, in the data transmission/reception sequence according to the third embodiment, even when an attacker falsifies the value of rcdp, due to a means for mutual authentication between the device A102 and the device B110, the attacker cannot pretend to the device A102 that data writing in the device B110 is successful. Also, in the data transmission/reception sequence according to the third embodiment, even when tsp is falsified, due to the means which verifies the result of the authentication in the device A102 and the device B110, the attacker can neither pretend that data writing in the device B110 is successful nor pretend to the device A102 that data writing in the device B110 is successful. The same applies also to the other values. In other words, even when any of all the values including rp, rh2, and tsp is falsified, the attacker or the like cannot pretend that the data writing or verification is successful in the verification of whether or not the process of decrypting the authenticated ciphertext formed in the hardware security module circuit 10 of the device B110 is successful. Accordingly, in the third embodiment, when all or any of the values included in a message is falsified, it is possible to sense the presence of any falsification. Note that, for the purpose of efficiently detecting an authentication failure or a verification failure due to falsification, it may also be possible to add a hash value to tsp.

Also, in the data transmission/reception sequence according to the third embodiment, key information (k1) used only for communication with the device A102 and the device B110 (semiconductor device 1) is issued by the server 104 to the device A102 and the device B110. When the key information is transmitted to the device A102 and the device B110, the server 104 and the devices A102 and B110 perform mutual authentication therebetween. In addition, in the same manner as in the case where the target data to be transferred is transferred in each of the first embodiment and the second embodiment, access control is performed on the memory area of the non-secure portion 120. This eliminates the need to place the common key in the device A102 and the device B110 in advance. Moreover, by performing the access control when the key information is issued, it is possible to inhibit an attacker or the like from falsifying the key information.

(Modifications)

Note that the embodiments of the present invention are not limited to the embodiments described above and can appropriately be modified within a scope not departing from the gist thereof. For example, the plurality of embodiments described above are applicable to each other. For example, the transmission of the key information according to the third embodiment may also be performed before the data transmission/reception sequence according to the first embodiment is performed. Also, in each of the sequence diagrams according to the embodiments described above, the order of the individual processes can appropriately be changed.

Also, in each of the embodiments described above, it is assumed that the authentication system 100 is an in-vehicle network system. However, the authentication system 100 is not limited to an in-vehicle network system. The authentication system 100 is applicable to any device capable of communicating with another device. For example, the authentication system is applicable to home electric appliances capable of communicating with an external device.

While the invention achieved by the present inventors has been specifically described heretofore on the basis of the embodiments, the present invention is not limited to the embodiments described above. It will be appreciated that various changes and modifications can be made in the invention within the scope not departing from the gist thereof.

What is claimed is:

1. A semiconductor device comprising:
   a hardware security module circuit which performs an authentication process; and
   an error detection circuit used to perform an error detection process at least on first data which is processed in the hardware security module circuit,
   wherein a memory area associated with the error detection circuit is configured to be accessible only by the hardware security module circuit when the error detection process is performed at least on the first data,
   wherein the semiconductor device further comprises an access control circuit which performs access control over the memory area,
   wherein the hardware security module circuit is configured to be able to read or write data from or to the memory area without depending on a specification made by the access control circuit,
   wherein, to perform the error detection process on the first data stored in the memory area, the hardware security module circuit brings the memory area into a data readable state and reads the first data from the memory area, and
   wherein, when an error is detected in the first data which is read from the memory area and subjected to the error detection process, the hardware security module circuit brings the memory area into a data writable and inexecutable state and erases the first data written in the memory area.

2. The semiconductor device according to claim 1, wherein the error detection circuit is a hardware circuit dedicated to the hardware security module circuit.

3. The semiconductor device according to claim 1,
   wherein the access control circuit sets respective states where a read operation to the memory area is enabled or disabled, where a write operation to the memory area is enabled or disabled, and an execute operation to the memory area is enabled or disabled, and
   wherein the access control circuit performs control so as to cause a transition from a first state to a second state in which the number of the enabled operations is smaller than in the first state.

4. The semiconductor device according to claim 1,
   wherein, when target data to be transferred is transferred from a device outside the semiconductor device to the semiconductor device, the hardware security module circuit receives and transmits authentication data associated with the target data to be transferred from and to the device via the memory area to perform mutual authentication with the device,
   wherein the error detection circuit performs the error detection process on the authentication data, and
   wherein the access control circuit performs access control when the authentication data is written or read to or from the memory area.

5. The semiconductor device according to claim 1, wherein the hardware security module circuit brings the memory area into a data writable state when the first data in which no error is detected as a result of the error detection process is stored in the memory area.

6. The semiconductor device according to claim 1,
   wherein, to the first data, at least one of session information and a random number is added, and
   wherein the hardware security module circuit is configured such that, when the session information or the random number is falsified, a data transmission/reception sequence does not continue.

7. A semiconductor device, comprising:
   a hardware security module circuit which performs an authentication process; and
   an error detection circuit used to perform an error detection process at least on first data which is processed in the hardware security module circuit,
   wherein a memory area associated with the error detection circuit is configured to be accessible only by the hardware security module circuit when the error detection process is performed at least on the first data,
   wherein the semiconductor device further comprises an access control circuit which performs access control over the memory area,
   wherein the hardware security module circuit is configured to be able to read or write data from or to the memory area without depending on a specification made by the access control circuit,
   wherein, when target data to be transferred is transferred from a device outside the semiconductor device to the semiconductor device, the hardware security module circuit receives and transmits authentication data associated with the target data to be transferred from and to the device via the memory area to perform mutual authentication with the device,
   wherein the error detection circuit performs the error detection process on the authentication data, wherein the access control circuit performs access control when the authentication data is written or read to or from the memory area, and wherein, when the target data to be transferred is segmented and transferred from the device, the hardware security module circuit performs mutual authentication with the device before the target data to be transferred is transferred, segments the authentication data resulting from addition of error detection data by the device to the whole target data to be transferred and from an authentication process performed by the device on the whole target data to be transferred, receives the segmented authentication data, and performs mutual authentication with the device after the target data to be transferred is transferred.

8. The semiconductor device according to claim 7, wherein, after the target data to be transferred is transferred, when the authentication of the device is successful, the hardware security module circuit combines segmented encryption data with each other and decrypts the target data to be transferred.

9. The semiconductor device according to claim 7, wherein the authentication data is transmitted from the device without being encrypted, and wherein the hardware security module circuit performs the mutual authentication without involving encryption and decryption.

10. A semiconductor device, comprising:

a hardware security module circuit which performs an authentication process; and an error detection circuit used to perform an error detection process at least on first data which is processed in the hardware security module circuit, wherein a memory area associated with the error detection circuit is configured to be accessible only by the hardware security module circuit when the error detection process is performed at least on the first data, wherein the semiconductor device further comprises an access control circuit which performs access control over the memory area, wherein the hardware security module circuit is configured to be able to read or write data from or to the memory area without depending on a specification made by the access control circuit, wherein, from a server which is communicative with a device outside the semiconductor device, key information used only for communication between the semiconductor device and the device is issued to the semiconductor device via the device, wherein the hardware security module circuit receives and transmits authentication data associated with the key information from and to the device via the memory area to perform mutual authentication with the server and the device, wherein the error detection circuit performs an error detection process on the authentication data, and wherein the access control circuit performs access control when the authentication data is written or read to or from the memory area.

* * * * *